(12) United States Patent
Tonami

(10) Patent No.: US 6,690,635 B2
(45) Date of Patent: Feb. 10, 2004

(54) REPRODUCING APPARATUS

(75) Inventor: Junichiro Tonami, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 370 days.

(21) Appl. No.: 09/892,998

(22) Filed: Jun. 28, 2001

(65) Prior Publication Data

US 2002/0009035 A1 Jan. 24, 2002

(30) Foreign Application Priority Data

Jul. 18, 2000 (JP) .................................. 2000-217114
Jul. 19, 2000 (JP) .................................. 2000-218676

(51) Int. Cl.[7] ........................... G11B 20/10; G11B 5/09
(52) U.S. Cl. .......................... 369/59.22; 369/47.18; 369/59.21; 369/124.05
(58) Field of Search .......................... 369/47.18, 59.1, 369/59.12, 59.15, 59.19, 59.2, 59.21, 59.22, 59.24, 124.01, 124.05, 124.07, 124.11

(56) References Cited

FOREIGN PATENT DOCUMENTS

| | | |
|---|---|---|
| EP | 0 595 454 | 5/1994 |
| EP | 0 840 318 | 5/1998 |
| EP | 1 014 363 | 6/2000 |
| JP | 7-192270 | 7/1995 |
| JP | 07-147555 | 10/1995 |
| JP | 07-320403 | 4/1996 |
| JP | 10-106161 | 4/1998 |

*Primary Examiner*—Doris H. To
*Assistant Examiner*—Jorge L Ortiz-Criado
(74) *Attorney, Agent, or Firm*—Louis Woo

(57) ABSTRACT

A signal of a run-length-limited code is reproduced from a recording medium. A transversal filter subjects the reproduced signal to a partial-response waveform equalization responsive to tap coefficients. Detection is made as to whether or not the reproduced signal corresponds to a peak point. Peak-point information is generated in response to a result of the detection. A delay circuit outputs at least three successive samples of the peak-point information. A temporary decision device operates for calculating a temporary decision value of the equalization-resultant signal on the basis of the successive samples of the peak-point information. A difference between the temporary decision value of the equalization-resultant signal and an actual value thereof is calculated, and an error signal is generated in response to the calculated difference. The tap coefficients of the transversal filter are controlled in response to the error signal so as to minimize the error signal.

16 Claims, 33 Drawing Sheets

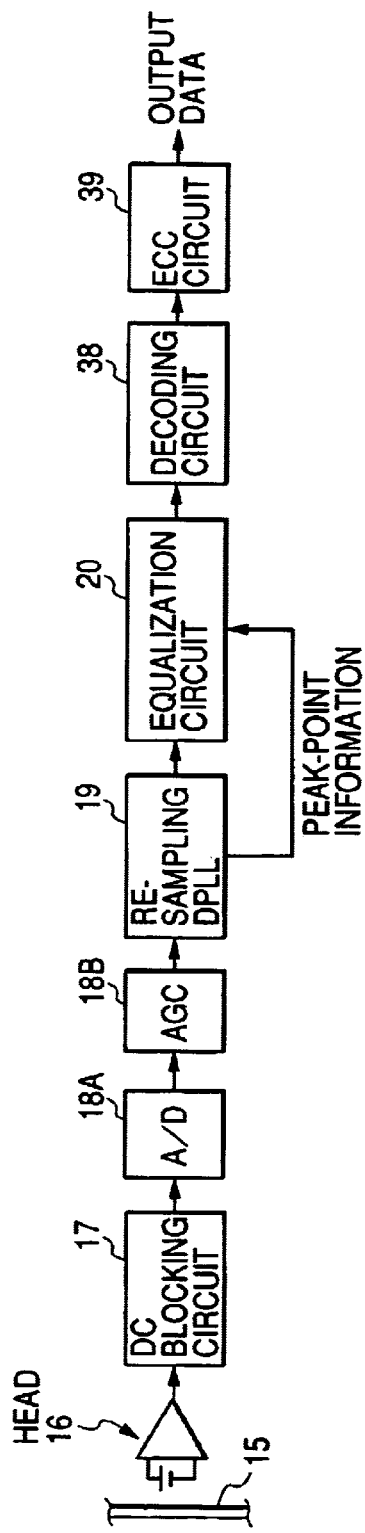
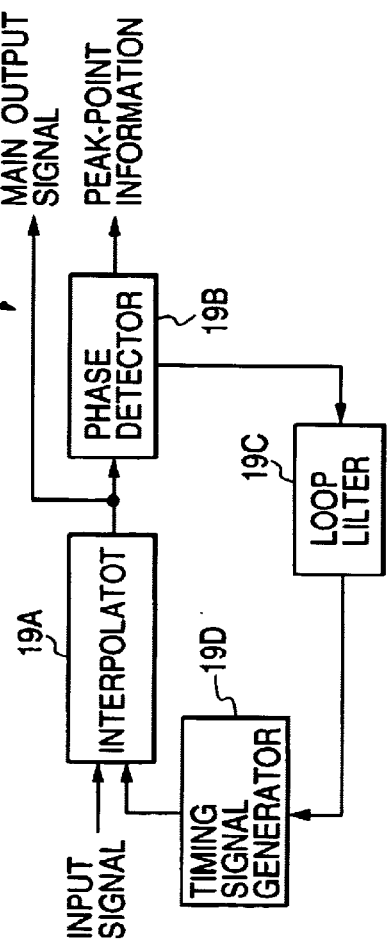

OUTPUT VALUE/INPUT VALUE

OUTPUT VALUE/INPUT VALUE

FIG. 11

| RLL MODE | | RLL (2, X) | | | | | |
|---|---|---|---|---|---|---|---|
| PR MODE | | 1 | 2 | 3 | 4 | 5 | 6 |
| | | PR(1,-1) | PR(1,1,-1,-1) | PR(1,2,-2,-1) | PR(1,3,-3,-1) | PR(2,3,-3,-2) | PR(3,4,-4,-3) |
| TARGET VALUE | a+b | +1 | +2 | +3 | +4 | +5 | +7 |
| | a | +1 | +1 | +1 | +1 | +2 | +3 |
| | 0 | 0 | 0 | 0 | 0 | 0 | 0 |
| | −a | −1 | −1 | −1 | −1 | −2 | −3 |
| | −(a+b) | −1 | −2 | −3 | −4 | −5 | −7 |
| GAIN | G | A | A/2 | A/3 | A/4 | A/5 | A/7 |

OUTPUT VALUE/INPUT VALUE

OUTPUT VALUE/INPUT VALUE

FIG. 30

| PR MODE / RLL MODE | | 1 | 2 | 3 | 4 | 5 | 6 |
|---|---|---|---|---|---|---|---|
| | | PR(1,1) | PR(1,1,1,1) | PR(1,2,2,1) | PR(1,3,3,1) | PR(2,3,3,2) | PR(3,4,4,3) |
| RLL(1,X) {M1—7, MMVF, MD2} | 2a+2b | | | 6→+3 | 8→+4 | 10→+5 | 14→+7 |
| | a+2b | | | 5→+2 | 7→+3 | 8→+3 | 11→+4 |
| | 2b | | | 4→+1 | 6→+2 | 6→+1 | 8→+1 |
| | a+b | | | 3→ 0 | 4→ 0 | 5→ 0 | 7→ 0 |
| | 2a | | | 2→−1 | 2→−2 | 4→−1 | 6→−1 |
| | a | | | 1→−2 | 1→−3 | 2→−3 | 3→−4 |
| | 0 | | | 0→−3 | 0→−4 | 0→−5 | 0→−7 |
| | GAIN G | A | A/2 | A/3 | A/4 | A/5 | A/7 |
| RLL(2,X) {EFM, EFMP, M8—15, PR} | 2a+2b | | 4→+2 | 6→+3 | 8→+4 | 10→+5 | 14→+7 |
| | a+2b | 2→+1 | 3→+1 | 5→+2 | 7→+3 | 8→+3 | 11→+4 |
| | a+b | 1→ 0 | 2→ 0 | 3→ 0 | 4→ 0 | 5→ 0 | 7→ 0 |
| | a | 0→−1 | 1→−1 | 2→−1 | 1→−3 | 2→−3 | 3→−4 |
| | 0 | | 0→−2 | 0→−3 | 0→−4 | 0→−5 | 0→−7 |

REPRODUCING APPARATUS

BACKGROUND OF THE INVENTION

1. Field of the Invention

This invention generally relates to an apparatus for reproducing information from a recording medium such as an optical disc. This invention specifically relates to an information reproducing apparatus including a waveform equalization circuit for processing a reproduced signal of a run-length-limited code.

2. Description of the Related Art

Japanese patent application publication number 10-106161 discloses an optical information reproducing apparatus based on a PRML (partial response maximum likelihood) system. In the apparatus of Japanese patent application 10-106161, information of a run-length-limited code is reproduced from an optical disc through a reproducing section, and a transversal filter subjects the reproduced waveform to partial-response equalization. The output signal of the transversal filter is decoded into binary data by a maximum-likelihood decoder. The apparatus of Japanese patent application 10-106161 includes a parameter setting device which selects intersymbol-interference imparting values in the partial-response equalization in accordance with the characteristics of the reproduced waveform. Also, the parameter setting device sets tap coefficients of the transversal filter and a decision point signal level for the maximum-likelihood decoder as parameters in response to the selected intersymbol-interference imparting values.

The apparatus of Japanese patent application 10-106161 premises that the optical disc has predetermined pits (reference pits) representative of parameter-setting reference data. Accordingly, the apparatus of Japanese patent application 10-106161 fails to implement suitable waveform equalization for an optical disc which lacks such predetermined pits.

Japanese patent application publication number 7-192270 discloses an apparatus for reproducing a digital signal of a run-length-limited code from an optical disc. The apparatus of Japanese patent application 7-192270 uses a method suited for a high information recording density. The method in Japanese patent application 7-192270 performs ternary equalization whose objects are only an amplitude except for points corresponding to a data train provided with a minimum code inverting gap among points just before or just after the inverting position of a code and an amplitude at the inverting position of the code.

In the apparatus of Japanese patent application 7-192270, a signal is read from an optical disc by an optical head, and the read signal is applied through an amplifier to an equalizer. A decider following the equalizer discriminates the level of the output signal of the equalizer. The decider includes two comparators. The output signals of the comparators are fed to an error calculation circuit as level discrimination results. Since the decider includes the two comparators, the signal processing by the decider is relatively complicated and the level discrimination results provided by the decider tend to be adversely affected by noise and signal distortion.

SUMMARY OF THE INVENTION

It is an object of this invention to provide an improved reproducing apparatus.

A first aspect of this invention provides a reproducing apparatus comprising first means for reproducing a signal of a run-length-limited code from a recording medium; a transversal filter subjecting the signal reproduced by the first means to a partial-response waveform equalization to generate an equalization-resultant signal, the partial-response waveform equalization depending on tap coefficients; second means for detecting whether or not the signal reproduced by the first means corresponds to a peak point, and generating peak-point information in response to a result of said detecting; a delay circuit responsive to the peak-point information generated by the second means for outputting at least three successive samples of the peak-point information; a temporary decision device for calculating a temporary decision value of the equalization-resultant signal on the basis of a PR mode signal, an RLL mode signal, the successive samples of the peak-point information which are outputted from the delay circuit, and an actual value of the equalization-resultant signal, the PR mode signal representing a type of the partial-response waveform equalization, the RLL mode signal representing a type of the run-length-limited code; third means for calculating a difference between the temporary decision value of the equalization-resultant signal and the actual value thereof, and generating an error signal in response to the calculated difference; and fourth means for controlling the tap coefficients of the transversal filter in response to the error signal generated by the third means so as to minimize the error signal.

A second aspect of this invention is based on the first aspect thereof, and provides a reproducing apparatus wherein at least one of the PR mode signal and the RLL mode signal remains fixed.

A third aspect of this invention is based on the first aspect thereof, and provides a reproducing apparatus wherein the second means comprises an A/D converter for converting the signal reproduced by the first means into a digital signal, means for subjecting the digital signal generated by the A/D converter to a re-sampling process to generate a re-sampling resultant signal, means for feeding the re-sampling resultant signal to the transversal filter, and means for detecting whether or not the digital signal generated by the A/D converter corresponds to a peak point, and generating peak-point information in response to a result of said detecting.

A fourth aspect of this invention provides a reproducing apparatus comprising first means for reproducing a signal of a run-length-limited code from a recording medium; a transversal filter subjecting the signal reproduced by the first means to a partial-response waveform equalization to generate an equalization-resultant signal, the partial-response waveform equalization depending on tap coefficients; second means for detecting whether or not the equalization-resultant signal generated by the transversal filter corresponds to a peak point, and generating peak-point information in response to a result of said detecting; a delay circuit responsive to the peak-point information generated by the second means for outputting at least three successive samples of the peak-point information; a temporary decision device for calculating a temporary decision value of the equalization-resultant signal on the basis of a PR mode signal, an RLL mode signal, the successive samples of the peak-point information which are outputted from the delay circuit, and an actual value of the equalization-resultant signal, the PR mode signal representing a type of the partial-response waveform equalization, the RLL mode signal representing a type of the run-length-limited code; third means for calculating a difference between the temporary decision value of the equalization-resultant signal and the actual value thereof, and generating an error signal in response to the calculated difference; and fourth means for controlling the tap coefficients of the transversal filter in response to the error signal generated by the third means so as to minimize the error signal.

A fifth aspect of this invention is based on the fourth aspect thereof, and provides a reproducing apparatus wherein the second means comprises a peak detector for detecting a point at which a level represented by the equalization-resultant signal peaks, and generating the peak-point information in response to said detected point.

A sixth aspect of this invention is based on the fourth aspect thereof, and provides a reproducing apparatus wherein the second means comprises means for comparing a phase of a bit clock signal and a phase of a point at which a level represented by the equalization-resultant signal peaks, and generating a phase error signal in response to said phase comparing.

A seventh aspect of this invention is based on the first aspect thereof, and provides a reproducing apparatus wherein the type of the partial-response waveform equalization which is represented by the PR mode signal is expressed as PR (a, b, −b, −a), and the successive samples of the peak-point information are three successive samples, and wherein the temporary decision device comprises means for calculating a value P on the basis of the successive samples of the peak-point information, the value P being equal to a·G when at least one of the successive samples of the peak-point information except a central sample corresponds to a peak point, the value P being equal to (a+b)·G when the central sample among the successive samples of the peak-point information corresponds to a peak point, means for detecting a polarity of a level represented by the equalization-resultant signal which occurs when the central sample among the successive samples of the peak-point information corresponds to a peak point, means for calculating the temporary decision value on the basis of the calculated value P and the detected polarity, and means for setting the temporary decision value to "0" when none of the successive samples of the peak-point information corresponds to a peak point, where G denotes a gain factor.

An eighth aspect of this invention is based on the first aspect thereof, and provides a reproducing apparatus wherein the type of the partial-response waveform equalization which is represented by the PR mode signal is expressed as PR (a, b, −b, −a), and the successive samples of the peak-point information are five successive samples, and wherein the temporary decision device comprises means for calculating a value P on the basis of the successive samples of the peak-point information, the value P being equal to a·G when at least one of second and fourth samples among the successive samples of the peak-point information corresponds to a peak point, the value P being equal to (a+b)·G when the central sample among the successive samples of the peak-point information corresponds to a peak point, means for detecting a polarity of a level represented by the equalization-resultant signal which occurs when the central sample among the successive samples of the peak-point information corresponds to a peak point, means for calculating the temporary decision value on the basis of the calculated value P and the detected polarity, and means for setting the temporary decision value to "0" when none of second, third, and fourth samples among the successive samples of the peak-point information corresponds to a peak point, where G denotes a gain factor.

A ninth aspect of this invention is based on the first aspect thereof, and provides a reproducing apparatus wherein the first means comprises means for reproducing the signal of the run-length-limited code from the recording medium in a tangential push-pull method.

A tenth aspect of this invention provides a reproducing apparatus comprising first means for reproducing a signal of a run-length-limited code from a recording medium; a transversal filter subjecting the signal reproduced by the first means to a partial-response waveform equalization to generate an equalization-resultant signal, the partial-response waveform equalization depending on tap coefficients; a temporary decision device for calculating a temporary decision value of the equalization-resultant signal according to a temporary decision algorithm; second means for calculating a difference between the temporary decision value of the equalization-resultant signal and an actual value thereof, and generating an error signal in response to the calculated difference; third means for controlling the tap coefficients of the transversal filter in response to the error signal generated by the second means so as to minimize the error signal; and fourth means for changing the temporary decision algorithm used by the temporary decision device between a first predetermined algorithm corresponding to PR (a, b, b, a) waveform equalization and a second predetermined algorithm corresponding to PR (a, b, −b, −a) waveform equalization.

An eleventh aspect of this invention provides a reproducing apparatus comprising first means for reproducing a signal of a run-length-limited code from a recording medium; a transversal filter subjecting the signal reproduced by the first means to a partial-response waveform equalization to generate an equalization-resultant signal, the partial-response waveform equalization depending on tap coefficients; second means for detecting whether or not the signal reproduced by the first means corresponds to a zero-cross point, and generating 0-point information in response to a result of said detecting; third means for detecting whether or not the signal reproduced by the first means corresponds to a peak point, and generating peak-point information in response to a result of said detecting; fourth means for selecting one of the 0-point information generated by the second means and the peak-point information generated by the third means; a delay circuit responsive to the point information selected by the fourth means for outputting at least three successive samples of the selected point information; a temporary decision device for calculating a temporary decision value of the equalization-resultant signal on the basis of a PR mode signal, an RLL mode signal, the successive samples of the selected point information which are outputted from the delay circuit, and an actual value of the equalization-resultant signal according to a temporary decision algorithm, the PR mode signal representing a type of the partial-response waveform equalization, the RLL mode signal representing a type of the run-length-limited code; fifth means for calculating a difference between the temporary decision value of the equalization-resultant signal and the actual value thereof, and generating an error signal in response to the calculated difference; sixth means for controlling the tap coefficients of the transversal filter in response to the error signal generated by the fifth means so as to minimize the error signal; and seventh means for setting the temporary decision algorithm used by the temporary decision device to a first predetermined algorithm corresponding to PR (a, b, b, a) when the fourth means selects the 0-point information, and setting the temporary decision algorithm used by the temporary decision device to a second predetermined algorithm corresponding to PR (a, b, −b, −a) when the fourth means selects the peak-point information.

A twelfth aspect of this invention is based on the eleventh aspect thereof, and provides a reproducing apparatus wherein the second means and the third means comprise an A/D converter for converting the signal reproduced by the first means into a digital signal, means for subjecting the digital signal generated by the A/D converter to a re-sampling process to generate a re-sampling resultant signal, means for feeding the re-sampling resultant signal to the transversal filter, means for detecting whether or not the digital signal generated by the A/D converter corresponds to a zero-cross point, and generating 0-point information in response to a result of said detecting, and means for detecting whether or not the digital signal generated by the A/D converter corresponds to a peak point, and generating peak-point information in response to a result of said detecting.

A thirteenth aspect of this invention provides a reproducing apparatus comprising first means for reproducing a signal of a run-length-limited code from a recording medium; a transversal filter subjecting the signal reproduced by the first means to a partial-signal, response waveform equalization to generate an equalization-resultant the partial-response waveform equalization depending on tap coefficients; second means for detecting whether or not the equalization-resultant signal generated by the transversal filter corresponds to a zero-cross point, and generating 0-point information in response to a result of said detecting; third means for detecting whether or not the equalization-resultant signal generated by the transversal filter corresponds to a peak point, and generating peak-point information in response to a result of said detecting; fourth means for selecting one of the 0-point information generated by the second means and the peak-point information generated by the third means; a delay circuit responsive to the point information selected by the fourth means for outputting at least three successive samples of the selected point information; a temporary decision device for calculating a temporary decision value of the equalization-resultant signal on the basis of a PR mode signal, an RLL mode signal, the successive samples of the selected point information which are outputted from the delay circuit, and an actual value of the equalization-resultant signal according to a temporary decision algorithm, the PR mode signal representing a type of the partial-response waveform equalization, the RLL mode signal representing a type of the run-length-limited code; fifth means for calculating a difference between the temporary decision value of the equalization-resultant signal and the actual value thereof, and generating an error signal in response to the calculated difference; sixth means for controlling the tap coefficients of the transversal filter in response to the error signal generated by the fifth means so as to minimize the error signal; and seventh means for setting the temporary decision algorithm used by the temporary decision device to a first predetermined algorithm corresponding to PR (a, b, b, a) when the fourth means selects the 0-point information, and setting the temporary decision algorithm used by the temporary decision device to a second predetermined algorithm corresponding to PR (a, b, −b, −a) when the fourth means selects the peak-point information.

A fourteenth aspect of this invention is based on the tenth aspect thereof, and provides a reproducing apparatus further comprising a viterbi decoder for subjecting the equalization-resultant signal to a decoding process, and fifth means for changing the decoding process in response to whether the temporary decision algorithm is set to the first predetermined algorithm or the second predetermined algorithm.

A fifteenth aspect of this invention is based on the tenth aspect thereof, and provides a reproducing apparatus wherein the signal reproduced from the recording medium by the first means comprises a first signal and a second signal, and the temporary decision algorithm is set to the first predetermined algorithm for the first signal and is set to the second predetermined algorithm for the second signal.

A sixteenth aspect of this invention is based on the tenth aspect thereof, and provides a reproducing apparatus wherein the first means comprises means for reproducing the signal of the run-length-limited code from the recording medium in a tangential push-pull method.

BRIEF DESCRIPTION OF THE DRAWINGS

FIG. 2 is a block diagram of a reproducing apparatus according to a first embodiment of this invention.

FIG. 3 is a block diagram of a re-sampling DPLL section in FIG. 2.

FIG. 11 is a diagram of the relation between PR (a, b, −b, −a) characteristics and temporary decision result values for RLL (2, X).

FIG. 30 is a diagram of the relation among PR (a, b, b, a) characteristics, RLL modes, and temporary decision result values.

DETAILED DESCRIPTION OF THE INVENTION

A prior-art apparatus will be explained below for a better understanding of this invention.

Figure 1:
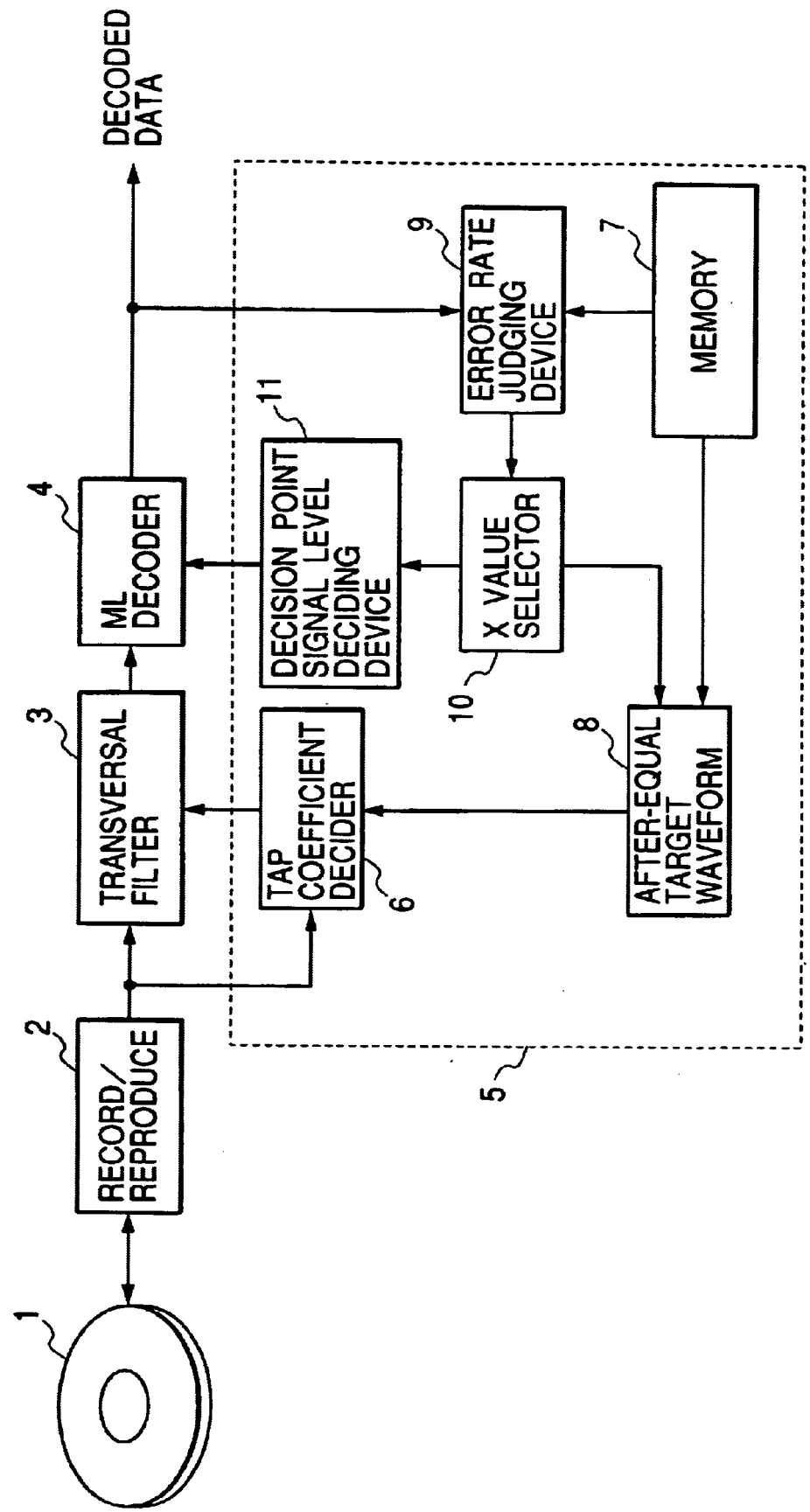
FIG. 1 is a block diagram of a prior-art reproducing apparatus.

FIG. 1 shows a prior-art reproducing apparatus disclosed in Japanese patent application publication number 10-106161. The prior-art apparatus in FIG. 1 includes a recording/reproducing section 2 which reproduces a signal of a run-length-limited code from an optical disc 1. The reproduced signal is fed to a transversal filter 3. The transversal filter 3 subjects the reproduced signal to partial-response (1, X, X, 1) waveform equalization on the basis of tap coefficients inputted from a tap coefficient deciding device 6 within a parameter setting device 5. The partial-response (1, X, X, 1) waveform equalization is shorted to the PR (1, X, X, 1) equalization.

In the prior-art apparatus of FIG. 1, the parameter setting device 5 includes an X-value selector 10 for selecting a value X, which is an intersymbol interference value in the PR (1, X, X, 1) equalization, on the basis of the characteristics of the reproduced waveform. Specifically, the X-value selector 10 sequentially determines values Xi (X1, X2, ...) in response to the result of judgment by an error rate judging device 9, and selects a value X from them which causes the error rate to be within an allowable range. In the parameter setting device 5, a target after-equalization waveform generator 8 produces a target after-equalization waveform in response to parameter-setting binary data from a memory 7 and the X value selected by the X-value selector 10. The target after-equalization waveform generator 8 informs the tap coefficient setting device 6 of the target after-equalization waveform.

The optical disc 1 has predetermined pits (reference pits) representing data corresponding to the parameter-setting binary data in the memory 7. The tap coefficient setting device 6 receives the output signal of the recording/reproducing section 2 which has a reproduced waveform originating from the predetermined pits. The tap coefficient setting device 6 calculates tap coefficients on the basis of the reproduced waveform and the target after-equalization waveform. The calculated tap coefficients are designed so that an actual after-equalization waveform corresponding to the reproduced waveform will agree with the target after-equalization waveform. The tap coefficient setting device 6 feeds the calculated tap coefficients to the transversal filter 3.

In the prior-art apparatus of FIG. 1, the parameter setting device 5 includes a decision point signal level deciding device 11 which is informed of the X value selected by the X-value selector 10. The device 11 calculates a decision point signal level on the basis of the selected X value. The device 11 feeds the calculated decision point signal level to a maximum-likelihood (ML) decoder 4.

The transversal filter 3 outputs a signal of an after-equalization reproduced waveform to the ML decoder 4. The device 4 decodes the after-equalization reproduced waveform into recovered binary data. The ML decoder 4 outputs the recovered binary data to an external device (not shown) and the error rate deciding device 9. The error rate deciding device 9 receives the parameter-setting binary data from the memory 7. The error rate deciding device 9 compares the recovered binary data with the parameter-setting binary data, thereby calculating an error rate. The device 9 decides whether or not the calculated error rate is within a predetermined allowable range. The error rate deciding device 9 informs the X-value selector 10 of the decision result. When the device 9 decides that the calculated error rate is within the predetermined allowable range, the present tap coefficients and the present decision point signal level are latched. In a later stage, the latched tap coefficients and decision point signal level will be used in the PR equalization and the ML decoding process according to a PR (1, X, X, 1) ML system.

The prior-art apparatus of FIG. 1 premises that the optical disc 1 has predetermined pits (reference pits) representing data corresponding to the parameter-setting binary data in the memory 7. Accordingly, the prior-art apparatus of FIG. 1 fails to implement suitable waveform equalization for an optical disc which lacks such predetermined pits.

First Embodiment

FIG. 2 shows a reproducing apparatus according to a first embodiment of this invention. With reference to FIG. 2, an optical disc 15 stores a signal of a run-length-limited code at a predetermined high recording density. An optical head 16 reads out the signal of the run-length-limited code from the optical disc in a suitable method such as a tangential push-pull method. The optical head 16 outputs the read-out signal to a direct-current blocking circuit (a DC blocking circuit) 17. The optical head 16 includes a photodetector, and an amplifier following the photodetector.

The circuit 17 blocks a direct-current component (a DC component) of the read-out signal, and passes only alternating-current components (AC components) thereof. The output signal of the DC blocking circuit 17 is applied to an A/D (analog-to-digital) converter 18A. The A/D converter 18A changes the output signal of the DC blocking circuit 17 into a corresponding digital signal. Specifically, the A/D converter 18A periodically samples the output signal of the DC blocking circuit 17 in response to a fixed-frequency system clock signal, and converts every resultant sample into a digital sample. The A/D converter 18A outputs the digital signal to a digital AGC (automatic gain control) circuit 18B. The AGC circuit 18B subjects the output signal of the A/D converter 18A to automatic gain control for providing a constant signal amplitude on a digital basis. The AGC circuit 18B outputs the resultant digital signal to a re-sampling DPLL section 19. The output signal of the AGC circuit 18B is referred to as a first digital signal. The position of the A/D converter 18A may be between the AGC circuit 18B and the re-sampling DPLL section 19, or between the optical head 16 and the DC blocking circuit 17.

The re-sampling DPLL section 19 converts the output signal (the first digital signal) of the AGC circuit 18B into a second digital (signal by a re-sampling process. A timing related to samples of the output signal (the first digital signal) of the AGC circuit 18B is determined by the system clock signal. A timing related to samples of the second digital signal is determined by a bit clock signal synchronized with the system clock signal. During the re-sampling process, the re-sampling DPLL section 19 generates samples of the second digital signal from samples of the first digital signal through at least one of interpolation and decimation.

The re-sampling DPLL section 19 includes a digital PLL (phase locked loop) circuit having a closed loop. The digital PLL circuit in the re-sampling DPLL section 19 generates a second digital signal on the basis of the output signal of the AGC circuit 18B. The second digital signal relates to a sampling frequency equal to a bit clock frequency. Specifically, samples of the second digital signal are generated from samples of the output signal of the AGC circuit 18B through a PLL re-sampling process based on at least one of interpolation and decimation. The re-sampling DPLL section 19 outputs the second digital signal to an adaptive equalization circuit 20. The second digital signal is also referred to as the main digital signal or the main output signal of the re-sampling DPLL section 19.

The re-sampling DPLL section 19 includes a peak detector for sensing every point (every peak point) at which the level represented by the second digital signal (the re-sampling-resultant signal) peaks in a positive side or a negative side. The peak detector generates peak-point information representative of every sensed point. Specifically, the peak detector decides whether or not every sample of the second digital signal corresponds to a positive or negative peak. Here, "negative peak" means "valley". The result of the decision is used in generating the peak-point information. In the re-sampling DPLL section 19, the timing of the re-sampling or the frequency and phase of the re-sampling are locked so that the levels represented by positive-peak-point-corresponding samples of the second digital signal will be maximized and the levels represented by negative-peak-point-corresponding samples of the second digital signal will be minimized. The re-sampling DPLL section 19 outputs the peak-point information to the adaptive equalization circuit 20 as the sub output signal.

As shown in FIG. 3, the re-sampling DPLL section 19 includes an interpolator 19A, a phase detector 19B, a loop filter 19C, and a timing signal generator 19D which are connected in a closed loop in that order. The interpolator 19A receives the output signal of the AGC circuit 18B. The interpolator 19A receives data point phase information and the bit clock signal from the timing signal generator 19D. The interpolator 19A estimates phase-point data samples of the second digital signal from samples of the output signal of the AGC circuit 18B through interpolation responsive to the data point phase information and the bit clock signal. Here, "phase" is defined relative to the bit clock signal. The sample estimation by the interpolator 19A corresponds to re-sampling. The interpolator 19A outputs the estimated phase-point data samples to the phase detector 19B. Also, the interpolator 19A outputs the estimated phase-point data samples to the adaptive equalization circuit 20 as the main digital signal (the second digital signal).

In the re-sampling DPLL section 19, the phase detector 19B includes a peak detector for sensing peak points from the phase-point data samples of the second digital signal. Specifically, the peak detector calculates the slope (differential) of the level represented by the second digital signal on the basis of two successive samples thereof. The peak detector senses every inversion of the polarity of the calculated slope. The peak detector senses a sample point immediately preceding the sample point corresponding to the sensed polarity inversion. The peak detector sets a peak-point information value PK to "1" for the sensed sample point. The peak detector sets the peak-point information value PK to "0" for the other sample points. Thus, the peak detector generates peak-point information representing the value PK. The peak detector in the phase detector 19B outputs the peak-point information to the adaptive equalization circuit 20 as the sub output signal.

In the re-sampling DPLL section 19, the phase detector 19B detects a phase error in response to the level represented by a sample of the second digital signal which corresponds to each of the sensed peak points. The phase detector 19B generates a signal representing the detected phase error. The phase detector 19B outputs the phase error signal to the loop filter 19C. The loop filter 19C integrates the phase error signal. The loop filter 19C outputs the integration-resultant signal to the timing signal generator 19D. The timing signal generator 19D produces the data point phase information and the bit clock signal in response to the output signal of the loop filter 19C. Thus, the data point phase information and the bit clock signal are controlled in response to the phase error signal, that is, the level represented by a sample of the second digital signal which corresponds to each sensed peak point. This control is designed to implement frequency and phase lock. Specifically, the frequency and phase of the re-sampling by the interpolator 19A are locked so that the levels represented by positive-peak-point-corresponding samples of the second digital signal will be maximized and the levels represented by negative-peak-point-corresponding samples of the second digital signal will be minimized.

The phase detector 19B may generate the phase error signal in the following way. The phase detector 19B refers to a sample of the second digital signal which corresponds to each of the sensed peak points. The phase detector 19B also refers to samples of the second digital signal which immediately precedes and follows each sensed peak-corresponding sample. The phase detector 19B calculates the difference between the levels represented by samples of the second digital signal which immediately precedes and follows each sensed peak-corresponding sample. The calculated difference is used as a detected phase error. The phase detector 19B generates the phase error signal in accordance with the calculated difference. The timing of the re-sampling by the interpolator 19A is controlled on a feedback basis so as to nullify the detected phase error.

The adaptive equalization circuit 20 subjects the main output signal of the re-sampling DPLL section 19 (that is, the second digital signal outputted from the re-sampling DPLL section 19) to automatic waveform equalization in response to the peak-point information fed from the re-sampling DPLL section 19. The automatic waveform equalization corresponds to a process of providing the signal in question with a partial-response (PR) characteristic. The adaptive equalization circuit 20 outputs the equalization-resultant signal to a decoding circuit 38. The decoding circuit 38 recovers original data from the output signal of the adaptive equalization circuit 20 through a viterbi decoding process. The decoding circuit 38 outputs the recovered data to an ECC (error checking and correcting) circuit 39.

The decoding circuit 38 includes a memory loaded with a plurality of candidate recovered data pieces. Also, the decoding circuit 38 includes a section for calculating branch metric values from samples of the output signal of the adaptive equalization circuit 20. Furthermore, the decoding circuit 38 includes a section for accumulating the branch metric values into path metric values respectively. The path metric values relate to the candidate recovered data pieces respectively. In addition, the decoding circuit 38 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data.

The ECC circuit 39 extracts an error correction code from the recovered data outputted by the decoding circuit 38. The ECC circuit 39 corrects errors in the recovered data in response to the error correction code. The ECC circuit 39 outputs the resultant recovered data.

Figure 4:
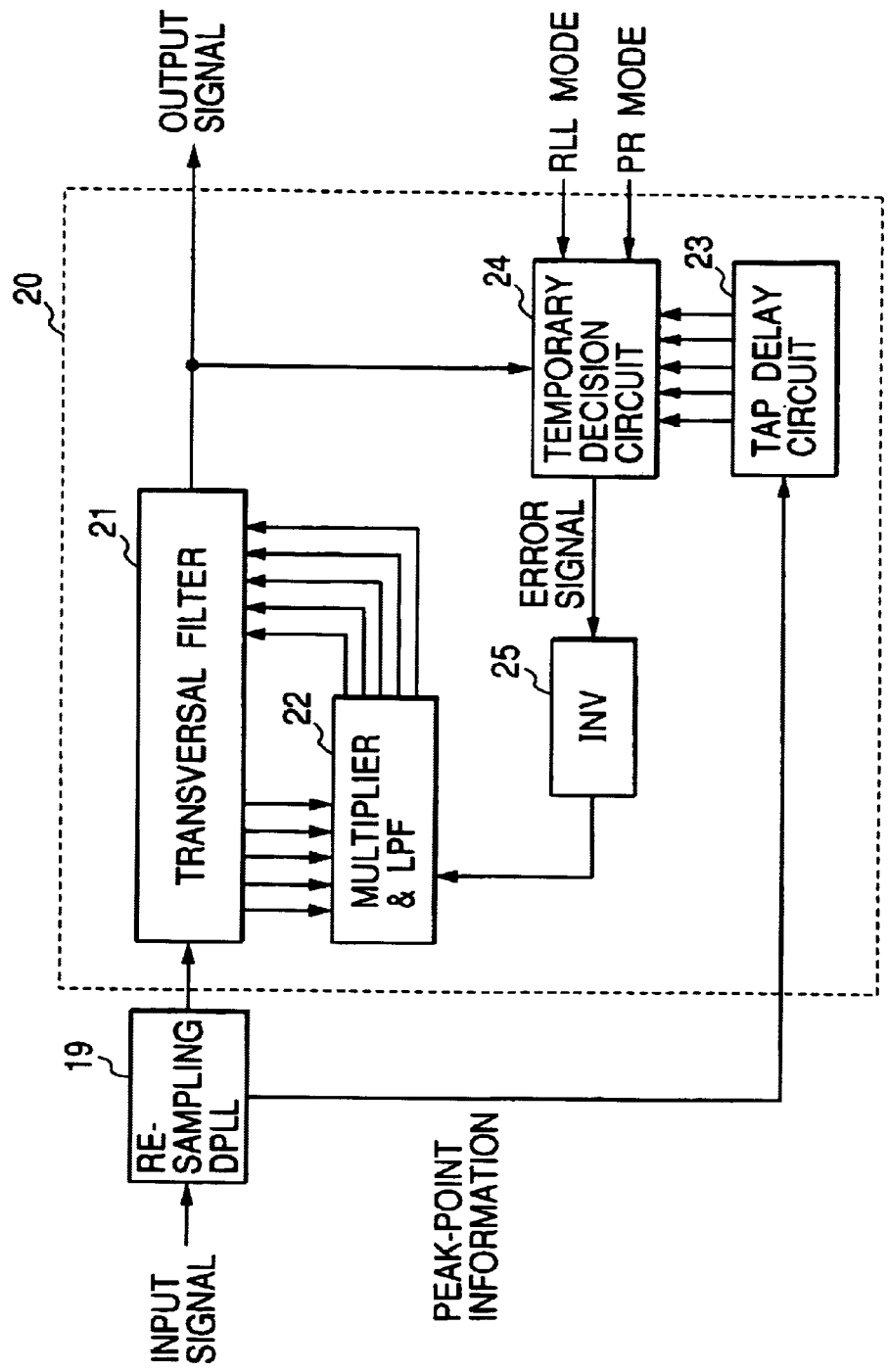
FIG. 4 is a block diagram of an adaptive equalization circuit in FIG. 2.

As shown in FIG. 4, the adaptive equalization circuit 20 includes a transversal filter 21, a multiplier and LPF (low pass filter) section 22, a tap delay circuit 23, a temporary decision circuit 24, and an inverter 25. The transversal filter 21 receives the main output signal (the second digital signal) from the re-sampling DPLL section 19. The transversal filter 21 is connected to the multiplier and LPF section 22, the temporary decision circuit 24, and the decoding circuit 38 (see FIG. 2). The tap delay circuit 23 receives the peak-point information from the re-sampling DPLL section 19. The tap delay circuit 23 is connected to the temporary decision circuit 24. The temporary decision circuit 24 is connected to the inverter 25. The inverter 25 is connected to the multiplier and LPF section 22.

The transversal filter 21 subjects the main output signal of the re-sampling DPLL section 19 (that is, the second digital signal) to PR waveform equalization responsive to tap coefficients. The multiplier and LPF section 22 varies the tap coefficients in response to an output signal of the inverter 25. The tap delay circuit 23 defers or delays the peak-point information by a plurality of different time intervals, and thereby converts the peak-point information into different tap delayed signals. The tap delay circuit 23 outputs the tap delayed signals to the temporary decision circuit 24. The temporary decision circuit 24 receives the output signal of the transversal filter 21. The temporary decision circuit 24 generates an error signal on the basis of the output signal of the transversal filter 21, the tap delayed signals from the tap delay circuit 23, an RLL (run-length-limited) mode signal, and a PR (partial-response) mode signal. The temporary decision circuit 24 outputs the error signal to the inverter 25. The device 25 inverts the error signal in polarity. The inverter 25 causes negative feedback. The inverter 25 outputs the inversion-resultant error signal to the multiplier and LPF section 22.

Figure 5:
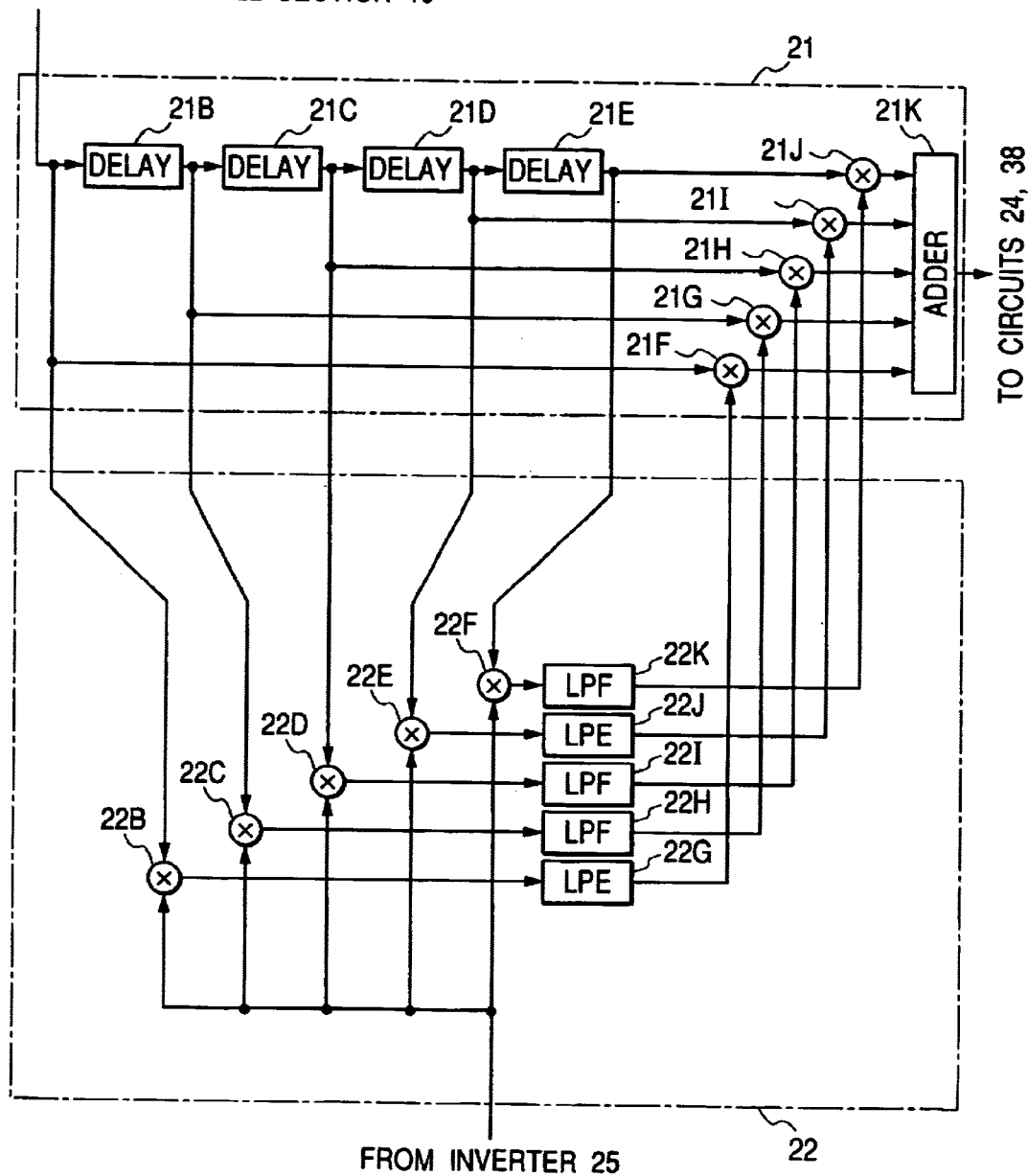
FIG. 5 is a block diagram of a portion of the adaptive equalization circuit in FIGS. 2 and 4.

As shown in FIG. 5, the transversal filter 21 includes delay circuits 21B, 21C, 21D, and 21E, multipliers 21F, 21G, 21H, 21I, and 21J, and an adder 21K.

The delay circuits 21B, 21C, 21D, and 21E are connected in cascade in that order. The input terminal of the delay circuit 21B is subjected to the main output signal of the re-sampling DPLL section 19 (that is, the second digital signal). Also, a first input terminal of the multiplier 21F is subjected to the main output signal of the re-sampling DPLL section 19. The input terminal of the delay circuit 21B is connected to the multiplier and LPF section 22 as a first tap in the transversal filter 21. The output terminals of the delay circuits 21B, 21C, 21D, and 21E form second, third, fourth, and fifth taps in the transversal filter 21, respectively. The output terminals of the delay circuits 21B, 21C, 21D, and 21E are connected to the multiplier and LPF section 22. Also, the output terminals of the delay circuits 21B, 21C, 21D, and 21E are connected to first input terminals of the multipliers 21G, 21H, 21I, and 21J, respectively. Second input terminals of the multipliers 21F, 21G, 21H, 21I, and 21J are connected to the multiplier and LPF section 22. The output terminals of the multipliers 21F, 21G, 21H, 21I, and 21J are connected to input terminals of the adder 21K. The output terminal of the adder 21K is connected to the decoding circuit 38 and the temporary decision circuit 24.

As shown in FIG. 5, the multiplier and LPF section 22 includes multipliers 22B, 22C, 22D, 22E, and 22F, and low pass filters 22G, 22H, 22I, 22J, and 22K.

A first input terminal of the multiplier 22B is connected to the input terminal of the delay circuit 21B within the transversal filter 21, that is, the first tap within the transversal filter 21. Thus, the first input terminal of the multiplier 22B is subjected to the main output signal of the re-sampling DPLL section 19 (that is, the second digital signal). First input terminals of the multipliers 22C, 22D, 22E, and 22F are connected to the output terminals of the delay circuits 21B, 21C, 21D, and 21E within the transversal filter 21, respectively. In other words, the first input terminals of the multipliers 22C, 22D, 22E, and 22F are connected to the second, third, fourth, and fifth taps within the transversal filter 21, respectively. Second input terminals of the multipliers 22B, 22C, 22D, 22E, and 22F are connected to the output terminal of the inverter 25. The output terminals of the multipliers 22B, 22C, 22D, 22E, and 22F are connected to the input terminals of the low pass filters 22G, 22H, 22I, 22J, and 22K, respectively. The output terminals of the low pass filters 22G, 22H, 22I, 22J, and 22K are connected to the second input terminals of the multipliers 21F, 21G, 21H, 21I, and 21J within the transversal filter 21, respectively.

In the transversal filter 21, the main output signal (the second digital signal) from the re-sampling DPLL section 19 successively passes through the delay circuits 21B, 21C, 21D, and 21E while being deferred or delayed thereby. Each of the delay circuits 21B, 21C, 21D, and 21E provides a predetermined delay corresponding to a 1-sample interval (a 1-bit-corresponding interval). The main output signal (the second digital signal) from the re-sampling DPLL section 19 is also applied to the multiplier 21F. The output signals of the delay circuits 21B, 21C, 21D, and 21E are applied to the multipliers 21G, 21H, 21I, and 21J, respectively. The multipliers 21F, 21G, 21H, 21I, and 21J receive output signals of the multiplier and LPF section 22 which represent tap coefficients respectively. The tap coefficients correspond to waveform equalization coefficients. The device 21F multiplies the main output signal (the second digital signal) from the re-sampling DPLL section 19 and the related tap coefficient, and outputs the multiplication-resultant signal to the adder 21K. The device 21G multiplies the output signal of the delay circuit 21B and the related tap coefficient, and outputs the multiplication-resultant signal to the adder 21K. The device 21H multiplies the output signal of the delay circuit 21C and the related tap coefficient, and outputs the multiplication-resultant signal to the adder 21K. The device 21I multiplies the output signal of the delay circuit 21D and the related tap coefficient, and outputs the multiplication-resultant signal to the adder 21K. The device 21J multiplies the output signal of the delay circuit 21E and the related tap coefficient, and outputs the multiplication-resultant signal to the adder 21K. The device 21K adds up the output signals of the multipliers 21F, 21G, 21H, 21I, and 21J into the equalization-resultant signal.

As previously mentioned, the multipliers 22B, 22C, 22D, 22E, and 22F in the multiplier and LPF section 22 receive the output signal of the inverter 25. As will be made clear later, the output signal of the inverter 25 indicates an amplitude error related to the output signal of the transversal filter 21. The input signal to the device 21B and the output signals from the devices 21B, 21C, 21D, and 21E within the transversal filter 21 are applied to the multipliers 22B, 22C, 22D, 22E, and 22F within the multiplier and LPF section 22 as tap output signals, respectively. The devices 22B, 22C, 22D, 22E, and 22F multiply the respective tap output signals of the transversal filter 21 by the amplitude error signal fed from the inverter 25. The multipliers 22B, 22C, 22D, 22E, and 22F output the multiplication-resultant signals to the low pass filters 22G, 22H, 22I, 22J, and 22K, respectively. The low pass filters 22G, 22H, 22I, 22J, and 22K remove high-frequency components from the output signals of the multipliers 22B, 22C, 22D, 22E, and 22F, and thereby process the output signals of the multipliers 22B, 22C, 22D, 22E, and 22F into signals representing the tap coefficients, respectively. The low pass filters 22G, 22H, 22I, 22J, and 22K output the tap coefficient signals to the multipliers 21F, 21G, 21H, 21I, and 21J within the transversal filter 21, respectively.

Figure 6:
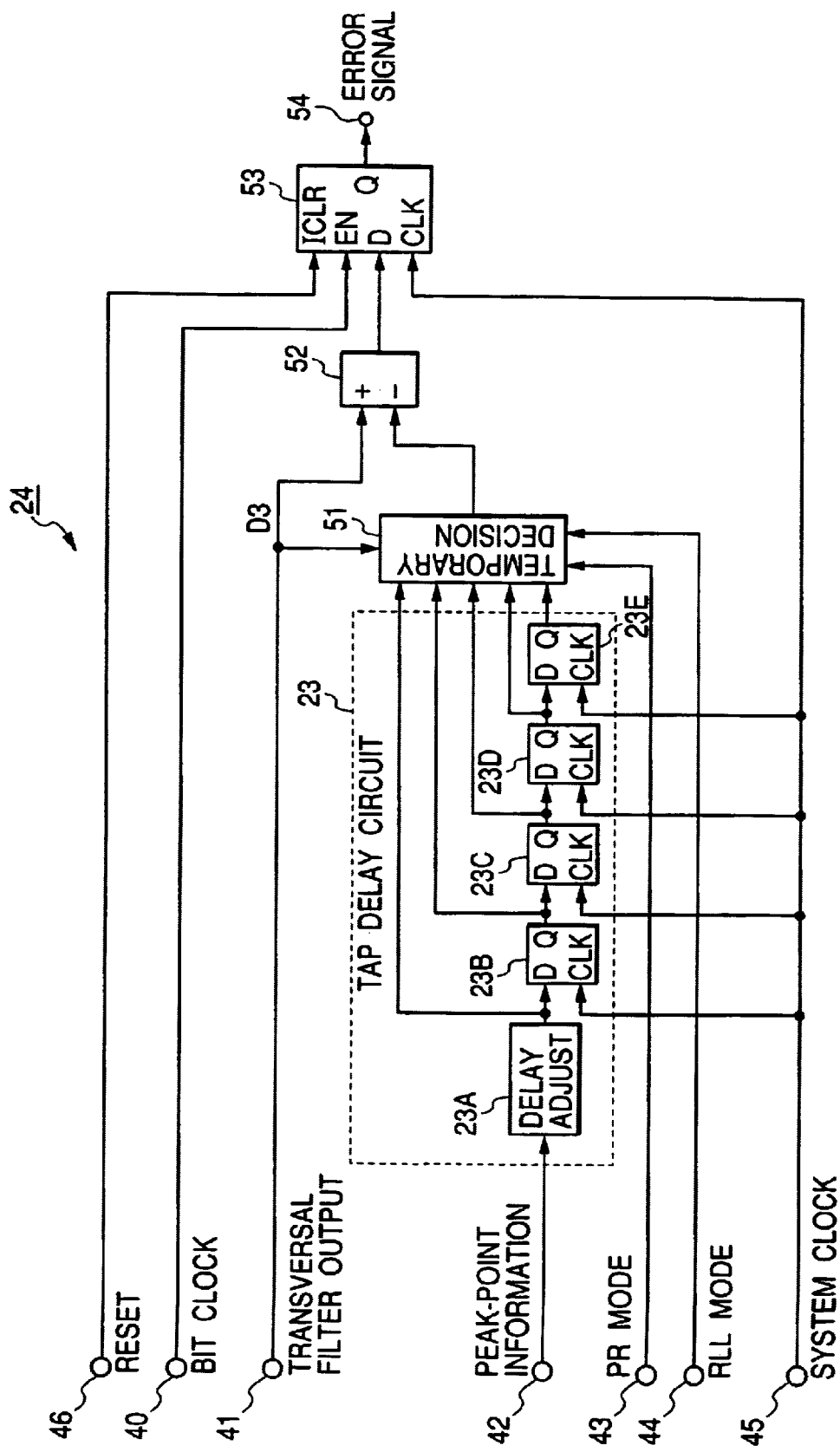
FIG. 6 is a block diagram of a temporary decision circuit and a tap delay circuit in FIG. 4.

As shown in FIG. 6, the temporary decision circuit 24 includes a temporary decision device 51, a subtracter 52, and a D flip-flop 53. The temporary decision device 51 is connected to the tap delay circuit 23. The temporary decision device 51 is connected to the output terminal of the transversal filter 21 via a terminal 41. A first input terminal of the subtracter 52 is connected to the output terminal of the transversal filter 21 via the terminal 41. A second input terminal of the subtracter 52 is connected to an output terminal of the temporary decision device 51. The output terminal of the subtracter 52 is connected to the D input terminal of the D flip-flop 53. The Q output terminal of the D flip-flop 53 is connected to the input terminal of the inverter 25 via a terminal 54. The temporary decision device 61 receives the equalization-resultant signal from the transversal filter 21 via the terminal 41.

The temporary decision device 51 receives the output signals of the tap delay circuit 23. The temporary decision device 51 receives the PR mode signal via a terminal 43. The PR mode signal will be mentioned in detail later. The temporary decision device 51 receives an RLL mode signal via a terminal 44. The RLL mode signal will be mentioned in detail later. The temporary decision device 51 includes a logic circuit which is designed to implement a temporary decision in response to the received signals according to a predetermined algorithm. The temporary decision device 51 may include a programmable signal processor. In this case, the predetermined algorithm is given as a program for controlling the signal processor. The temporary decision device 51 generates a signal representing the result of the temporary decision. The temporary decision device 51 outputs the temporary decision result signal to the subtracter 52. The subtracter 52 receives the equalization-resultant signal from the transversal filter 21 via the terminal 41. The device 52 subtracts the temporary decision result signal from the equalization-resultant signal, thereby generating an error signal (an amplitude error signal) corresponding to the difference therebetween. The subtracter 52 outputs the error signal to the D flip-flop 53. The system clock signal is applied to the clock terminal of the D flip-flop 53 via a terminal 45. The bit clock signal is applied to the enable terminal of the D flip-flop 53 via a terminal 40. Provided that the bit clock signal is in a high-level state, the D flip-flop 53 latches the error signal in synchronism with the system clock signal. Accordingly, the D flip-flop 53 latches the error signal for every period of the bit clock signal. The D flip-flop 53 outputs the latched error signal to the inverter 25 via the terminal 54. A reset signal is applied to the clear terminal of the D flip-flop 53 via a terminal 46.

As shown in FIG. 6, the tap delay circuit 23 includes a delay adjuster 23A, and D flip-flops 23B, 23C, 23D, and 23E. The delay adjuster 23A receives the peak-point information from the re-sampling DPLL section 19 via a terminal 42. The output terminal of the delay adjuster 23A is connected to the D input terminal of the D flip-flop 23B and the temporary decision device 51. The D flip-flops 23B, 23C, 23D, and 23E are connected in cascade in that order. The Q output terminals of the D flip-flops 23B, 23C, 23D, and 23E are connected to the temporary decision device 51. The system clock signal is applied to the clock terminals of the D flip-flops 23B, 23C, 23D, and 23E via the terminal 45. The bit clock signal is applied to the enable terminals of the D flip-flops 23B, 23C, 23D, and 23E via the terminal 40. The reset signal is applied to the clear terminals of the D flip-flops 23B, 23C, 23D, and 23E via the terminal 46.

In the tap delay circuit 23, the delay adjuster 23A operates to adjust delay time of the peak-point information.

Specifically, the delay adjuster 23A defers or delays the peak-point information by a fixed time interval or an adjustable time interval. The delay adjuster 23A outputs the resultant signal to the temporary decision device 51 and the D flip-flop 23B as a first tap delayed signal. The D flip-flop 23B delays the output signal of the delay adjuster 23A by a time interval equal to one period of the bit clock signal. The D flip-flop 23B outputs the resultant signal to the temporary decision device 51 and the D flip-flop 23C as a second tap delayed signal. The D flip-flop 23C delays the output signal of the D flip-flop 23B by a time interval equal to one period of the bit clock signal. The D flip-flop 23C outputs the resultant signal to the temporary decision device 51 and the D flip-flop 23D as a third tap delayed signal. The D flip-flop 23D delays the output signal of the D flip-flop 23C by a time interval equal to one period of the bit clock signal. The D flip-flop 23D outputs the resultant signal to the temporary decision device 51 and the D flip-flop 23E as a fourth tap delayed signal. The D flip-flop 23E delays the output signal of the D flip-flop 23D by a time interval equal to one period of the bit clock signal. The D flip-flop 23E outputs the resultant signal to the temporary decision device 51 as a fifth tap delayed signal. Accordingly, the tap delay circuit 23 outputs the first, second, third, fourth, and fifth tap delayed signals to the temporary decision device 51. The first, second, third, fourth, and fifth tap delayed signals are five successive 1-bit-corresponding segments or five successive samples of the peak-point information.

Partial-response (PR) characteristics will be explained below.

Figure 7:
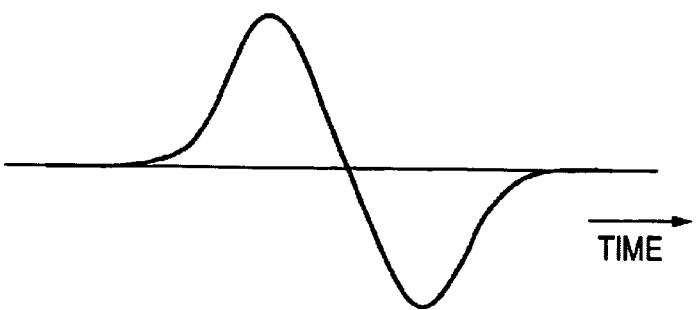
FIG. 7 is a time-domain diagram of an example of a differential type isolated waveform.
Figure 8:
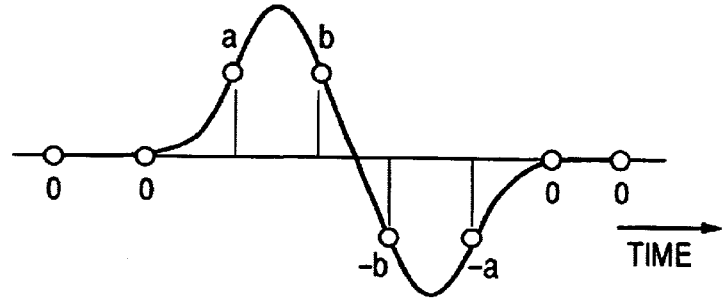
FIG. 8 is a time-domain diagram of a waveform (an equalization-resultant waveform) which results from equalization of the differential-type isolated waveform in FIG. 7.
Figure 9:
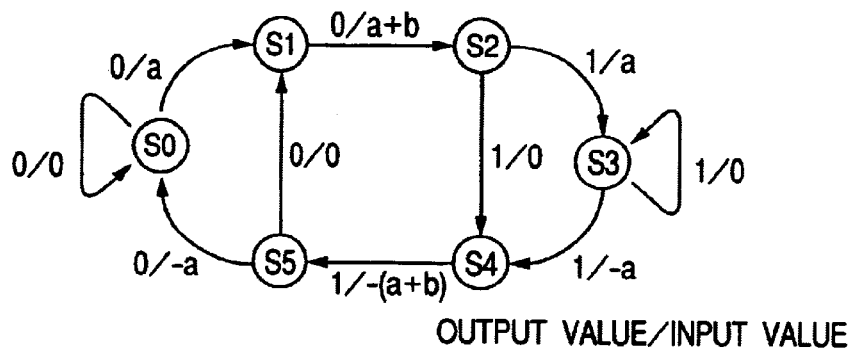
FIG. 9 is a diagram of signal state transitions regarding a partial-response (PR) characteristic and a run-length-limited (RLL) code corresponding to PR (a, b, −b, −a) and RLL (1, X) respectively.

When a differential-type isolated waveform in FIG. 7 is subjected to equalization accorded with the characteristic of PR (a, b, −b, −a), the equalization-resultant waveform in FIG. 8 is provided. A waveform resulting from the PR (a, b, −b, −a) equalization of a continuous waveform takes one of five different values, that is, "−(a+b)", "−a", "0", "a", and "a+b". It is assumed that the 5-value signal of the (1, X) run-length-limited code is inputted into a viterbi decoder. Here, the (1, X) run-length-limited code is prescribed by run-length limiting rules such that the minimum transition interval is equal to "2", and the maximum transition interval is equal to a given value X depending on the modulation format. The (1, X) run-length-limited code is also denoted as RLL (1, X). The state of a current sample of an original signal (an input value) and the state of a current sample of a reproduced signal (an output value) resulting from PR equalization are restricted by the states of previous samples. In the input signal, two successive samples of "1" will not occur. FIG. 9 shows signal state transitions available in this case.

In FIG. 9, S0, S1, S2, S3, S4, and S5 denote signal states determined by immediately-preceding output values. Transitions from the state S2 will be taken as an example. When the input value is "a", the output value becomes "1" and a transition to the state S3 from the state S2 occurs. When the input value is "0", the output value becomes "1" and a transition to the state S4 from the state S2 occurs. Under normal conditions, regarding the state S2, the input value different from "a" and "0" does not occur. Thus, the input value different from "a" and "0" is an error.

Figure 10:
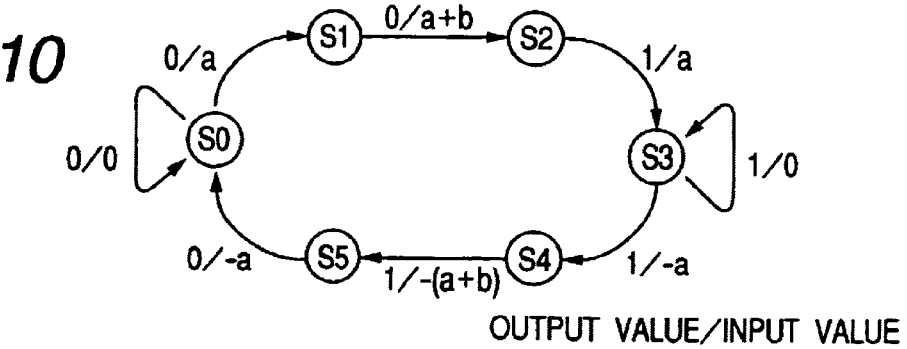
FIG. 10 is a diagram of signal state transitions regarding a partial-response (PR) characteristic and a run-length-limited (RLL) code corresponding to PR (a, b, −b, −a) and RLL (2, X) respectively.

FIG. 10 shows signal state transitions available in the case of a (2, X) run-length-limited code rather than the (1, X) run-length-limited code. Here, the (2, X) run-length-limited code is prescribed by run-length limiting rules such that the minimum transition interval is equal to "3", and the maximum transition interval is equal to a given value X depending on the modulation format. The (2, X) run-length-limited code is also denoted as RLL (2, X). The signal state transitions in FIG. 10 include neither a transition from the state S5 to the state S1 nor a transition from the state S2 to the state S4.

FIG. 11 shows the relation between the PR mode and the decision result value outputted from the temporary decision device 51 which occurs when the RLL mode (the run-length-limited mode) corresponds to RLL (2, X). The RLL mode is represented by the RLL mode signal inputted into the temporary decision device 51 via the terminal 44. The PR mode is represented by the PR mode signal inputted into the temporary decision device 51 via the terminal 43. The PR mode indicates the type of the PR waveform equalization implemented by the adaptive equalization circuit 20. The PR mode can be changed among identification numbers "1", "2", "3", "4", "5", and "6" assigned to PR (1, −1), PR (1, 1, −1, −1), PR (1, 2, −2, −1), PR (1, 3, −3, −1), PR (2, 3, −3, −2), and PR (3, 4, −4, −3) respectively. Here, PR (1, −1) is known as PR4 (partial response class IV) while PR (1, 1, −1, −1) is known as EPR4 (extended partial response class IV).

The waveform resulting from the PR (a, b, −b, −a) equalization takes one of five different values "−(a+b)", "−a", "0", "a", and "a+b". In FIG. 11, the decision result values outputted from the temporary decision device 51 in correspondence with these values "−(a+b)", −a, "a", and "a+b" are listed for PR (1, −1), PR (1, 1, −1, −1), PR (1, 2, −2, −1), PR (1, 3, −3, −1), PR (2, 3, −3, −2), and PR (3, 4, −4, −3).

In FIG. 11, PR (1, −1) means PR (a, b, −b, −a) in which a=0 and b=1. The gain or gain factor G is a multiplication coefficient A/(a+b) for normalizing the maximum (a+b) of the absolute decision result value, where "A" denotes an arbitrary level.

With reference back to FIG. 6, the equalization-resultant signal inputted from the transversal filter 21 via the terminal 41 is handled as a signal D3 occurring at the present moment. The present-moment signal D3 is applied to the temporary decision device 51 and the subtracter 52. The peak-point information is fed from the re-sampling DPLL section 19 to the tap delay circuit 23 via the terminal 42. The tap delay circuit 23 defers or delays the peak-point information by a plurality of different time intervals, and thereby converts the peak-point information into different tap delayed signals. The tap delay circuit 23 outputs the tap delayed signals to the temporary decision device 51. The temporary decision device 51 implements a temporary decision according to a predetermined algorithm. The temporary decision device 51 generates a signal representing the result of the temporary decision. The temporary decision device 51 outputs the temporary decision result signal to the subtracter 52. The subtracter 52 receives the present-moment signal D3. The device 52 subtracts the temporary decision result signal from the present-moment signal D3, thereby-generating an error signal corresponding to the difference therebetween. The subtracter 52 outputs the error signal to the D flip-flop 53. The D flip-flop 53 latches the error signal. The D flip-flop 53 outputs the latched error signal to the inverter 25 via the terminal 54.

With reference to FIGS. 4 and 5, the device 25 inverts the error signal in polarity. The inverter 25 outputs the inversion-resultant error signal to the multipliers 22B, 22C, 22D, 22E, and 22F in the multiplier and LPF section 22. The tap output signals of the transversal filter 21 are applied to the multipliers 22B, 22C, 22D, 22E, and 22F in the multiplier and LPF section 22, respectively. The devices 22B, 22C, 22D, 22E, and 22F multiply the respective tap output signals by the inversion-resultant error signal. The multipliers 22B, 22C, 22D, 22E, and 22F output the multiplication-resultant signals to the low pass filters 22G, 22H, 22I, 22J, and 22K, respectively. The low pass filters 22G, 22H, 22I, 22J, and 22K remove high-frequency components from the output signals of the multipliers 22B, 22C, 22D, 22E, and 22F, and thus process the output signals of the multipliers 22B, 22C, 22D, 22E, and 22F into signals representing tap coefficients, respectively. The low pass filters 22G, 22H, 22I, 22J, and 22K output the tap coefficient signals to the multipliers 21F, 21G, 21H, 21I, and 21J within the transversal filter 21, respectively. The tap coefficients represented by the output signals of the low pass filters 22G, 22H, 22I, 22J, and 22K cause the equalization by the transversal filter 21 to nullify or minimize the error signal generated by the subtracter 52 within the temporary decision circuit 24. In this way, the tap coefficients used by the transversal filter 21 are controlled on a feedback basis to nullify or minimize the error signal generated by the subtracter 52.

The peak-point information whose value PK is "1" indicates a peak point. The peak-point information value PK being "1" corresponds to the value "a+b" or the value "−(a+b)" in FIGS. 9 and 10, and occurs in the transition from the state S1 to the state S2 or the transition from the state S4 to the state S5.

In FIGS. 9 and 10, the polarity of a peak can be decided by the polarity of a corresponding sample point. In the case where the interval from one peak point to the next peak point is known, or in the case where the number of transitions occurring for the interval from the state S2 to the state S5 or the interval from the state S5 to the state S2 is known, the path is settled and hence values to be taken at respective sample points are definite.

In FIGS. 9 and 10, the values different from "a+b" and "−(a+b)" do not correspond to the peak point. For the values different from "a+b" and "−(a+b)", the peak-point information value PK is equal to "0". Two or more peak points (PK=1) will not occur in succession. In the case of RLL (2, X), at least two "0" points exist between two adjacent peak points (PK=1).

Figure 12:
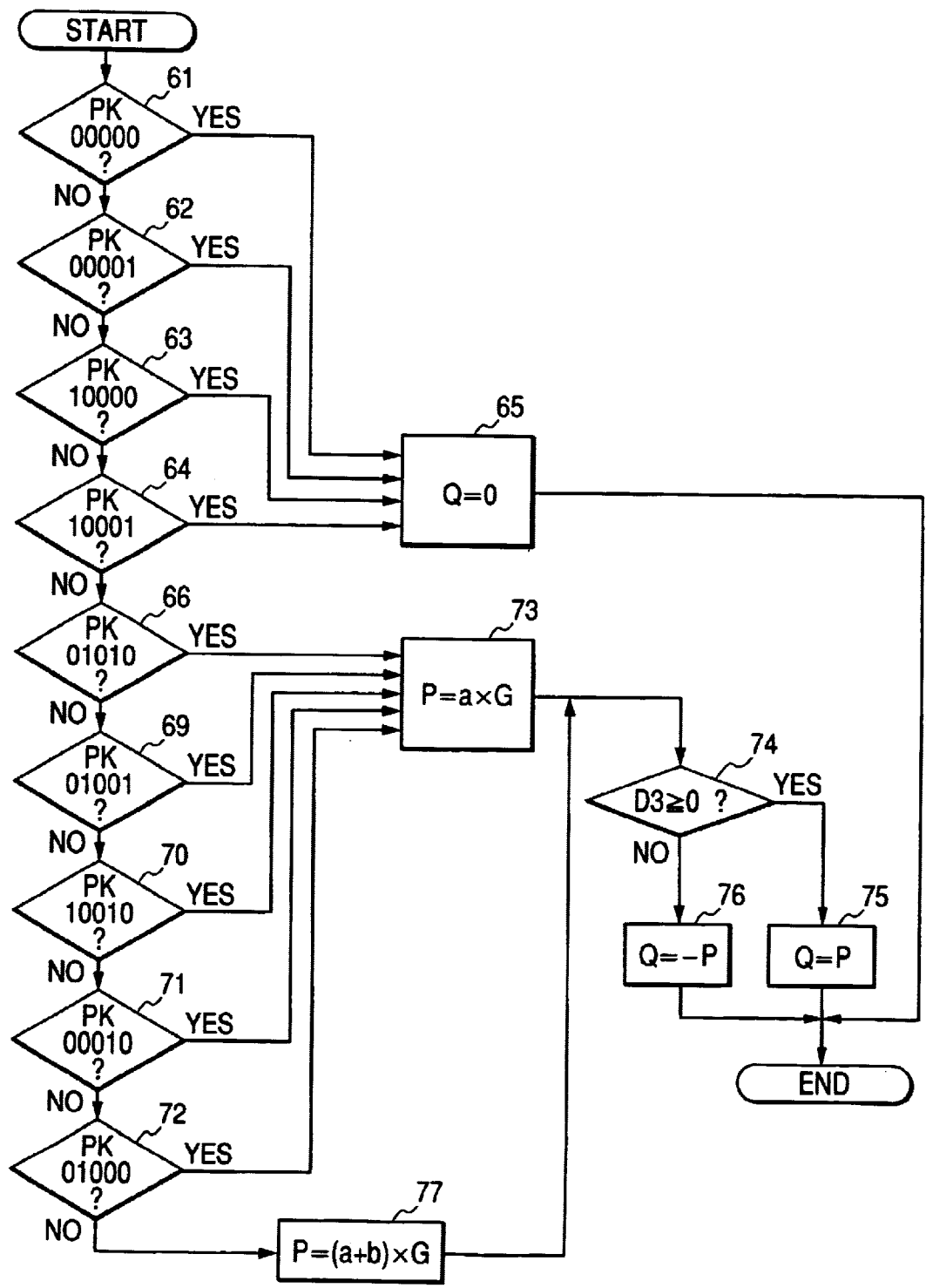
FIG. 12 is a flowchart of an algorithm of a temporary decision by a temporary decision device in FIG. 6.

FIG. 12 is a flowchart of the algorithm of the temporary decision for RLL (2, X) which is implemented by the temporary decision device 51. The temporary decision is executed for every period of the bit clock signal. The algorithm in FIG. 12 refers to five successive peak-point information values PK represented by the output signals of the tap delay circuit 23. The central-place value (the third-place value) among the five successive peak-point information values PK corresponds to a sample point of interest.

As shown in FIG. 12, a first step 61 of the algorithm decides whether or not five successive peak-point information values PK represented by the output signals of the tap delay circuit 23 are "00000". When the five successive peak-point information values PK are "00000", the algorithm advances from the step 61 to a step 65. Otherwise, the algorithm advances from the step 61 to a step 62.

The step 62 decides whether or not the five successive peak-point information values PK are "00001". When the five successive peak-point information values PK are "00001", the algorithm advances from the step 62 to the step 65. Otherwise, the algorithm advances from the step 62 to a step 63.

The step 63 decides whether or not the five successive peak-point information values PK are "10000". When the five successive peak-point information values PK are "10000", the algorithm advances from the step 63 to the step 65. Otherwise, the algorithm advances from the step 63 to a step 64.

The step 64 decides whether or not the five successive peak-point information values PK are "10001". When the five successive peak-point information values PK are "10001", the algorithm advances from the step 64 to the step 65. Otherwise, the algorithm advances from the step 64 to a step 66.

In the case where the five successive peak-point information values PK are "00000", "00001", "10000", or "10001", the before-equalization signal waveform is fixed to a signal level of "0" for a long time interval centered at the sample point of interest. Thus, in this case, the step 65 sets a temporary decision level (a temporary decision value or a temporary decision result value) Q to "0". Specifically, the step 65 calculates the temporary decision level Q according to the following equation.

$$Q=0 \tag{1}$$

After the step 65, the current execution cycle of the temporary decision ends.

The step 66 decides whether or not the five successive peak-point information values PK are "01010". When the five successive peak-point information values PK are "01010", the algorithm advances from the step 66 to a step 73. Otherwise, the algorithm advances from the step 66 to a step 69.

The step 69 decides whether or not the five successive peak-point information values PK are "01001". When the five successive peak-point information values PK are "01001", the algorithm advances from the step 69 to the step 73. Otherwise, the algorithm advances from the step 69 to a step 70.

The step 70 decides whether or not the five successive peak-point information values PK are "10010". When the five successive peak-point information values PK are "10010", the algorithm advances from the step 70 to the step 73. Otherwise, the algorithm advances from the step 70 to a step 71.

The step 71 decides whether or not the five successive peak-point information values PK are "00010". When the five successive peak-point information values PK are "00010", the algorithm advances from the step 71 to the step 73. Otherwise, the algorithm advances from the step 71 to a step 72.

The step 72 decides whether or not the five successive peak-point information values PK are "01000". When the five successive peak-point information values PK are "01000", the algorithm advances from the step 72 to the step 73. Otherwise, the algorithm advances from the step 72 to a step 77.

In the case where the five successive peak-point information values PK are "01010", "01001", "10010", "00010", or "01000", the sample point of interest (the central sample point) does not correspond to a peak while at least one of the two sample points immediately neighboring the sample point of interest corresponds to a peak. In this case, the step 73 calculates an intermediate value P according to the following equation.

$$P=a \cdot G \tag{2}$$

where G denotes the gain (the gain factor) shown in FIG. 11, and "a" denotes the value in PR (a, b, −b, −a). The values G and "a" are known values designated by the PR mode signal and the RLL mode signal. After the step 73, the algorithm advances to a step 74.

In the case where the five successive peak-point information values PK differ from "00000", "00001", "10000", "10001", "01010", "01001", "10010", "00010", and "01000" (for example, in the case where the sample point of interest or the central-place sample point corresponds to a peak), the step 77 calculates the intermediate value P according to the following equation.

$$P = (a+b) \cdot G \qquad (3)$$

where G denotes the gain (the gain factor) shown in FIG. 11, and "a" and "b" denote the values in PR (a, b, −b, −a). The values G, "a", and "b" are known values designated by the PR mode signal and the RLL mode signal. After the step 77, the algorithm advances to the step 74.

The step 74 detects the polarity of the present-moment signal D3. Specifically, the step 74 decides whether or not the present-moment signal D3 is smaller than "0". When the present-moment signal D3 is equal to or greater than "0", the algorithm advances from the step 74 to a step 75. When the present-moment signal D3 is smaller than "0", the algorithm advances from the step 74 to a step 76.

The step 75 sets the temporary decision level Q to the value P. In other words, the step 75 executes the statement "Q=P". On the other hand, the step 76 sets the temporary decision level Q to the executes the statement "Q=−P". After the steps 75 and 76, the current execution cycle of the temporary decision ends.

The temporary decision device 51 outputs a signal representative of the temporary decision level (the temporary decision value) Q to the subtracter 52 as a temporary decision result signal. The temporary decision value Q is determined on the basis of one of the previously-indicated equations (1), (2), and (3). Accordingly, the equalization by the transversal filter 21 is based on one of the equations (1), (2), and (3). The equalization based on one of the equations (1), (2), and (3) is periodically executed in response to the polarity of the present-moment signal D3 at a timing of the central-place one (the third-place one) among five successive peak-point information values PK.

Figure 13:
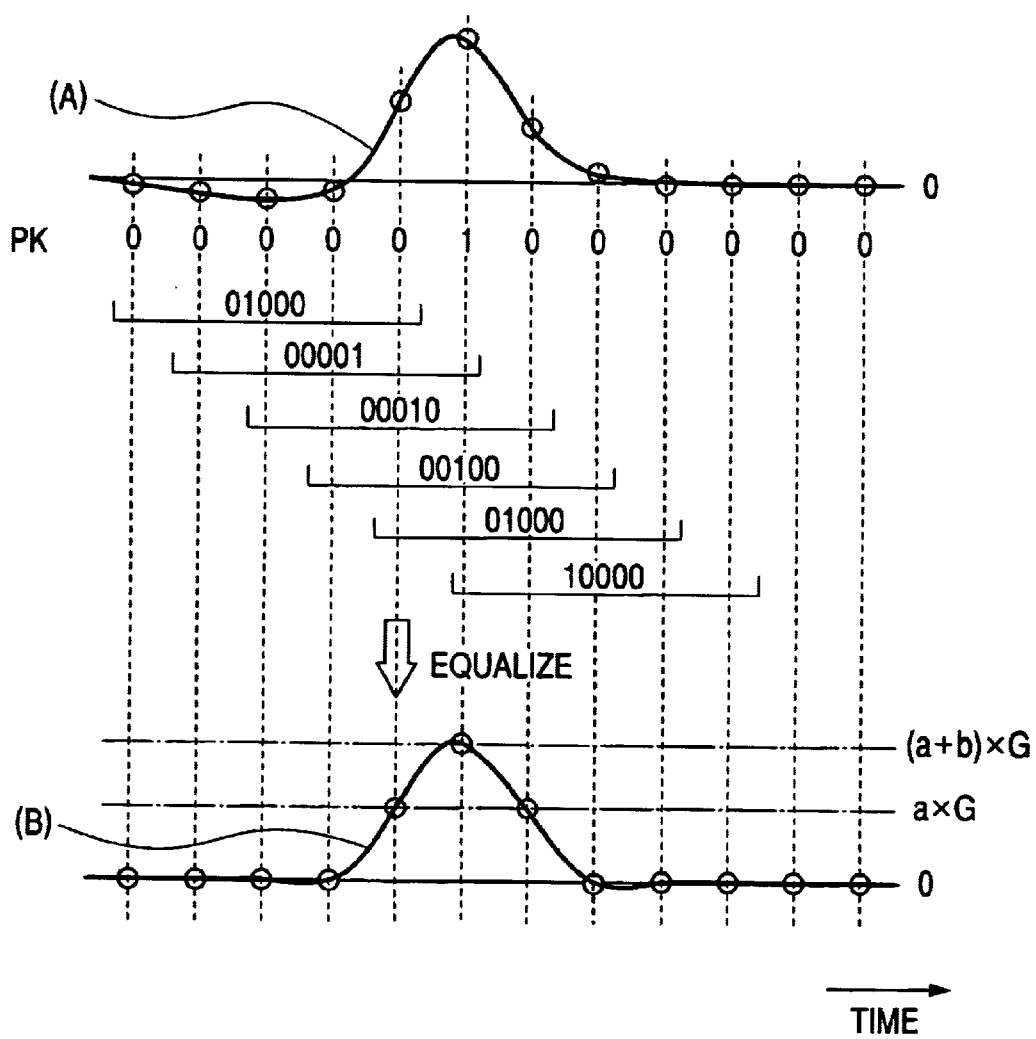
FIG. 13 is a time-domain diagram of a first example of an original waveform and an equalization-resultant waveform in the first embodiment of this invention.

FIG. 13 shows a first example of a before-equalization waveform (A) represented by a signal inputted into the adaptive equalization circuit 20, and a first example of an after-equalization waveform or an equalization-resultant waveform (B) originating from the before equalization waveform (A) and being represented by a signal outputted from the adaptive equalization circuit 20. In FIG. 13, the character "○" denotes sample points for the PR equalization by the transversal filter 21. FIG. 13 also shows a first example of a time-domain change of the peak-point information value PK which corresponds to the before-equalization waveform (A). The value PK is represented by the peak-point information fed to the adaptive equalization circuit 20 from the re-sampling DPLL section 19. According to the before-equalization waveform (A), five successive peak-point information values PK change as "00000"→"00001"→"00010"→"001000"→"10000".

With reference to FIG. 13, when the five successive peak-point information values PK are "00000", "10000", or "00001", the equalization result level is set to "0" on the basis of the previously-indicated equation (1). When the five successive peak-point information values PK are "01000" or "00010", the polarity of the present-moment signal D3 at the timing of the central-place one among the five successive peak-point information values PK is positive and hence the equalization result level is set to "a·G" on the basis of the previously-indicated equation (2) and the equation "Q=P". When the five successive peak-point information values PK are "00100", the polarity of the present-moment signal D3 at the timing of the central-place one among the five successive peak-point information values PK is positive and hence the equalization result level is set to "(a+b)·G" on the basis of the previously-indicated equation (3) and the equation "Q=P". Accordingly, the after-equalization waveform (B) is similar to the before-equalization waveform (A).

Figure 14:
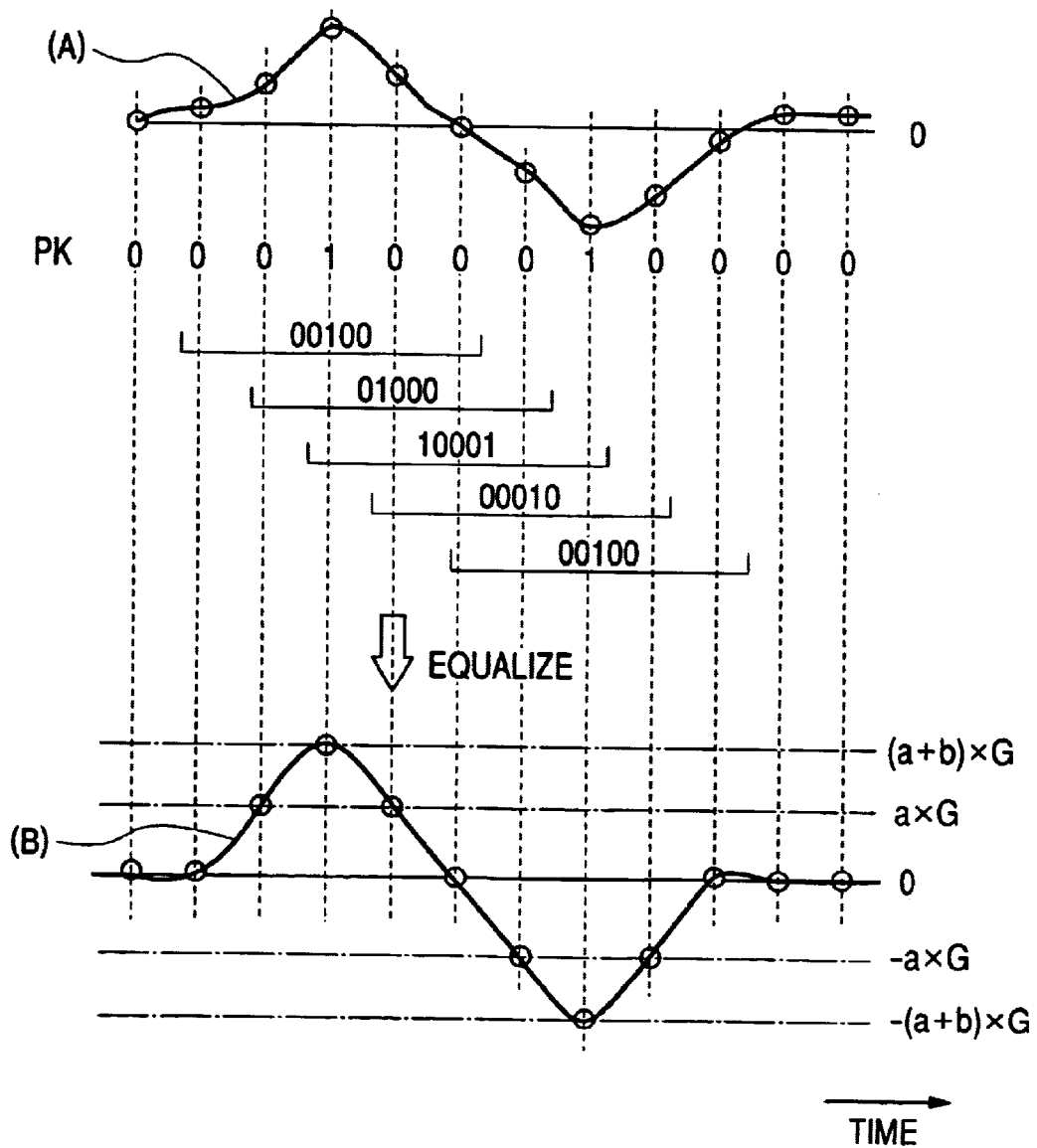
FIG. 14 is a time-domain diagram of a second example of an original waveform and an equalization-resultant waveform in the first embodiment of this invention.

FIG. 14 shows a second example of the before-equalization waveform (A), a second example of the after-equalization waveform (B), and a second example of the time-domain change of the peak-point information value PK. According to the before-equalization waveform (A) in FIG. 14, five successive peak-point information values PK change as "00100"→"01000"→"10001"→"00010"→"00100".

With reference to FIG. 14, when the five successive peak-point information values PK assume "00100" for the first time, the polarity of the present-moment signal D3 at the timing of the central-place one among the five successive peak-point information values PK is positive and hence the equalization result level is set to "(a+b)·G" on the basis of the previously-indicated equation (3) and the equation "Q=P". When the five successive peak-point information values PK are "01000", the polarity of the present-moment signal D3 at the timing of the central-place one among the five successive peak-point information values PK is positive and hence the equalization result level is set to "a·G" on the basis of the previously-indicated equation (2) and the equation "Q=P". When the five successive peak-point information values PK are "10001", the equalization result level is set to "0" on the basis of the previously-indicated equation (1). When the five successive peak-point information values PK are "00010", the polarity of the present-moment signal D3 at the timing of the central-place one among the five successive peak-point information values PK is negative and hence the equalization result level is set to "−a·G" on the basis of the previously-indicated equation (2) and the equation "Q=−P". When the five successive peak-point information values PK assume "00100" for the second time, the polarity of the present-moment signal D3 at the timing of the central-place one among the five successive peak-point information values PK is negative and hence the equalization result level is set to "−(a+b)·G" on the basis of the previously-indicated equation (3) and the equation "Q=−P". Accordingly, the after-equalization waveform (B) is similar to the before-equalization waveform (A).

Figure 15:
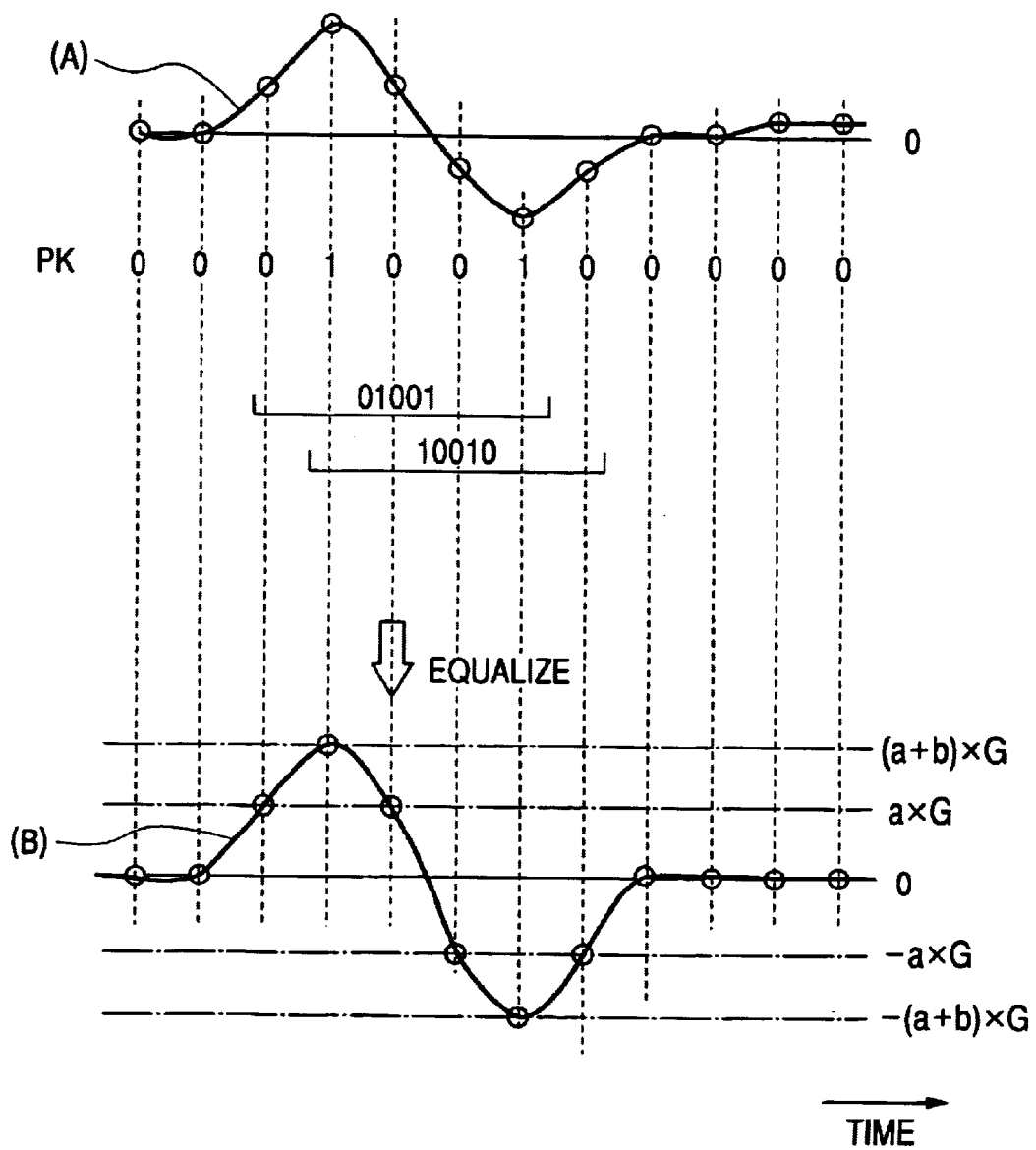
FIG. 15 is a time-domain diagram of a third example of an original waveform and an equalization-resultant waveform in the first embodiment of this invention.

FIG. 15 shows a third example of the before-equalization waveform (A), a third example of the after-equalization waveform (B), and a third example of the time-domain change of the peak-point information value PK. According to the before-equalization waveform (A) in FIG. 15, five successive peak-point information values PK change as "01001"→"10010".

With reference to FIG. 15, when the five successive peak-point information values PK are "01001", the polarity of the present-moment signal D3 at the timing of the central-place one among the five successive peak-point information values PK is positive and hence the equalization result level is set to "a·G" on the basis of the previously-indicated equation (2) and the equation "Q=P". When the five successive peak-point information values PK are "10010", the polarity of the present-moment signal D3 at the timing of the central-place one among the five successive peak-point information values PK is negative and hence the equalization result level is set to "−a·G" on the basis of the previously-indicated equation (2) and the equation "Q=−P". Accordingly, the after-equalization waveform (B) is similar to the before-equalization waveform (A).

The waveform equalization is executed in response to five successive peak-point information values and also the state transition diagram of FIG. 9 or FIG. 10. Therefore, the executed waveform equalization is less adversely affected by the level represented by a current signal sample. Thus, the executed waveform equalization is reliable. Furthermore, the executed waveform equalization can be changed among different PR equalizations in response to the PR mode signal and the RLL mode signal. Operation of the temporary decision device 51 for RLL (1, X) is similar to that for RLL (2, X) since the RLL (1, X signal state transitions in FIG. 9 are similar to the RLL (2, X) signal state transitions in FIG. 10.

Figure 16:
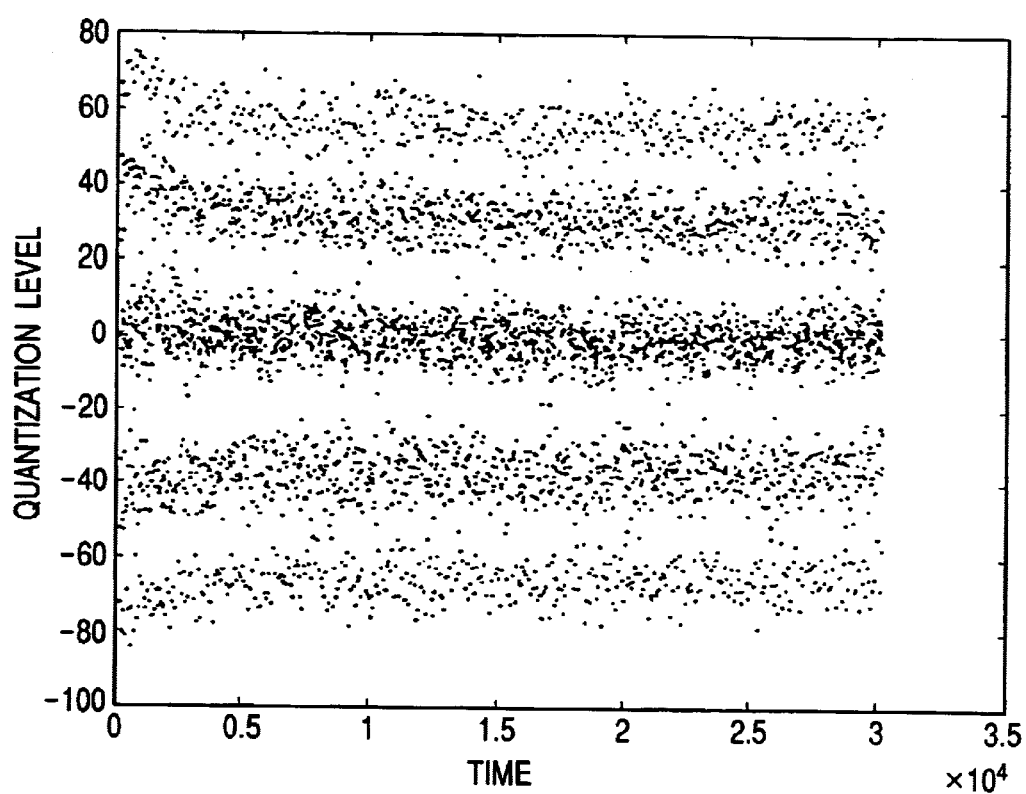
FIG. 16 is a time-domain diagram of samples of an equalization-resultant signal regarding RLL (2, X) and PR (1, 1, −1, −1).

Experiments were carried out. During the experiments, a test signal of RLL (2, X) was inputted into the reproducing apparatus of FIG. 2 for PR (1, 1, −1, −1). The test signal was processed by the reproducing apparatus of FIG. 2 into an equalization-resultant signal which appeared at the output terminal of the adaptive equalization circuit 20. FIG. 16 shows time-domain conditions of the equalization-resultant signal. In FIG. 16, the abscissa denotes time elapsed, and the ordinate denotes the quantization levels of signal samples. As shown in FIG. 16, samples of the equalization-resultant signal quickly converged on five different levels corresponding to "a+b", "a", "0", "−a", and "−(a+b)".

Second Embodiment

Figure 17:
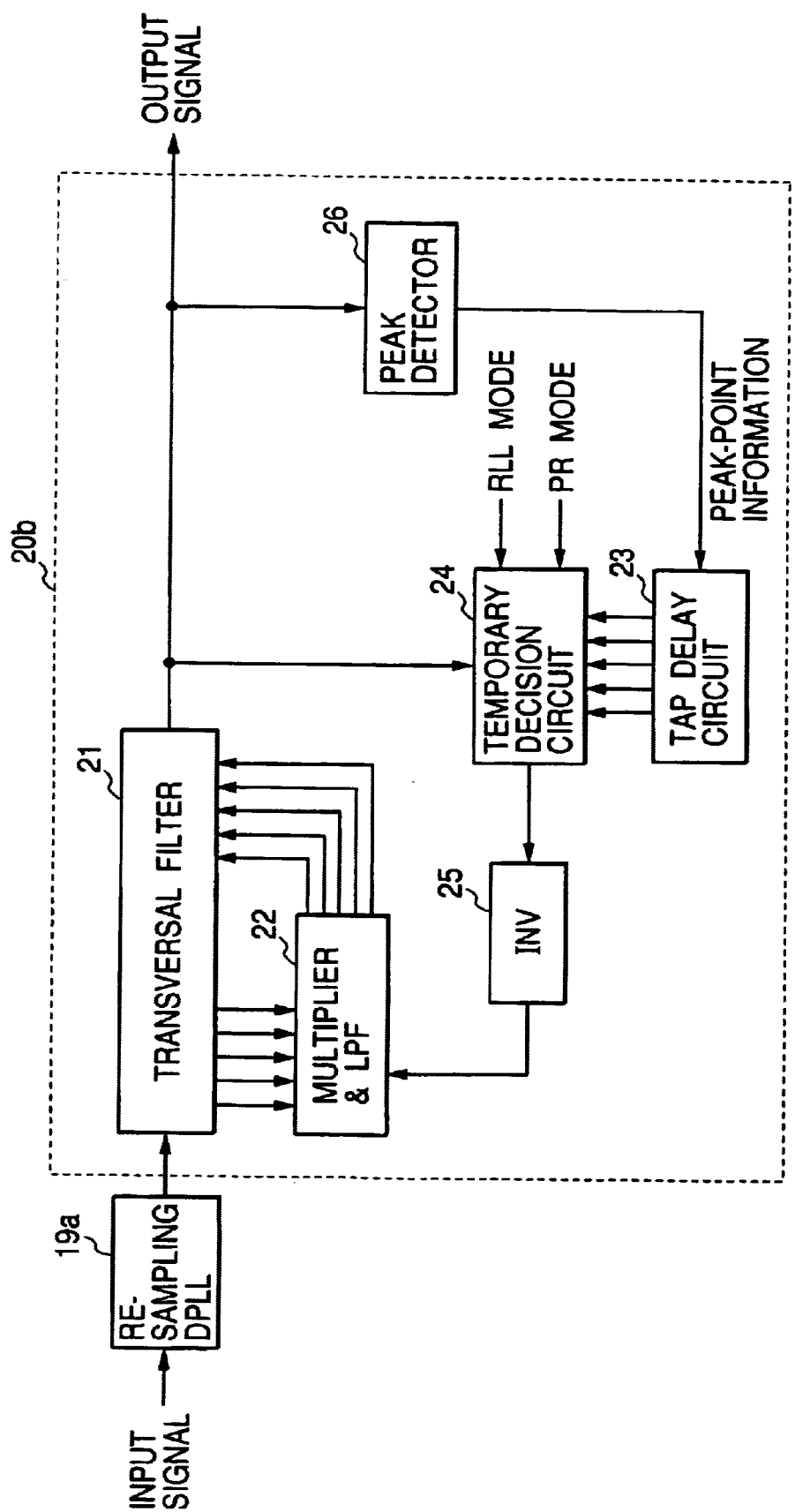
FIG. 17 is a block diagram of a portion of a reproducing apparatus according to a second embodiment of this invention.

FIG. 17 shows a portion of a reproducing apparatus according to a second embodiment of this invention. The reproducing apparatus in FIG. 17 is similar to the reproducing apparatus in FIG. 4 except that a re-sampling DPLL section 19a and an adaptive equalization circuit 20b replace the re-sampling DPLL section 19 and the adaptive equalization circuit 20 (see FIG. 4) respectively.

With reference to FIG. 17, the re-sampling DPLL section 19a does not generate peak-point information. The re-sampling DPLL section 19a generates a main digital signal (a second digital signal) from the output signal of the AGC circuit 18B (see FIG. 2) by a PLL-based re-sampling process. The re-sampling DPLL section 19a feeds the main digital signal to a transversal filter 21 within the adaptive equalization circuit 20b.

The adaptive equalization circuit 20b is similar to the adaptive equalization circuit 20 (see FIGS. 2 and 4) except for the following point. The adaptive equalization circuit 20b includes a peak detector 26. The input terminal of the peak detector 26 is connected to the output terminal of the transversal filter 21. The output terminal of the peak detector 26 is connected to the input terminal of a tap delay circuit 23.

The peak detector 26 calculates the slope (differential) of the level represented by the output signal of the transversal filter 21 on the basis of two successive samples thereof. The peak detector 26 senses every inversion of the polarity of the calculated slope. The peak detector 26 examines the two slopes at sample points immediately preceding and immediately following the polarity-inversion moment respectively. The peak detector 26 selects one from the two slopes which is closer to "0". The peak detector 26 sets a peak-point information value PK to "1" for the selected slope.

The peak detector 26 sets the peak-point information value PK to "0" for the other slope (the unselected slope). In the absence of a sensed polarity inversion, the peak detector 26 continuously sets the peak-point information value PK to "0". Thus, the peak detector 26 generates peak-point information representing the value PK. The peak detector 26 outputs the peak-point information to the tap delay circuit 23.

Third Embodiment

Figure 18:
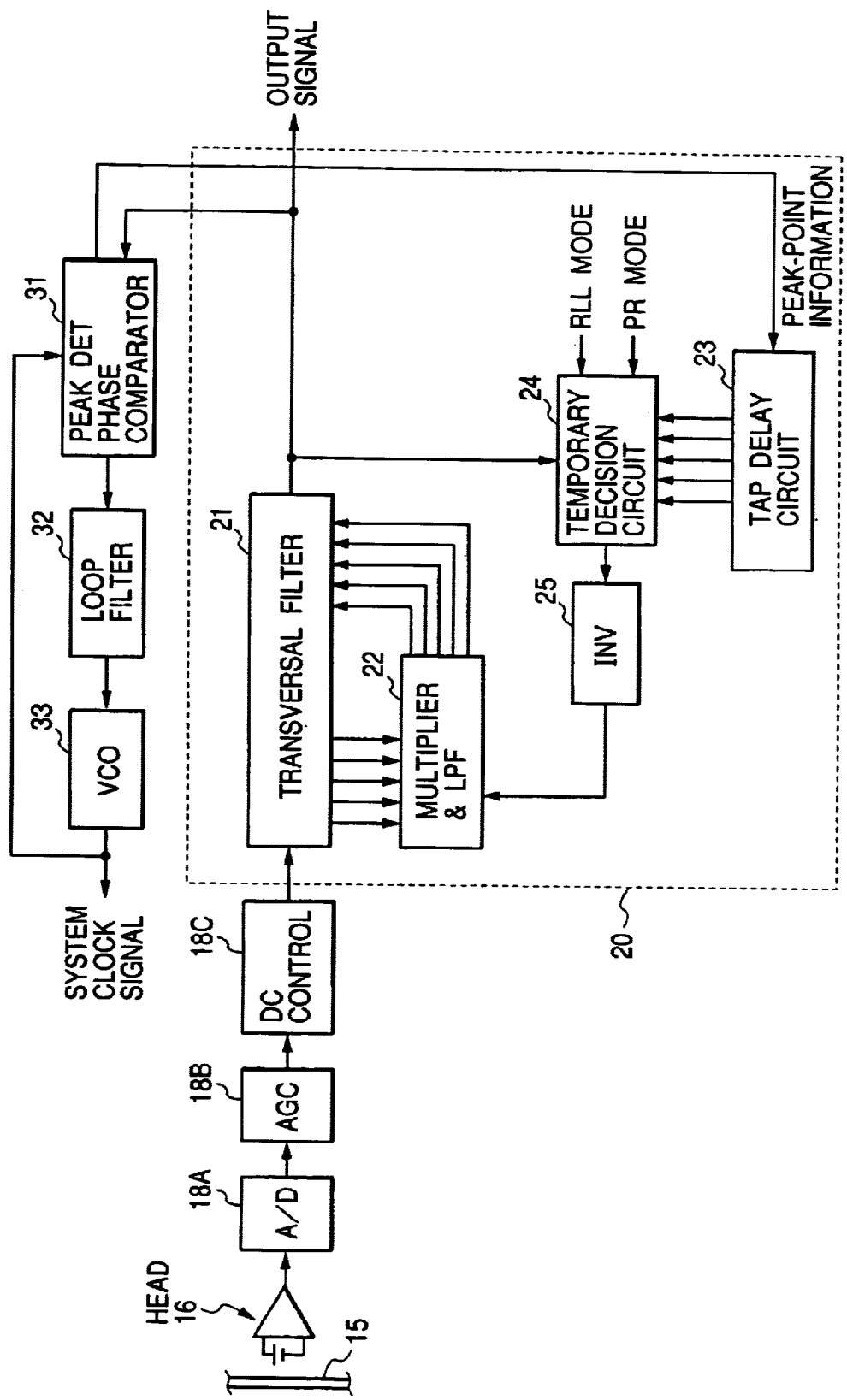
FIG. 18 is a block diagram of a portion of a reproducing apparatus according to a third embodiment of this invention.

FIG. 18 shows a portion of a reproducing apparatus according to a third embodiment of this invention. The reproducing apparatus in FIG. 18 is similar to the reproducing apparatus in FIG. 2 except for design changes mentioned hereinafter. The reproducing apparatus in FIG. 18 includes an A/D converter 18A, an AGC circuit 18B, and a DC controller 18C which successively follow an optical head 16 in that order. The output terminal of the DC controller 18C is connected to the input terminal of a transversal filter 21 within an adaptive equalization circuit 20.

The A/D converter 18A receives the output signal of the optical head 16. The A/D converter 18A changes the output signal of the optical head 16 into a corresponding digital signal (a first digital signal). Specifically, the A/D converter 18A periodically samples the output signal of the optical head 16 in response to a system clock signal, and converts every resultant sample into a digital sample. The A/D converter 18A outputs the digital signal to the AGC circuit 18B. The AGC circuit 18B subjects the output signal of the A/D converter 18A to automatic gain control for providing a constant signal amplitude on a digital basis. The AGC circuit 18B outputs the resultant digital signal to the DC controller 18C. The DC controller 18C subjects the output signal of the AGC circuit 18B to ATC (automatic threshold control). The DC controller 18C outputs the control-resultant signal to the transversal filter 21 within the adaptive equalization circuit 20.

The reproducing apparatus in FIG. 18 includes a peak detection and phase comparison circuit 31, a loop filter 32, and a voltage-controlled oscillator (VCO) 33 which are connected in a closed loop in that order. The circuit 31 detects every peak point of the output signal of the transversal filter 21. The circuit 31 compares the phase of the detected peak point and the phase of a system clock signal fed from the VCO 33, and generates a phase error signal in response to the result of the phase comparison. The circuit 31 outputs the phase error signal to the loop filter 32. The loop filter 32 converts the phase error signal into a control voltage. The loop filter 32 outputs the control voltage to the VCO 33. The VCO 33 oscillates at a frequency determined by the control voltage, and thereby generates the system clock signal. The VCO 33 outputs the system clock signal to the A/D converter 18A and other devices and circuits within the reproducing apparatus. The system clock signal may include a bit clock signal.

In addition, the circuit 31 generates peak-point information in response to the detected peak point. The circuit 31 outputs the peak-point information to a tap delay circuit 23 within the adaptive equalization circuit 20.

Fourth Embodiment

Figure 19:
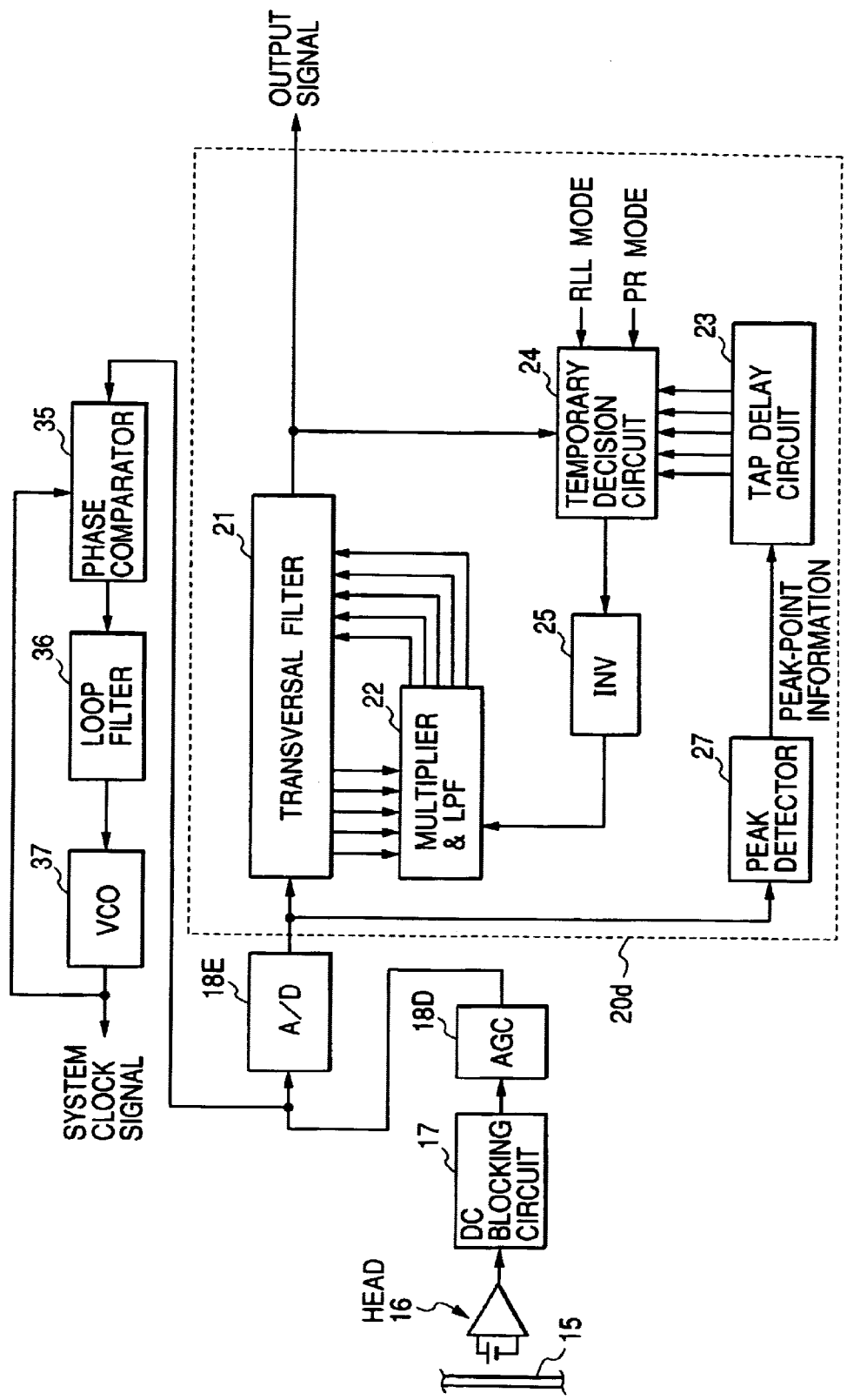
FIG. 19 is a block diagram of a portion of a reproducing apparatus according to a fourth embodiment of this invention.

FIG. 19 shows a portion of a reproducing apparatus according to a fourth embodiment of this invention. The reproducing apparatus in FIG. 19 is similar to the reproducing apparatus in FIG. 2 except for design changes mentioned hereinafter. The reproducing apparatus in FIG. 19 includes an AGC circuit 18D and an A/D converter 18E which successively follow a DC blocking circuit 17 in that order.

The reproducing apparatus in FIG. 19 includes an adaptive equalization circuit 20d instead of the adaptive equalization circuit (see FIGS. 2 and 4). The adaptive equalization circuit 20d is similar to the adaptive equalization circuit 20 except that a peak detector 27 is provided therein. The input terminal of the peak detector 27 is connected to the output terminal of the A/D converter 18E. The output terminal of the peak detector 27 is connected to the input terminal of a tap delay circuit 23. The input terminal of a transversal filter 21 is connected to the output terminal of the A/D converter 18E.

The AGC circuit 18D receives the output signal of the DC blocking circuit 17. The AGC circuit 18D subjects the output signal of the DC blocking circuit 17 to automatic gain control for providing a constant signal amplitude on an analog basis. The AGC circuit 18D outputs the resultant signal to the A/D converter 18E. The A/D converter 18E changes the output signal of the AGC circuit 18D into a corresponding digital signal. Specifically, the A/D converter 18E periodically samples the output signal of the AGC circuit 18D in response to a system clock signal, and converts every resultant sample into a digital sample. The A/D converter 18E outputs the digital signal to the transversal filter 21 and the peak detector 27 within the adaptive equalization circuit 20$d$.

The peak detector 27 calculates the slope (differential) of the level represented by the output signal of the A/D converter 18E on the basis of two successive samples thereof. The peak detector 27 senses every inversion of the polarity of the calculated slope. The peak detector 27 senses a sample point immediately preceding the sample point corresponding to the sensed polarity inversion. The peak detector 27 sets a peak-point information value PK to "1" for the sensed sample point. The peak detector 27 sets the peak-point information value PK to "0" for the other sample points. Thus, the peak detector 27 generates peak-point information representing the value PK. The peak detector 27 outputs the peak-point information to the tap delay circuit 23.

The reproducing apparatus in FIG. 19 includes a phase comparator 35, a loop filter 36, and a voltage-controlled oscillator (VCO) 37 which are connected in a closed loop in that order. The phase comparator 35 receives the output signal of the AGC circuit 18D. The device 35 compares the phase of the output signal of the AGC circuit 18D and the phase of a system clock signal fed from the VCO 37, and generates a phase error signal in response to the result of the phase comparison. The phase comparator 35 outputs the phase error signal to the loop filter 36. The loop filter 36 converts the phase error signal into a control voltage. The loop filter 36 outputs the control voltage to the VCO 37. The VCO 37 oscillates at a frequency determined by the control voltage, and thereby generates the system clock signal. The VCO 37 outputs the system clock signal to the A/D converter 18E and other devices and circuits within the reproducing apparatus. The system clock signal may include a bit clock signal.

Fifth Embodiment

A fifth embodiment of this invention is similar to one of the first, second, third, and fourth embodiments thereof except for design changes mentioned below. In the fifth embodiment of this invention, a temporary decision device 51 (see FIG. 5) refers to only three successive peak-point information values PK. The central-place value (the second-place value) among the three successive peak-point information values PK corresponds to a sample point of interest.

Figure 20:
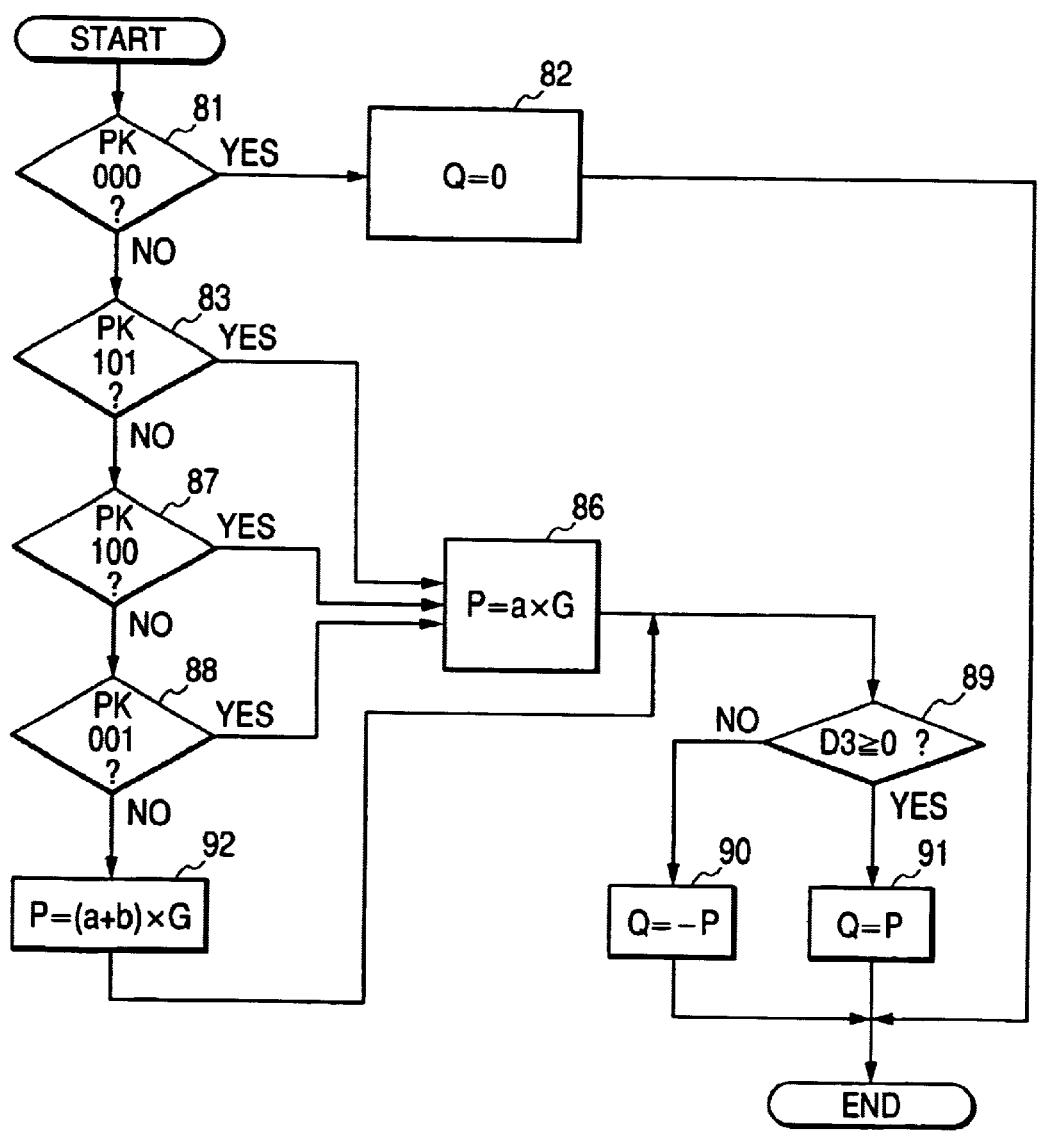
FIG. 20 is a flowchart of an algorithm of a temporary decision by a temporary decision device in a fifth embodiment of this invention.

FIG. 20 is a flowchart of an algorithm of a temporary decision by the temporary decision device 51 in the fifth embodiment of this invention. The temporary decision is executed for every period of a bit clock signal.

As shown in FIG. 20, a first step 81 of the algorithm decides whether or not three successive peak-point information values PK represented by output signals of a tap delay circuit 23 (see FIG. 5) are "000". When the three successive peak-point information values PK are "000", the algorithm advances from the step 81 to a step 82. Otherwise, the algorithm advances from the step 81 to a step 83.

In the case where the three successive peak-point information values PK are "000", the before-equalization signal waveform is fixed to a signal level of "0" for a long time interval centered at the sample point of interest. Thus, in this case, the step 82 sets a temporary decision level (a temporary decision value or a temporary decision result value) Q to "0" according to the previously-indicated equation (1). After the step 82, the current execution cycle of the temporary decision ends.

The step 83 decides whether or not the three successive peak-point information values PK are "101". When the three successive peak-point information values PK are "101", the algorithm advances from the step 83 to a step 86. Otherwise, the algorithm advances from the step 83 to a step 87.

The step 87 decides whether or not the three successive peak-point information values PK are "1100". When the three successive peak-point information values PK are "100", the algorithm advances from the step 87 to the step 86. Otherwise, the algorithm advances from the step 87 to a step 88.

The step 88 decides whether or not the three successive peak-point information values PK are "001". When the three successive peak-point information values PK are "001", the algorithm advances from the step 88 to the step 86. Otherwise, the algorithm advances from the step 88 to a step 92.

In the case where the three successive peak-point information values PK are "101", "100", or "001", the sample point of interest (the central sample point) does not correspond to a peak while at least one of the two sample points immediately neighboring the sample point of interest corresponds to a peak. In this case, the step 86 sets an intermediate value P to "a·G" according to the previously-indicated equation (2). After the step 86, the algorithm advances to a step 89.

In the case where the three successive peak-point information values PK differ from "000", "101", "100", and "001" (for example, in the case where the sample point of interest or the central-place sample point corresponds to a peak), the step 92 sets the intermediate value P to "(a+b)·G" according to the previously-indicated equation (3). After the step 92, the algorithm advances to the step 89.

The step 89 detects the polarity of the present-moment signal D3. Specifically, the step 89 decides whether or not the present-moment signal D3 is smaller than "0". When the present-moment signal D3 is equal to or greater than "0", the algorithm advances from the step 89 to a step 91. When the present-moment signal D3 is smaller than "0", the algorithm advances from the step 89 to a step 90.

The step 91 sets a temporary decision level (a temporary decision value or a temporary decision result value) Q equal to the value P. In other words, the step 91 executes the statement "Q=P". On the other hand, the step 90 sets the temporary decision level Q equal to the value −P (the value P multiplied by −1). In other words, the step 90 executes the statement "Q=−P". After the steps 90 and 91, the current execution cycle of the temporary decision ends.

The temporary decision device 51 outputs a signal representative of the temporary decision level (the temporary decision value) Q to the subtracter 52 as a temporary decision result signal. The temporary decision value Q is determined on the basis of one of the previously-indicated equations (1), (2), and (3). Accordingly, the equalization by the transversal filter 21 is based on one of the equations (1), (2), and (3). The equalization based on one of the equations (1), (2), and (3) is periodically executed in response to the polarity of the present-moment signal D3 at a timing of the central-place one (the second-place one) among three successive peak-point information values PK.

Sixth Embodiment

Figure 21:
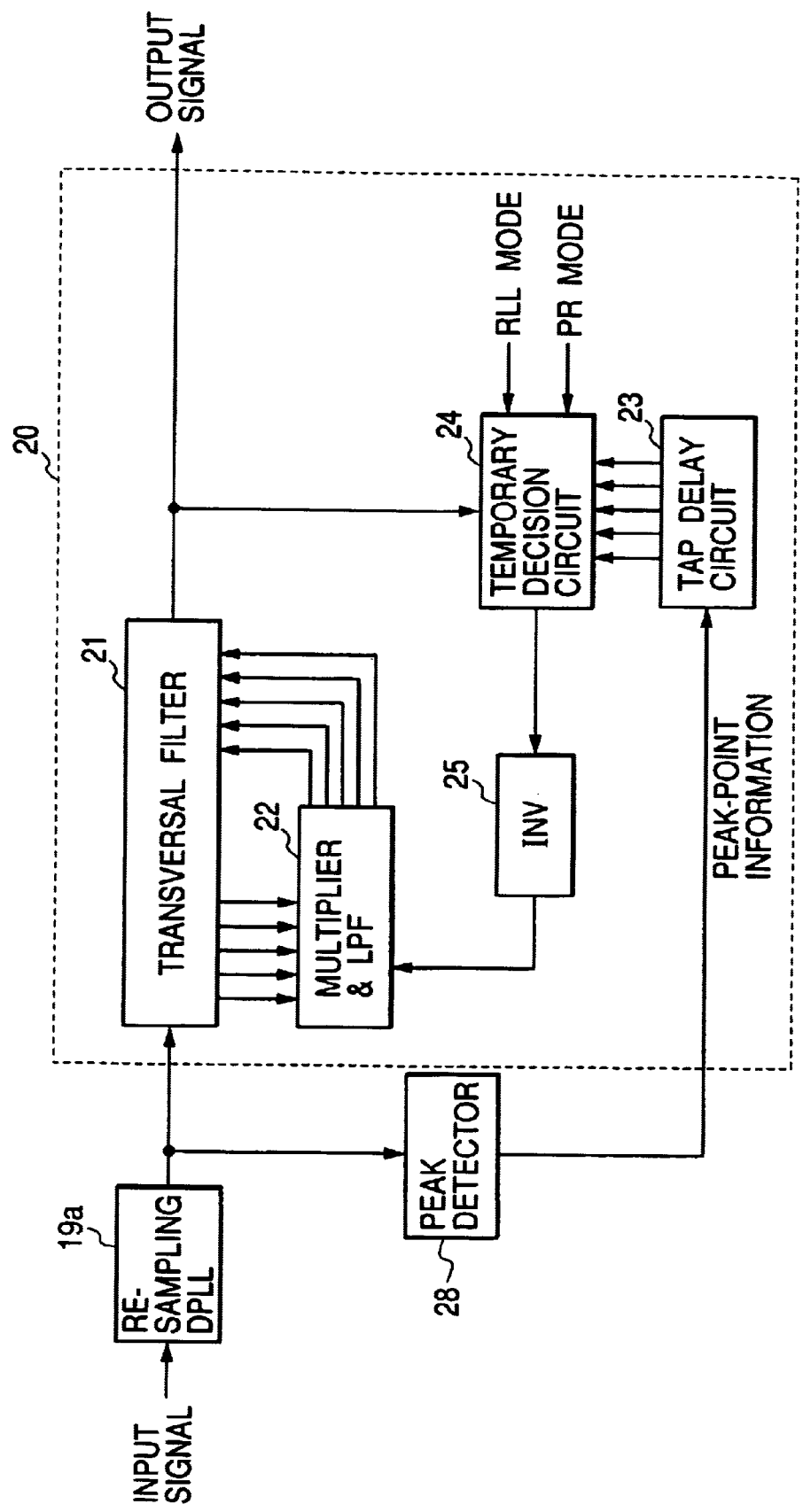
FIG. 21 is a block diagram of a portion of a reproducing apparatus according to a sixth embodiment of this invention.

FIG. 21 shows a portion of a reproducing apparatus according to a sixth embodiment of this invention. The reproducing apparatus in FIG. 21 is similar to the reproducing apparatus in FIG. 4 except that a peak detector 28 is provided, and a re-sampling DPLL section 19a replaces the re-sampling DPLL section 19 (see FIG. 4).

With reference to FIG. 21, the re-sampling DPLL section 19a does not generate peak-point information. The re-sampling DPLL section 19a generates a second digital signal (a main digital signal) from the output signal of an AGC circuit 18B (see FIG. 2) by a PLL-based re-sampling process. The re-sampling DPLL section 19a outputs the second digital signal (the main digital signal) to a transversal filter 21 within the adaptive equalization circuit 20.

The input terminal of the peak detector 28 is connected to the output terminal of the re-sampling DPLL section 19a. The output terminal of the peak detector 28 is connected to the input terminal of a tap delay circuit 23 within the adaptive equalization circuit 20.

The peak detector 28 receives the output signal of the re-sampling DPLL section 19a, that is, the main digital signal or the second digital signal. The peak detector 28 calculates the slope (differential) of the level represented by the output signal of the re-sampling DPLL section 19a on the basis of two successive samples thereof. The peak detector 28 senses every inversion of the polarity of the calculated slope. The peak detector 28 examines the two slopes at sample points immediately preceding and immediately following the polarity-inversion moment respectively. The peak detector 28 selects one from the two slopes which is closer to "0". The peak detector 28 sets a peak-point information value PK to "1" for the selected slope. The peak detector 28 sets the peak-point information value PK to "0" for the other slope (the unselected slope). In the absence of a sensed polarity inversion, the peak detector 28 continuously sets the peak-point information value PK to "0". Thus, the peak detector 28 generates peak-point information representing the value PK. The peak detector 28 outputs the peak-point information to the tap delay circuit 23.

Seventh Embodiment

In general, the waveforms of signals reproduced from optical discs are of two types, that is, an integral type and a differential type (a derivative type). A seventh embodiment of this invention is designed to handle not only an integral-type reproduced signal but also a differential-type reproduced signal. The integral-type reproduced signal and the differential-type reproduced signal handled by the seventh embodiment of this invention may originate from first information and second information recorded on a single optical disc.

Figure 22:
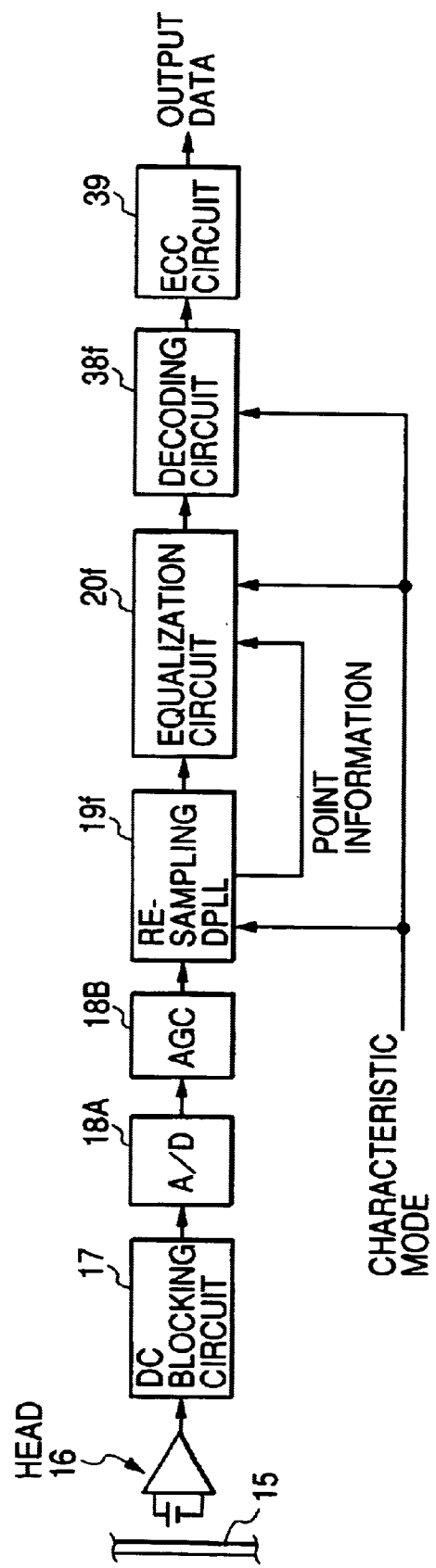
FIG. 22 is a block diagram of a reproducing apparatus according to a seventh embodiment of this invention.

FIG. 22 shows a reproducing apparatus according to the seventh embodiment of this invention. The reproducing apparatus in FIG. 22 is similar to the reproducing apparatus in FIG. 2 except that a re-sampling DPLL section 19f, an adaptive equalization circuit 20f, and a decoding circuit 38f replace the re-sampling DPLL section 19, the adaptive equalization circuit 20, and the decoding circuit 38 (see FIG. 2) respectively.

The re-sampling DPLL section 19f, the adaptive equalization circuit 20f, and the decoding circuit 38f receive a characteristic mode signal from a suitable device (not shown). The characteristic mode signal indicates whether the waveform of a signal reproduced from an optical disc 15 is of the integral type or the differential type. The re-sampling DPLL section 19f, the adaptive equalization circuit 20f, and the decoding circuit 38f respond to the characteristic mode signal. Thus, the operation of the re-sampling DPLL section 19f, the adaptive equalization circuit 20f, and the decoding circuit 38f is controlled depending on whether the waveform of a signal reproduced from the optical disc 15 is of the integral type or the differential type.

The re-sampling DPLL section 19f converts the output signal (the first digital signal) of an AGC circuit 18B into a second digital signal by a re-sampling process. A timing related to samples of the output signal (the first digital signal) of the AGC circuit 18B is determined by a system clock signal. A timing related to samples of the second digital signal is determined by a bit clock signal synchronized with the system clock signal. During the re-sampling process, the re-sampling DPLL section 19f generates samples of the second digital signal from samples of the first digital signal through at least one of interpolation and decimation.

The re-sampling DPLL section 19f includes two digital PLL (phase locked loop) circuits each having a closed loop. Each of the two digital PLL circuits in the re-sampling DPLL section 19f generates a second digital signal on the basis of the output signal of the AGC circuit 18B. The second digital signal relates to a sampling frequency equal to a bit clock frequency. Specifically, samples of the second digital signal are generated from samples of the output signal of the AGC circuit 18B through a PLL re-sampling process based on at least one of interpolation and decimation.

The two digital PLL circuits in the re-sampling DPLL section 19f include a zero-cross detector and a peak detector, respectively. One of the second digital signals generated by the respective digital PLL circuits is selected in response to the characteristic mode signal. Specifically, the second digital signal generated by the digital PLL circuit including the zero-cross detector is selected when the characteristic mode signal indicates that the waveform of a signal reproduced from the optical disc 15 is of the integral type. The second digital signal generated by the digital PLL circuit including the peak detector is selected when the characteristic mode signal indicates that the waveform of a signal reproduced from the optical disc 15 is of the differential type. The re-sampling DPLL section 19f outputs the selected second digital signal to the adaptive equalization circuit 20f. The second digital signal is also referred to as the main digital signal or the main output signal of the re-sampling DPLL section 19f.

The zero-cross detector in the corresponding digital PLL circuit within the re-sampling DPLL section 19f senses every point (every zero-cross point) at which the level represented by a stream of 0°-phase-point data samples (mentioned later) crosses a zero level. The zero-cross detector generates 0-point information representative of every sensed point. Specifically, the zero-cross detector decides whether or not every 0°-phase-point data sample corresponds to a zero-cross point. The zero-cross detector generates 0-point information in response to the result of the decision. The value Z represented by the 0-point information is "1" for each data sample corresponding to a zero-cross point. The 0-point information value Z is "0" for other data samples. In the present digital PLL circuit within the re-sampling DPLL section 19f, the timing of the re-sampling or the frequency and phase of the re-sampling are locked so that the levels represented by zero-cross-point-corresponding samples of the second digital signal will be equal to "0".

The peak detector in the corresponding digital PLL circuit within the re-sampling DPLL section 19f senses every point (every peak point) at which the level represented by the second digital signal (the re-sampling-resultant signal) peaks in a positive side or a negative side. The peak detector generates peak-point information representative of every sensed point. Specifically, the peak detector decides whether or not every sample of the second digital signal corresponds to a positive or negative peak. Here, "negative peak" means "valley". The result of the decision is used in generating the peak-point information. The value PK represented by the peak-point information is "1" for each data sample corresponding to a positive or negative peak. The peak-point information value PK is "0" for other data samples. In the present digital PLL circuit within the re-sampling DPLL section 19f, the timing of the re-sampling or the frequency and phase of the re-sampling are locked so that the levels represented by positive-peak-point-corresponding samples of the second digital signal will be maximized and the levels represented by negative-peak-point-corresponding samples of the second digital signal will be minimized.

In the re-sampling DPLL section 19f, one of the 0-point information and the peak-point information generated by the zero-cross detector and the peak detector is selected in response to the characteristic mode signal. Specifically, when the characteristic mode signal indicates that the waveform of a signal reproduced from the optical disc 15 is of the integral type, the 0-point information is selected. In this case, the re-sampling DPLL section 19f outputs the 0-point information to the adaptive equalization circuit 20f as a sub output signal or point information. On the other hand, when the characteristic mode signal indicates that the waveform of a signal reproduced from the optical disc 15 is of the differential type, the peak-point information is selected. In this case, the re-sampling DPLL section 19f outputs the peak-point information to the adaptive equalization circuit 20f as a sub output signal or point information.

Figure 23:
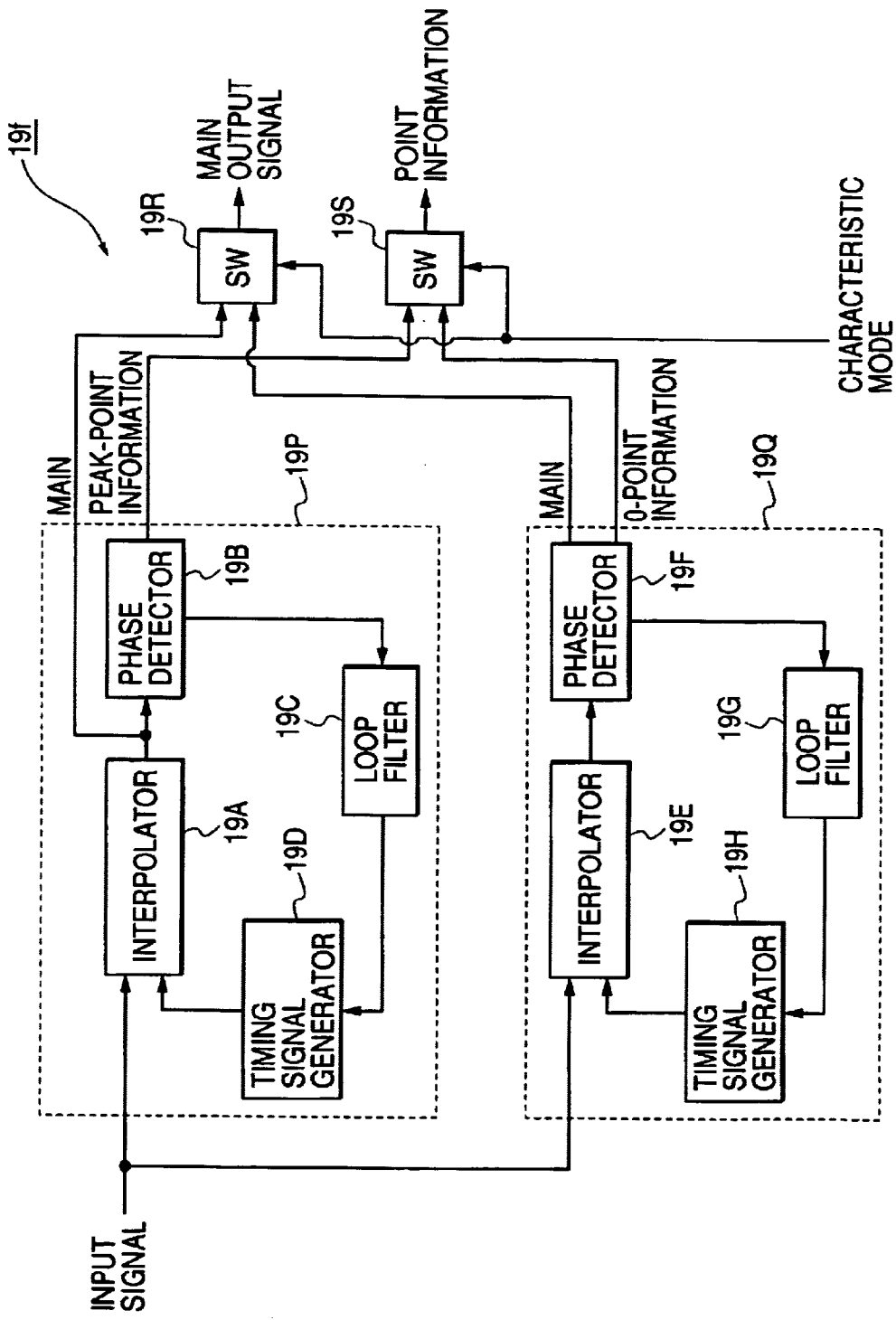
FIG. 23 is a block diagram of a re-sampling DPLL section in FIG. 22.

As shown in FIG. 23, the re-sampling DPLL section 19f includes a first PLL circuit 19P, a second PLL circuit 19Q, and switches 19R and 19S. The first and second PLL circuits 19P and 19Q follow the AGC circuit 18B. The first and second PLL circuits 19P and 19Q are connected to the switches 19R and 19S. The switches 19R and 19S are connected to the adaptive equalization circuit 20f.

The first PLL circuit 19P in the re-sampling DPLL section 19f includes an interpolator 19A, a phase detector 19B, a loop filter 19C, and a timing signal generator 19D which are connected in a closed loop in that order. The interpolator 19A receives the output signal of the AGC circuit 18B. The first PLL circuit 19P is similar in structure and operation to the re-sampling DPLL section 19 in FIG. 3. Thus, the first PLL circuit 19P generates a second digital signal (a main digital signal) and peak-point information on the basis of the output signal of the AGC circuit 18B. The first PLL circuit 19P outputs the second digital signal (the main digital signal) to the switch 19R. The first PLL circuit 19P outputs the peak-point information to the switch 19S.

The second PLL circuit 19Q in the re-sampling DPLL section 19f includes an interpolator 19E, a phase detector 19F, a loop filter 19G, and a timing signal generator 19H which are connected in a closed loop in that order. The interpolator 19E receives the output signal of the AGC circuit 18B. The interpolator 19E receives data point phase information and the bit clock signal from the timing signal generator 19H. The interpolator 19E estimates 0°-phase-point data samples from samples of the output signal of the AGC circuit 18B through interpolation responsive to the data point phase information and the bit clock signal. Here, "phase" is defined relative to the bit clock signal. The interpolator 19E outputs the estimated 0°-phase-point data samples to the phase detector 19FP.

In the second PLL circuit 19Q, the phase detector 19F generates 180°-phase-point data samples from the 0°-phase-point data samples. Specifically, the phase detector 19F calculates a mean of a current 0°-phase-point data sample and an immediately preceding 0°-phase-point data sample, and uses the calculated mean as a current 180°-phase-point data sample. The phase detector 19F outputs the 180°-phase-point data samples to the switch 19R as a second digital signal (a main digital signal). The phase detector 19F includes a zero-cross detector for sensing zero-cross points from the 0°-phase-point data samples. The phase detector 19F detects a phase error in response to each of the sensed zero-cross points. Specifically, the zero-cross detector in the phase detector 19F senses a zero-cross point by referring to a current 0°-phase-point data sample and an immediately preceding 0°-phase-point data sample. When a zero-cross point is sensed, the phase detector 19F multiplies the polarity of the immediately preceding 0°-phase-point data sample by a mean of the current 0°-phase-point data sample and the immediately preceding 0°-phase-point data sample. The phase detector 19F uses the multiplication result as a phase error. The zero-cross detector in the phase detector 19F generates 0-point information representing the sensed zero-cross points. The phase detector 19F outputs the 0-point information (the sub output signal) to the switch 19S. The phase detector 19F generates a signal representing the phase error. The phase detector 19F outputs the phase error signal to the loop filter 19G. The loop filter 19G integrates the phase error signal. The loop filter 19G outputs the integration-resultant signal to the timing signal generator 19H. The timing signal generator 19H produces the data point phase information and the bit clock signal in response to the output signal of the loop filter 19G. Thus, the data point phase information and the bit clock signal are controlled in response to the phase error signal, that is, each sensed zero-cross point. This control is designed to implement frequency and phase lock. Specifically, the frequency and phase of the re-sampling by the interpolator 19E are locked so that the levels represented by zero-cross-point-corresponding samples of the second digital signal will be equal to "0".

The switch 19R receives the second digital signals from the first and second PLL circuits 19P and 19Q. The switch 19R receives the characteristic mode signal. The switch 19R selects one of the second digital signals in response to the characteristic mode signal. Specifically, the switch 19R selects the second digital signal from the first PLL circuit 19P when the characteristic mode signal indicates that the waveform of a signal reproduced from the optical disc 15 is of the differential type. The switch 19R selects the second digital signal from the second PLL circuit 19Q when the characteristic mode signal indicates that the waveform of a signal reproduced from the optical disc 15 is of the integral type. The switch 19R outputs the selected second digital signal to a transversal filter 21 (see FIG. 24) within the adaptive equalization circuit 20f.

The switch 19S receives the peak-point information from the first PLL circuit 19P. The switch 19S receives the 0-point information from the second PLL circuit 19Q. The switch 19S receives the characteristic mode signal. The switch 19S selects one of the peak-point information and the 0-point information in response to the characteristic mode signal. Specifically, the switch 19S selects the peak-point information when the characteristic mode signal indicates that the waveform of a signal reproduced from the optical disc 15 is of the differential type. The switch 19S selects the 0-point information when the characteristic mode signal indicates that the waveform of a signal reproduced from the optical disc 15 is of the integral type. The switch 19S outputs the selected point information to a tap delay circuit 23 (see FIG. 24) within the adaptive equalization circuit 20f.

The adaptive equalization circuit 20f subjects the main output signal of the re-sampling DPLL section 19f (that is, the second digital signal outputted from the re-sampling DPLL section 19f) to automatic waveform equalization in response to the characteristic mode signal and the point information fed from the re-sampling DPLL section 19f. The automatic waveform equalization corresponds to a process of providing the signal in question with a partial-response (PR) characteristic determined by the characteristic mode signal. The adaptive equalization circuit 20f outputs the equalization-resultant signal to a decoding circuit 38f.

The adaptive equalization circuit 20f includes a transversal filter 21 (see FIG. 24) for implementing waveform equalization responsive to tap coefficients. The adaptive equalization circuit 20f also includes a temporary decision circuit 24A (see FIG. 24) for implementing a temporary decision, and for generating an error signal between a temporary decision result signal and the equalization-resultant signal. The tap coefficients used by the transversal filter 21 are controlled in response to the error signal on a feedback basis so as to nullify or minimize the error signal.

The decoding circuit 38f recovers original data from the output signal of the adaptive equalization circuit 20f through a viterbi decoding process responsive to the characteristic mode signal. Thus, the viterbi decoding process by the decoding circuit 38f is changed in response to the characteristic mode signal. The decoding circuit 38f outputs the recovered data to an ECC (error checking and correcting) circuit 39.

The decoding circuit 38f includes a memory loaded with a plurality of candidate recovered data pieces. Also, the decoding circuit 38f includes a section for calculating branch metric values from samples of the output signal of the adaptive equalization circuit 20f. Furthermore, the decoding circuit 38f includes a section for accumulating the branch metric values into path metric values respectively. The path metric values relate to the candidate recovered data pieces respectively. In addition, the decoding circuit 38f includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data.

Figure 24:
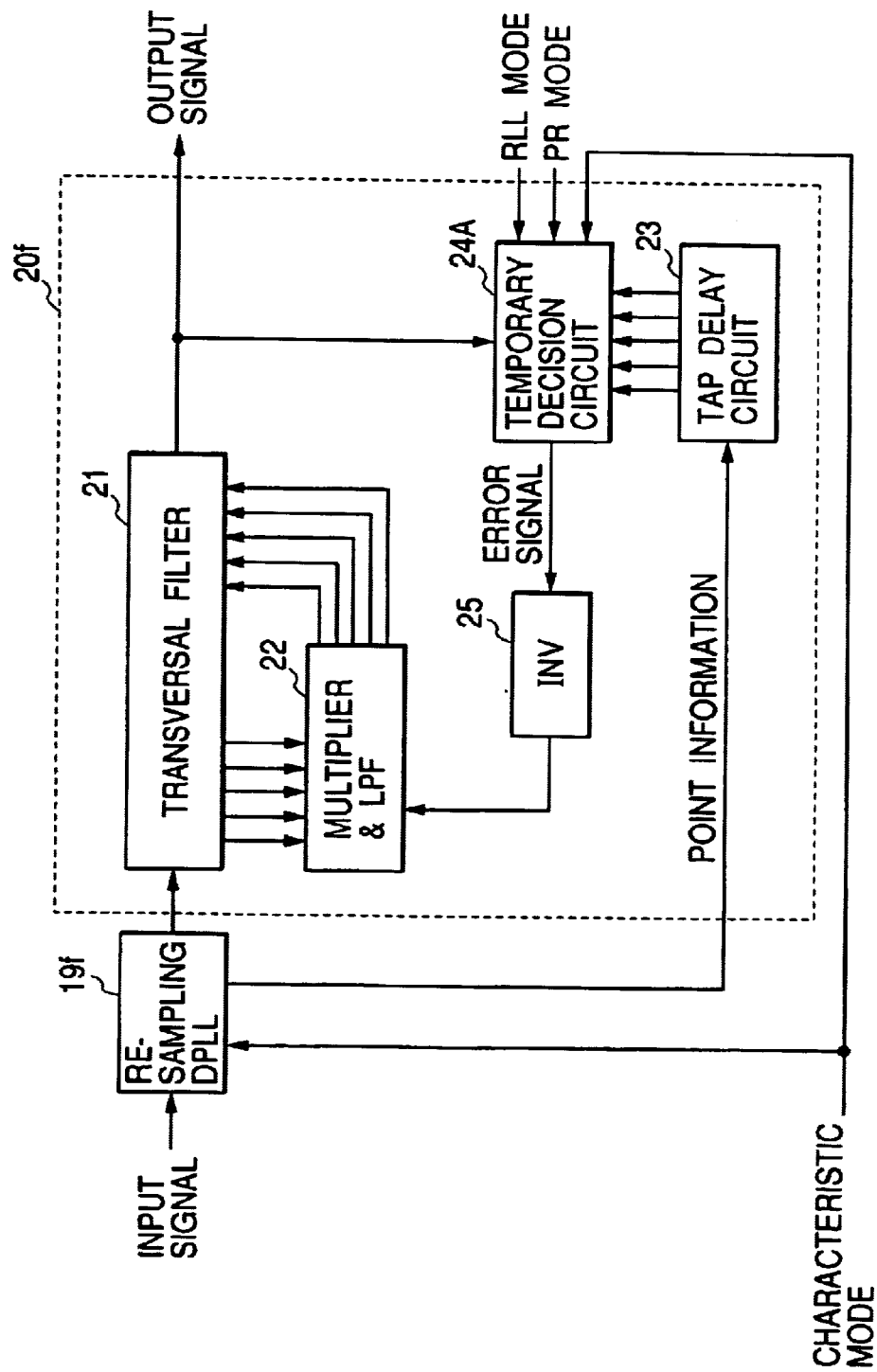
FIG. 24 is a block diagram of an adaptive equalization circuit in FIG. 22.

FIG. 24 shows the details of the adaptive equalization circuit 20f. The adaptive equalization circuit 20f in FIG. 24 is similar to the adaptive equalization circuit 20 in FIG. 4 except that a temporary decision circuit 24A replaces the temporary decision circuit 24 (see FIG. 4). As shown in FIG. 24, the temporary decision circuit 24A receives the characteristic mode signal. The temporary decision circuit 24A responds to the characteristic mode signal. In other points, the temporary decision circuit 24A is basically similar to the temporary decision circuit 24 (see FIG. 4).

Figure 25:
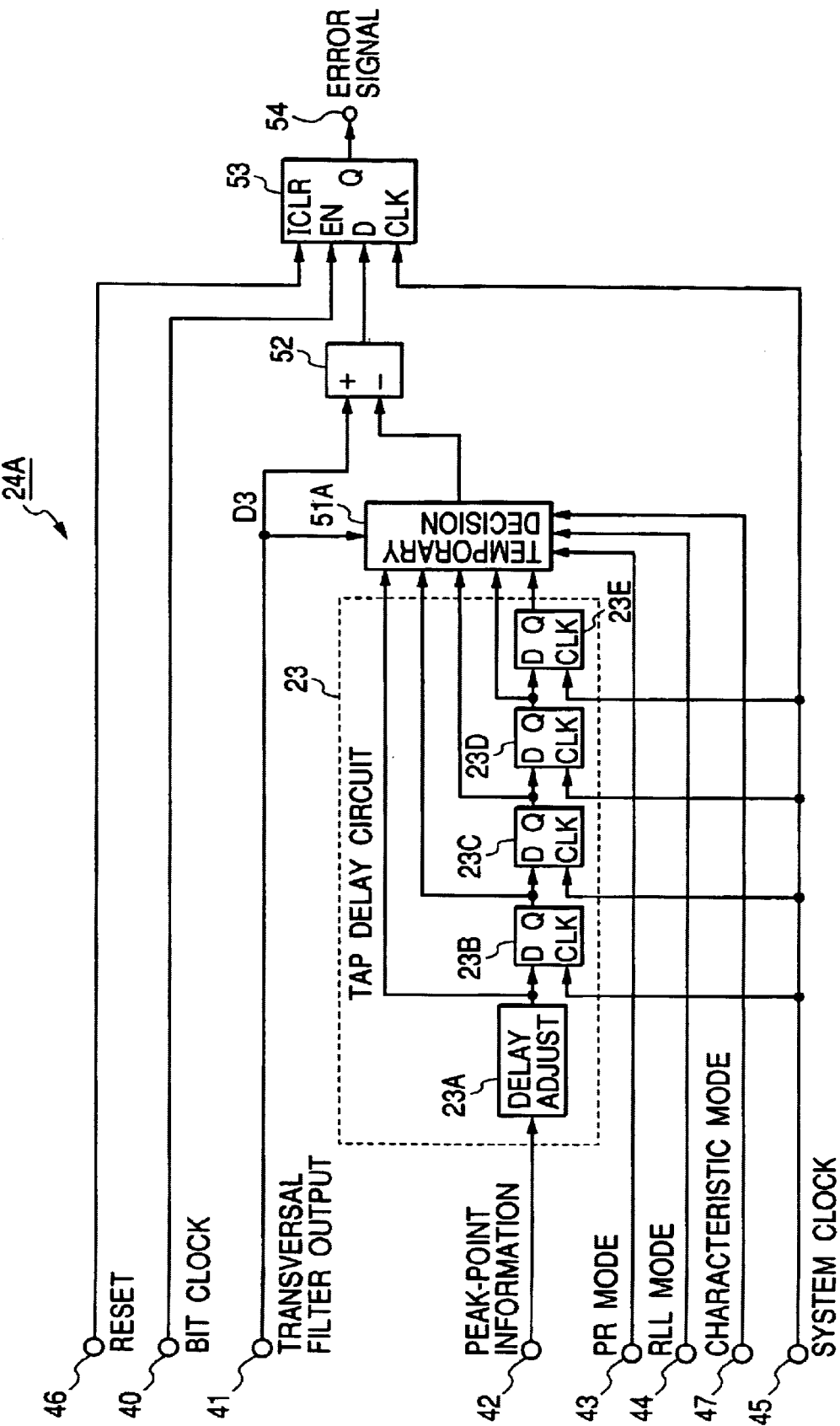
FIG. 25 is a block diagram of a temporary decision circuit and a tap delay circuit in FIG. 24.

FIG. 25 shows the details of the temporary decision circuit 24A. The temporary decision circuit 24A in FIG. 25 includes a temporary decision device 51A which replaces the temporary decision device 51 (see FIG. 6). As shown in FIG. 25, a delay adjuster 23A in the temporary decision circuit 24A receives the point information from the re-sampling DPLL section 19f via a terminal 42. The delay adjuster 23A operates to adjust delay time of the point information. The temporary decision device 51A receives the characteristic mode signal via a terminal 47. The temporary decision device 51A responds to the characteristic mode signal. In other points, the temporary decision device 51A is similar to the temporary decision device 51 (see FIG. 6).

Figure 26:
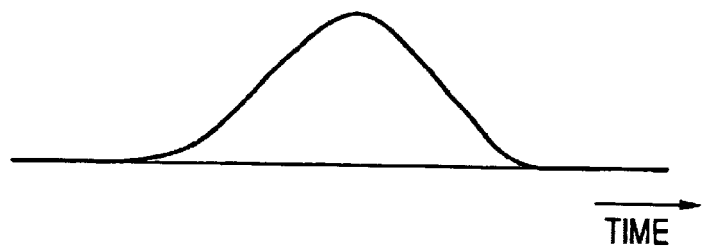
FIG. 26 is a time-domain diagram of an example of an integral-type isolated waveform.
Figure 27:
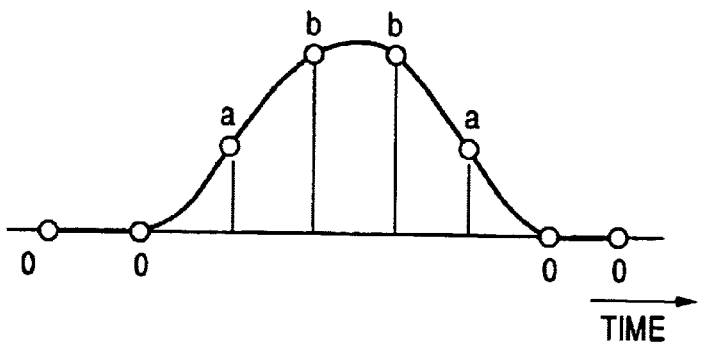
FIG. 27 is a time-domain diagram of a waveform (an equalization-resultant waveform) which results from equalization of the integral-type isolated waveform in FIG. 26.
Figure 28:
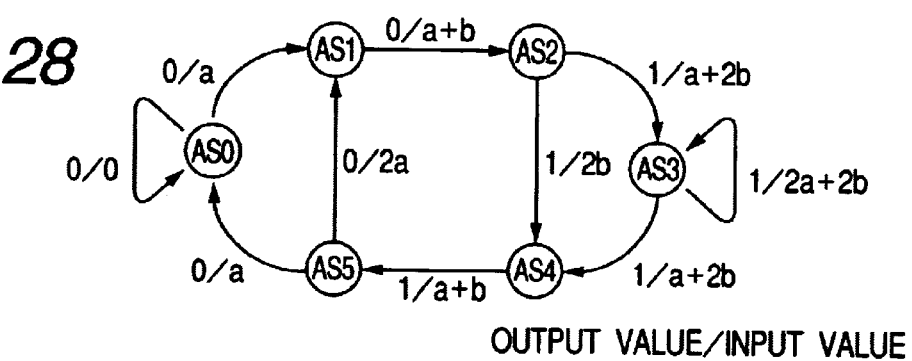
FIG. 28 is a diagram of signal state transitions regarding a partial-response (PR) characteristic and a run-length-limited (RLL) code corresponding to PR (a, b, b, a) and RLL (1, X) respectively.

Integral-type partial-response (PR) characteristics will be explained below. When an integral-type isolated waveform in FIG. 26 is subjected to equalization accorded with the characteristic of PR (a, b, b, a), the equalization-resultant waveform in FIG. 27 is provided. A waveform resulting from the PR (a, b, b, a) equalization of a continuous waveform takes one of seven different values, that is, "0", "a", "a+b", "2a", "2b", "a+2b", and "2a+2b". It is assumed that the 7-value signal of the (1, X) run-length-limited code is inputted into a viterbi decoder. The state of a current sample of an original signal (an input value) and the state of a current sample of a reproduced signal (an output value) resulting from PR equalization are restricted by the states of previous samples. In the input signal, two successive samples of "1" will not occur. FIG. 28 shows signal state transitions available in this case.

In FIG. 28, AS0, AS1, AS2, AS3, AS4, and AS5 denote signal states determined by immediately-preceding output values. Transitions from the state AS2 will be taken as an example. When the input value is "a+2b", the output value becomes "1" and a transition to the state AS3 from the state AS2 occurs. When the input value is "2b", the output value becomes "1" and a transition to the state AS4 from the state AS2 occurs. Under normal conditions, regarding the state AS2, the input value different from "a+2b" and "2b" does not occur. Thus, the input value different from "a+2b" and "2b" is an error.

Figure 29:
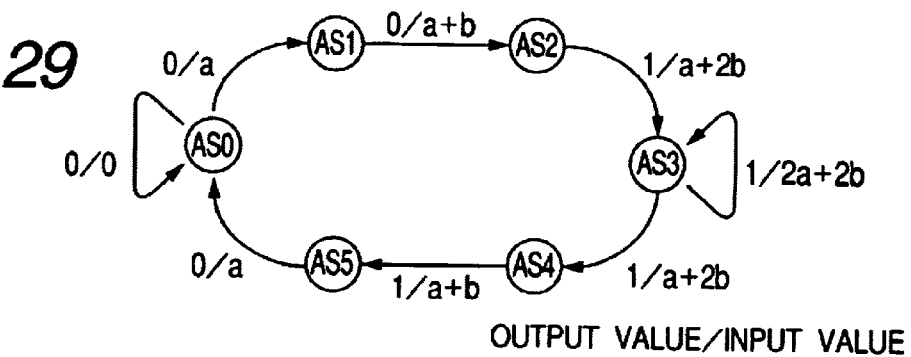
FIG. 29 is a diagram of signal state transitions regarding a partial-response (PR) characteristic and a run-length-limited (RLL) code corresponding to PR (a, b, b, a) and RLL (2, X) respectively.

FIG. 29 shows signal state transitions available in the case of a (2, X) run-length-limited code rather than the (1, X) run-length-limited code. The signal state transitions in FIG. 29 include neither a transition from the state AS5 to the state AS1 nor a transition from the state AS2 to the state AS4.

FIG. 30 shows the relation among the integral-type PR mode, the RLL mode (the run-length-limited mode), and the decision result value outputted from the temporary decision device 51A. The integral-type PR mode is represented by a PR mode signal inputted into the temporary decision device 51A via a terminal 43.

With reference to FIG. 30, the integral-type PR mode can be changed among identification numbers "1", "2", "3", "4", "5", and "6" assigned to PR (1, 1), PR (1, 1, 1, 1), PR (1, 2, 2, 1), PR (1, 3, 3, 1), PR (2, 3, 3, 2), and PR (3, 4, 4, 3) respectively. The RLL mode can be changed between RLL (1, X) and RLL (2, X). Here, RLL (1, X) means run-length limiting rules such that the minimum transition interval is equal to "2", and the maximum transition interval is equal to a given value X depending on the modulation format. On the other hand, RLL (2, X) means run-length limiting rules such that the minimum transition interval is equal to "3", and the maximum transition interval is equal to a given value X depending on the modulation format.

In the case of RLL (1, X), the waveform resulting from the PR (a, b, b, a) equalization takes one of seven different values "0", "a", "a+b", "2a", "2b", "a+2b", and "2a+2b". In FIG. 30, the decision result values outputted from the temporary decision device 51A in correspondence with these values "0", "a", "a+b", "2a", "2b", "a+2b", and "2a+2b" are listed for PR (1, 2, 2, 1), PR (1, 3, 3, 1), PR (2, 3, 3, 2), and PR (3, 4, 4, 3). Each of the related cells indicates two decision result values, that is, a left-hand value and a right-hand value. The left-hand value is a non-offset decision result value while the right-hand value is a decision result value provided by an offset for equalizing the central value "a+b" to "0". The decision result values for RLL (2, X) are similar to those for RLL (1, X) except for the following point. In the case of RLL (2, X), the equalization-resultant waveform takes neither the value "2a" nor the value "2b". Accordingly, the decision result values corresponding to the values "2a" and "2b" are absent from the case of RLL (2, X).

In FIG. 30, PR (1, 1) means PR (a, b, b, a) in which a=0 and b=1. The gain or gain factor G is a multiplication coefficient A/(a+b)* for normalizing the maximum (a+b)* of the absolute after-offset decision result value, where "A" denotes an arbitrary level.

The PR mode signal inputted into the temporary decision device 51A represents not only the integral-type PR mode but also the differential-type PR mode. Examples of the differential-type PR mode are PR (1, −1), PR (1, 1, −1, −1), PR (1, 2, −2, −1), PR (1, 3, −3, −1), PR (2, 3, −3, −2), and PR (3, 4, −4, −3). The relation among the differential-type PR mode, the RLL mode, and the decision result value outputted from the temporary decision device 51A is similar to that in the first embodiment of this invention (see FIG. 11).

With reference back to FIG. 25, the temporary decision device 51A receives the equalization-resultant signal from the transversal filter 21 in the adaptive equalization circuit 20f. The temporary decision device 51A receives the output signals of the tap delay circuit 23 which represent successive samples of the selected point information. The temporary decision device 51A receives the PR mode signal and the RLL mode signal. The temporary decision device 51A implements a temporary decision in response to the received signals according to an algorithm. As previously mentioned, the temporary decision device 51A receives the characteristic mode signal. The temporary decision algorithm is changed between one for an integral-type reproduced signal and one for a differential-type reproduced signal in response to the characteristic mode signal. Specifically, the integral-type-signal algorithm is used in the temporary decision device 51A when the characteristic mode signal indicates that the waveform of a signal reproduced from the optical disc 15 is of the integral type. The differential-type-signal algorithm is used in the temporary decision device 51A when the characteristic mode signal indicates that the waveform of a signal reproduced from the optical disc 15 is of the differential type.

The differential-type-signal algorithm used in the temporary decision device 51A is similar to that in the first embodiment of this invention (see FIG. 12).

In the case of an integral-type reproduced signal, the re-sampling DPLL section 19f outputs the 0-point information to the adaptive equalization circuit 20f as previously mentioned. The 0-point information whose value Z is "1" indicates a zero-cross point. The 0-point information value Z being "1" corresponds to the value "a+b" in FIG. 28, and occurs in the transition from the state AS1 to the state AS2 and the transition from the state AS4 to the state AS5. In FIG. 28, transitions from the right-hand states AS2, AS3, and AS4 pass through positive values ("a+2b", "2a+2b", and "2b" when normalization is done so that a+b=0), while transitions from the left-hand states AS0, AS1, and AS5 pass through negative values ("0", "a", and "2a" when normalization is done so that a+b=0). Therefore, a decision as to whether the zero-cross point is in a positive-going path or a negative-going path can be implemented by referring to a value temporally preceding or following the zero-cross point.

In the case where the interval from one zero-cross point to the next zero-cross point is known, or in the case where the number of transitions occurring for the interval from the state AS2 to the state AS5 or the interval from the state AS5 to the state AS2 is known, the path is settled and hence values to be taken at respective sample points are definite.

In FIG. 28, the values different from "a+b" do not correspond to the zero-cross point. For the values different from "a+b", the 0-point information value Z is equal to "0". Two or more zero-cross points (Z=1) will not occur in succession. In the case of RLL (1, X), at least one "0" point (Z=0 point) exists between two adjacent zero-cross points (Z=1). For example, the 0-point information value Z changes as 1→1→0 (the state changes as AS2→AS4→AS5 or AS5→AS1→AS2). In the case of RLL (2, X), at least two "0" points (Z=0 points) exist between two adjacent zero-cross points (Z=1) since the values "2a" and "2b" are absent.

Figure 31:
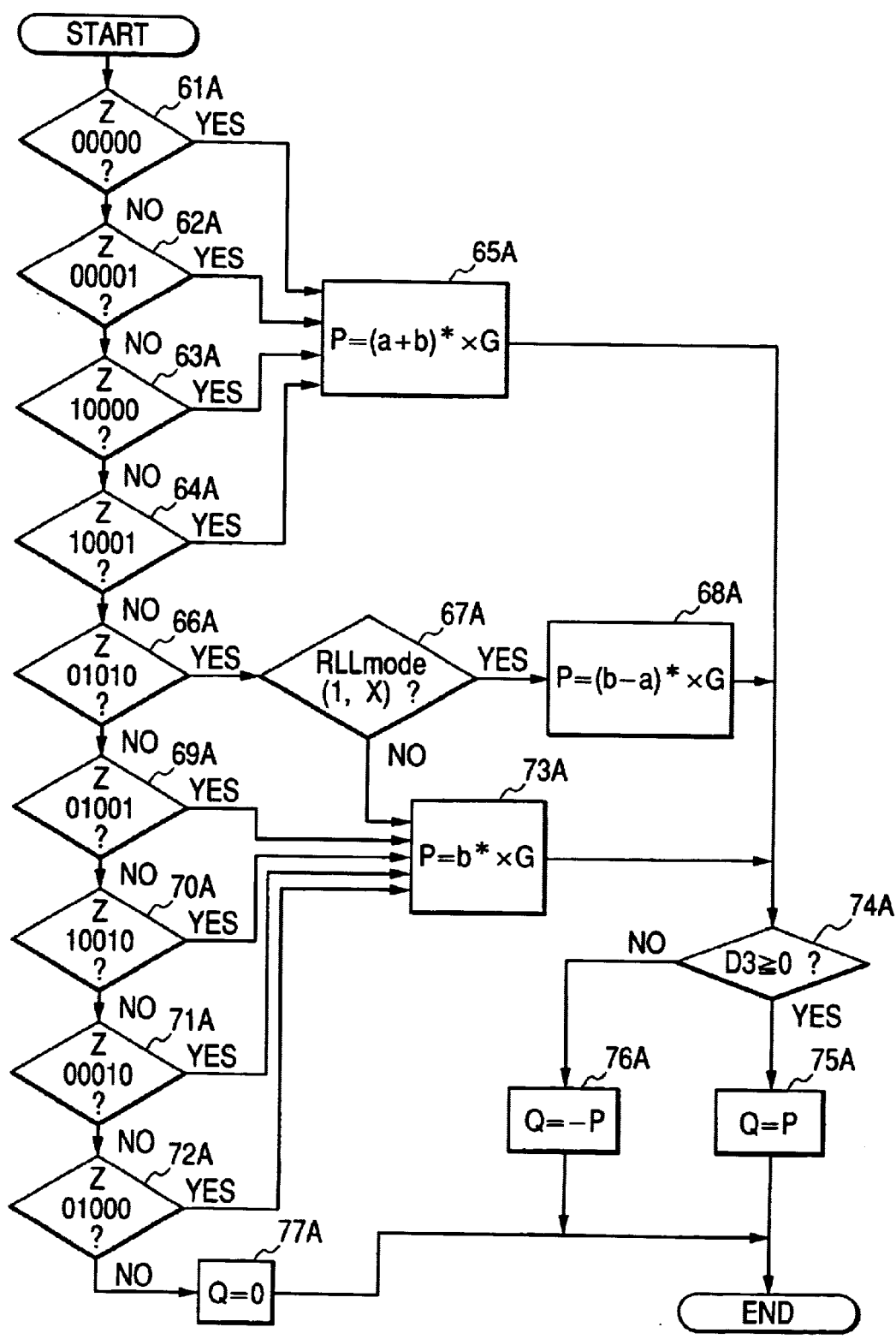
FIG. 31 is a flowchart of an algorithm of a temporary decision by a temporary decision device in FIG. 25.

FIG. 31 is a flowchart of the integral-type-signal algorithm of the temporary decision by the temporary decision device 51A. The temporary decision is executed for every period of the bit clock signal. The integral-type-signal algorithm in FIG. 31 refers to five successive 0-point information values Z represented by the output signals of the tap delay circuit 23. The central-place value (the third-place value) among the five successive 0-point information values Z corresponds to a sample point of interest.

As shown in FIG. 31, a first step 61A of the integral-type-signal algorithm decides whether or not five successive 0-point information values Z represented by the output signals of the tap delay circuit 23 are "00000". When the five successive 0-point information values Z are "00000", the algorithm advances from the step 61A to a step 65A. Otherwise, the algorithm advances from the step 61A to a step 62A.

The step 62A decides whether or not the five successive 0-point information values Z are "00001". When the five successive 0-point information values Z are "00001", the algorithm advances from the step 62A to the step 65A. Otherwise, the algorithm advances from the step 62A to a step 63A.

The step 63A decides whether or not the five successive 0-point information values Z are "10000". When the five successive 0-point information values Z are "10000", the algorithm advances from the step 63A to the step 65A. Otherwise, the algorithm advances from the step 63A to a step 64A.

The step 64A decides whether or not the five successive 0-point information values Z are "10001". When the five successive 0-point information values Z are "10001", the algorithm advances from the step 64A to the step 65A. Otherwise, the algorithm advances from the step 64A to a step 66A.

In the case where the five successive 0-point information values Z are "00000", "00001", "10000", or "10001", the before-equalization signal waveform is fixed in a positive side or a negative side for a long time interval centered at the sample point of interest. Thus, in this case, the step 65A calculates a relatively large value P according to the following equation.

$$P=(a+b)*\cdot G \tag{11}$$

where G denotes the gain (the gain factor) shown in FIG. 30, and a* and b* denote values derived from the values "a" and "b" by an offset for equalizing the central value "a+b" to "0". The values G, a*, and b* are known values designated by the PR mode signal and the RLL mode signal. After the step 65A, the algorithm advances to a step 74A.

The step 66A decides whether or not the five successive 0-point information values Z are "01010". When the five successive 0-point information values Z are "01010", the algorithm advances from the step 66A to a step 67A. Otherwise, the algorithm advances from the step 66A to a step 69A.

The step 67A decides whether or not the RLL mode signal represents RLL (1, X). When the RLL mode signal represents RLL (1, X), the algorithm advances from the step 67A to a step 68A. Otherwise, the program advances from the step 67A to a step 73A.

Five successive 0-point information values Z being "01010" can occur only in the case of RLL (1, X). According to the before-equalization signal waveform which corresponds to five successive 0-point information values Z being "01010", the signal polarity changes at an early stage, specifically at a second bit clock pulse. Thus, in this case, the step 68A calculates a relatively small value P according to the following equation.

$$P=(b-a)*\cdot G \tag{12}$$

After the step 68A, the algorithm advances to the step 74A.

The step 69A decides whether or not the five successive 0-point information values Z are "01001". When the five successive 0-point information values Z are "01001", the algorithm advances from the step 69A to the step 73A. Otherwise, the algorithm advances from the step 69A to a step 70A.

The step 70A decides whether or not the five successive 0point information values Z are "10010". When the five successive 0-point information values Z are "10010", the algorithm advances from the step 70A to the step 73A. Otherwise, the algorithm advances from the step 70A to a step 71A.

The step 71A decides whether or not the five successive 0-point information values Z are "00010". When the five successive 0-point information values Z are "00010", the algorithm advances from the step 71A to the step 73A. Otherwise, the algorithm advances from the step 71A to a step 72A.

The step 72A decides whether or not the five successive 0-point information values Z are "01000". When the five successive 0-point information values Z are "01000", the algorithm advances from the step 72A to the step 73A. Otherwise, the algorithm advances from the step 72A to a step 77A.

In the case where the five successive 0-point information values Z are "01010" and the RLL mode signal does not represent RLL (1, X), and in the case where the five successive 0-point information values Z are "01001", "10010", "00010", or "01000", the before-equalization signal level remains in the same for a short time interval centered at the sample point of interest. Thus, in this case, the step 73A calculates an intermediate value P according to the following equation.

$$P=b*\cdot G \tag{13}$$

After the step 73A, the algorithm advances to the step 74A.

The step 74A detects the polarity of the present-moment signal D3. Specifically, the step 74A decides whether or not the present-moment signal D3 is smaller than "0". When the present-moment signal D3 is equal to or greater than "0", the algorithm advances from the step 74A to a step 75A. When the present-moment signal D3 is smaller than "0", the algorithm advances from the step 74A to a step 76A.

The step 75A sets a temporary decision level (a temporary decision value or a temporary decision result value) Q equal to the value P. In other words, the step 75A executes the statement "Q=P". On the other hand, the step 76A sets the temporary decision level Q equal to the value −P (the value P multiplied by −1). In other words, the step 76A executes the statement "Q=−P". After the steps 75A and 76A, the current execution cycle of the temporary decision ends.

The step 77A sets the temporary decision level Q to "0" according to the statement "Q=0". The algorithm advances to the step 77A in cases including the case where the central-place one (the third-place one) among the the five successive 0-point information values Z is "1". After the step 77A, the current execution cycle of the temporary decision ends.

In this way, the temporary decision device 51A determines the temporary decision level (the temporary decision value) Q according to the integral-type-signal algorithm. The temporary decision device 51A outputs a signal representative of the temporary decision level (the temporary decision value) Q to the subtracter 52 as a temporary decision result signal. The temporary decision value Q is determined on the basis of one of the previously-indicated equations (11), (12), and (13) and the previously-indicated equation "Q=0". Accordingly, the equalization by the transversal filter 21 for an integral-type reproduced signal is based on one of the equations (11), (12), and (13) and the equation "Q=0". The equalization based on one of the equations (11), (12), and (13) and the equation "Q=0" is periodically executed in response to the polarity of the present-moment signal D3 at a timing of the central-place one (the third-place one) among five successive 0-point information values Z.

Figure 32:
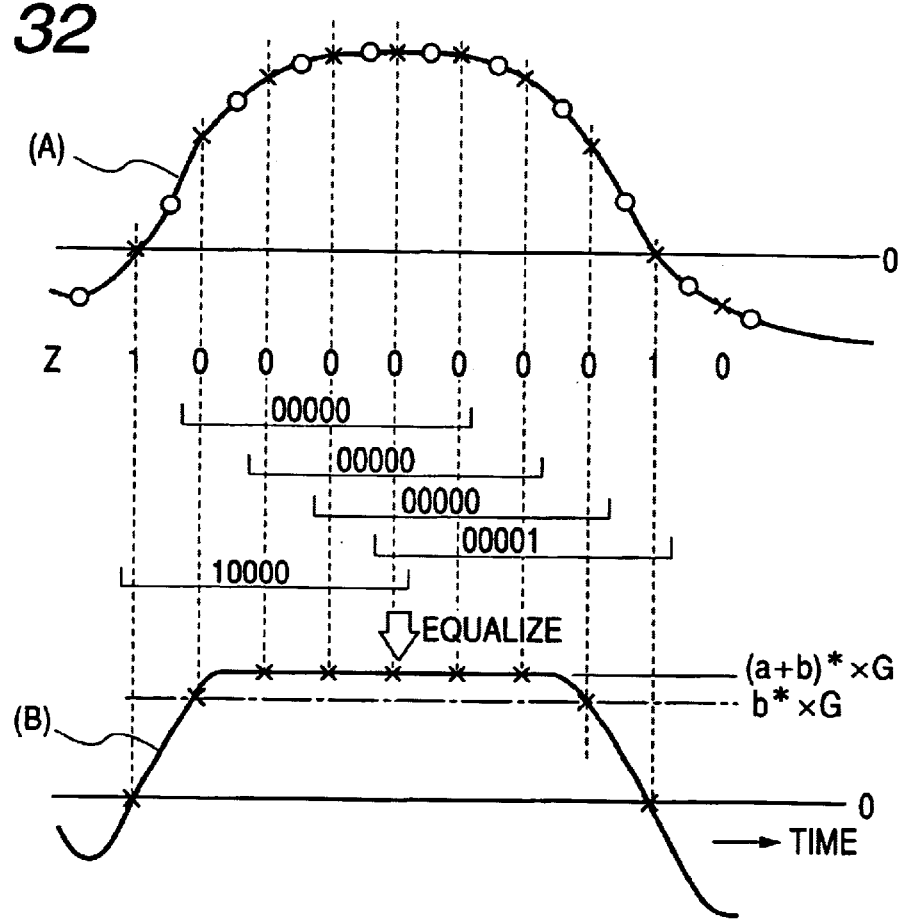
FIG. 32 is a time-domain diagram of a first example of an original waveform and an equalization-resultant waveform in the seventh embodiment of this invention.

The waveform equalization for an integral-type reproduced signal will be described below in more detail. FIG. 32 shows an example of a waveform (A) of original data points "○" which are represented by respective data segments recorded on the optical disc 15. Sample points "×" on the waveform (A) which are given for the PR equalization are temporally distant from the original data points "○" by angular or phase intervals of 180° with respect to the bit clock signal. Values Z of the 0-point information are generated coincidently with sample points "×", respectively. According to the waveform (A), five successive 0-point information values Z change as "10000"→"00000"→"00000"→"00000"→"00001". FIG. 32 also shows an example of an equalization-resultant waveform (B) of sample points "×" which originates from the waveform (A). In the case where the five successive 0-point information values Z are "00000", "10000", or "00001", the waveform equalization is executed on the basis of the previously-indicated equation (11) and the polarity of the present-moment signal D3 at a timing of the central-place one among the five successive 0-point information values Z. In FIG. 32, since the polarity of the present-moment signal D3 at a timing of the central-place one among the five successive 0-point information values Z ("00000", "10000", or "00001") is positive, the waveform equalization reflects the positive value P equal to (a+b)*·G. Specifically, the waveform equalization reflects the temporary decision value Q. The equalization-resultant waveform (B) is basically similar to the original waveform (A).

Figure 33:
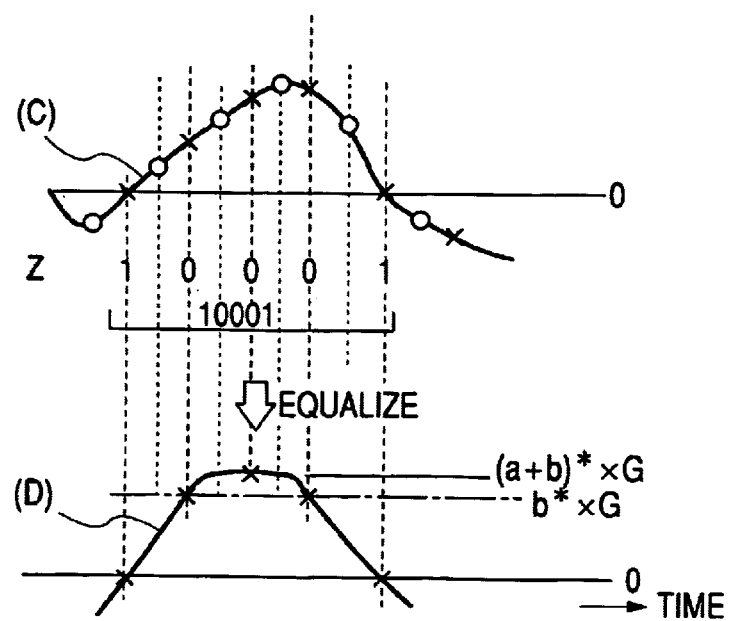
FIG. 33 is a time-domain diagram of a second example of an original waveform and an equalization-resultant waveform in the seventh embodiment of this invention.

FIG. 33 shows an example of a waveform (C) of original data points "○" which are represented by respective data segments recorded on the optical disc 15. Sample points "×" on the waveform (C) are given for the PR equalization. Values Z of the 0-point information are generated coincidently with sample points "×", respectively. According to the waveform (C), five successive 0-point information values Z are "10001". FIG. 33 also shows an example of an equalization-resultant waveform (D) of sample points "×" which originates from the waveform (C). In the case where the five successive 0-point information values Z are "10001", the waveform equalization is executed on the basis of the previously-indicated equation (11) and the polarity of the present-moment signal D3 at a timing of the central-place one among the five successive 0-point information values Z. In FIG. 33, since the polarity of the present moment signal D3 at a timing of the central-place one among the five successive 0-point information values Z ("10001") is positive, the waveform equalization reflects the positive value P equal to (a+b)*·G. Specifically, the waveform equalization reflects the temporary decision value Q. The equalization-resultant waveform (D) is basically similar to the original waveform (C).

Figure 34:
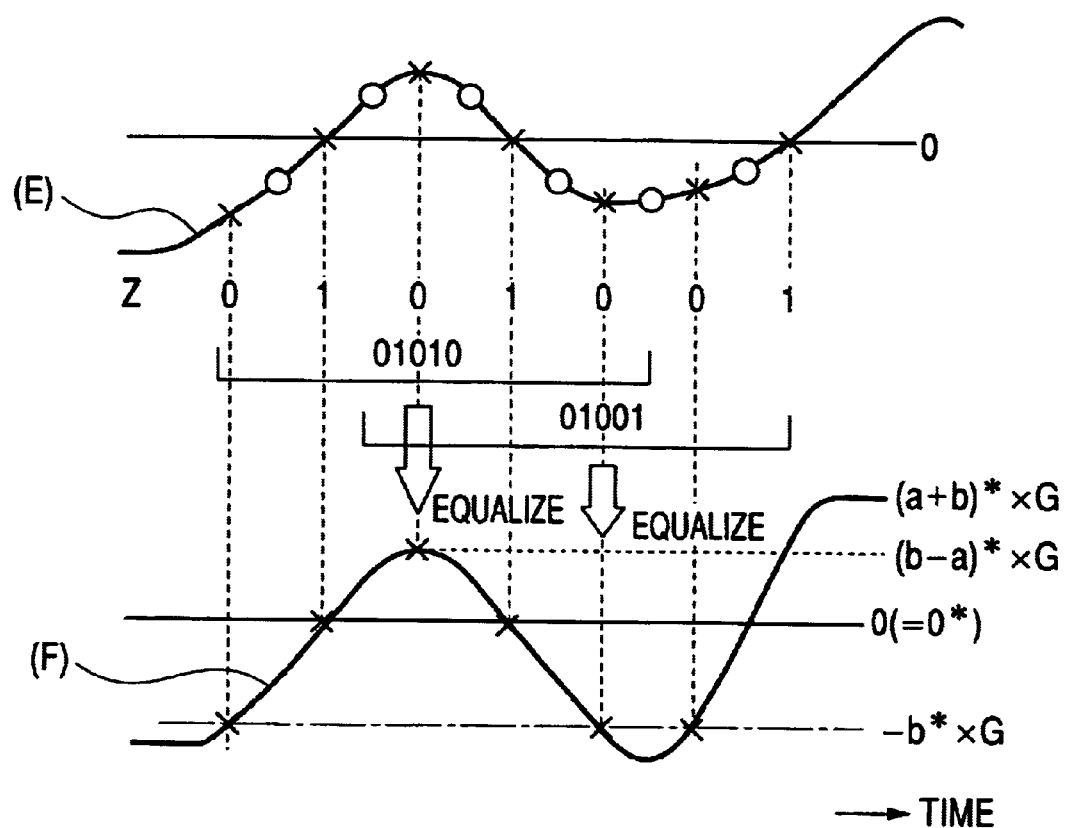
FIG. 34 is a time-domain diagram of a third example of an original waveform and an equalization-resultant waveform in the seventh embodiment of this invention.

FIG. 34 shows an example of a waveform (E) of original data points "○" which are represented by respective RLL (1, X) data segments recorded on the optical disc 15. Sample points "×" on the waveform (E) are given for the PR equalization. Values Z of the 0-point information are generated coincidently with sample points "×", respectively. According to the waveform (E), five successive 0-point information values Z change as "01010"→"10100"→"01001". FIG. 34 also shows an example of an equalization-resultant waveform (F) of sample points "×" which originates from the waveform (E). In the case where the five successive 0-point information values Z are "01010", the waveform equalization is executed on the basis of the previously-indicated equation (12) and the polarity of the present-moment signal D3 at a timing of the central-place one among the five successive 0-point information values Z. In FIG. 34, since the polarity of the present-moment signal D3 at a timing of the central-place one among the five successive 0-point information values Z ("01010") is positive, the waveform equalization reflects the positive value P equal to (b−a)*·G. Specifically, the waveform equalization reflects the temporary decision value Q. In the case where the five successive 0-point information values Z are "01001", the waveform equalization is executed on the basis of the previously-indicated equation (13) and the polarity of the present-moment signal D3 at a timing of the central-place one among the five successive 0-point information values Z. In FIG. 34, since the polarity of the present-moment signal D3 at a timing of the central-place one among the five successive 0-point information values Z ("01001") is negative, the waveform equalization reflects the negative value −P equal to −b*·G. Specifically, the waveform equalization reflects the temporary decision value Q. The equalization-resultant waveform (E) is basically similar to the original waveform (F).

Figure 35:
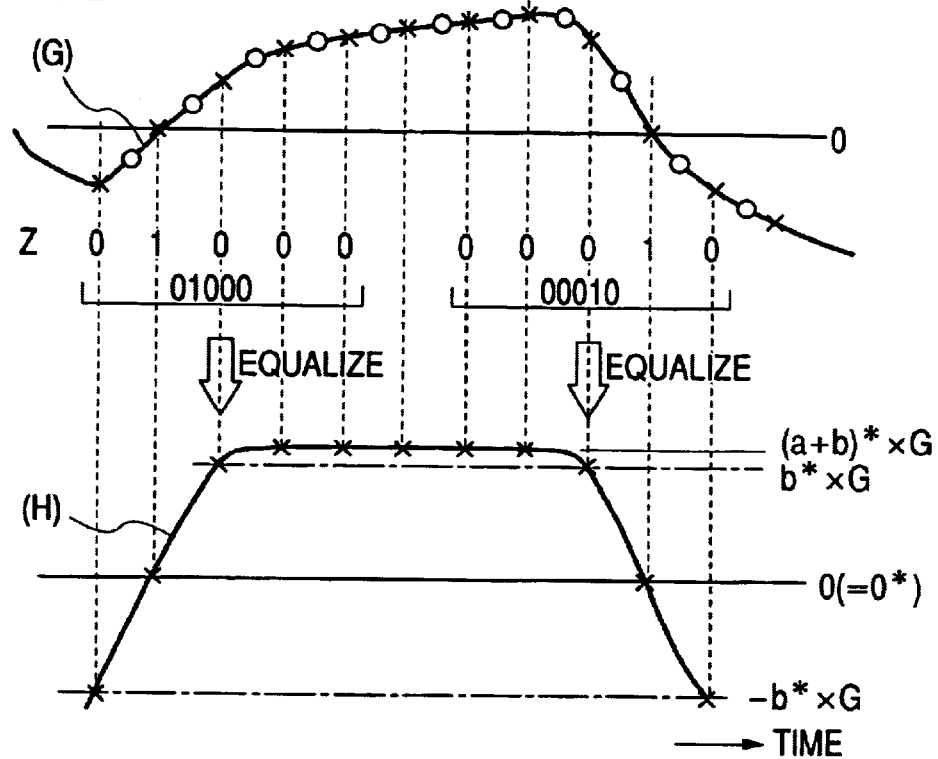
FIG. 35 is a time-domain diagram of a fourth example of an original waveform and an equalization-resultant waveform in the seventh embodiment of this invention.

FIG. 35 shows an example of a waveform (G) of original data points "○" which are represented by data segments recorded on the optical disc 15. Sample points "×" on the waveform (G) are given for the PR equalization. Values Z of the 0-point information are generated coincidently with sample points "×", respectively. According to the waveform (G), five successive 0-point information values Z change as "01000"→"10000"→"00000"→"00000"→"00000"→"00001"→"00010". FIG. 35 also shows an example of an equalization-resultant waveform (H) of sample points "×" which originates from the waveform (G). In the case where the five successive 0-point information values Z are "01000" or "00010", the waveform equalization is executed on the basis of the previously-indicated equation (13) and the polarity of the present-moment signal D3 at a timing of the central-place one among the five successive 0-point information values Z. In FIG. 35, since the polarity of the present-moment signal D3 at a timing of the central-place one among the five successive 0-point information values Z ("01000" or "00010") is positive, the waveform equalization reflects the positive value P equal to b*·G. Specifically, the waveform equalization reflects the temporary decision value Q. The equalization-resultant waveform (H) is basically similar to the original waveform (G).

Figure 36:
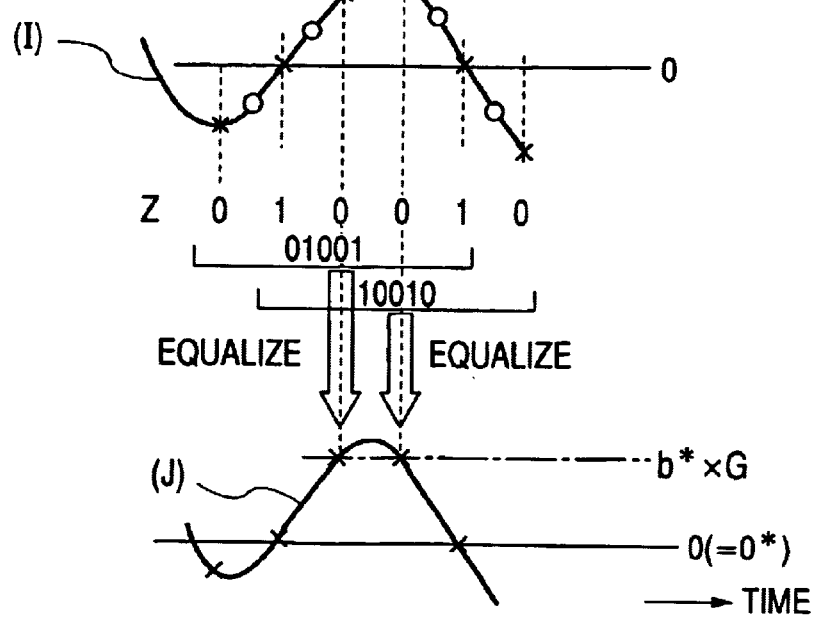
FIG. 36 is a time-domain diagram of a fifth example of an original waveform and an equalization-resultant waveform in the seventh embodiment of this invention.

FIG. 36 shows an example of a waveform (I) of original data points "○" which are represented by data segments recorded on the optical disc 15. Sample points "×" on the waveform (I) are given for the PR equalization. Values Z of the 0-point information are generated coincidently with sample points "×", respectively. According to the waveform (I), five successive 0-point information values Z change as "01001"→"10010". FIG. 36 also shows an example of an equalization-resultant waveform (J) of sample points "×" which originates from the waveform (I). In the case where the five successive 0-point information values Z are "01001" or "10010", the waveform equalization is executed on the basis of the previously-indicated equation (13) and the polarity of the present-moment signal D3 at a timing of the central-place one among the five successive 0-point information values Z. In FIG. 36, since the polarity of the present-moment signal D3 at a timing of the central-place one among the five successive 0-point information values Z ("01001" or "10010") is positive, the waveform equalization reflects the positive value P equal to b*·G. Specifically, the waveform equalization reflects the temporary decision value Q. The able equalization-resultant waveform (J) is basically similar to the original waveform (I).

The waveform equalization for an integral-type reproduced signal is executed in response to five successive 0-point information values Z and also the state transition diagram of FIG. 28. Therefore, the executed waveform equalization is less adversely affected by the level represented by a current signal sample. Thus, the executed waveform equalization is reliable. Furthermore, the executed waveform equalization can be changed among different PR equalizations in response to the PR mode signal and the RLL mode signal. It should be noted that the present embodiment of this invention can be applied to RLL (2, X) since the RLL (2, X) signal state transitions in FIG. 29 are similar to the RLL (1, X) signal state transitions in FIG. 28.

Figure 37:
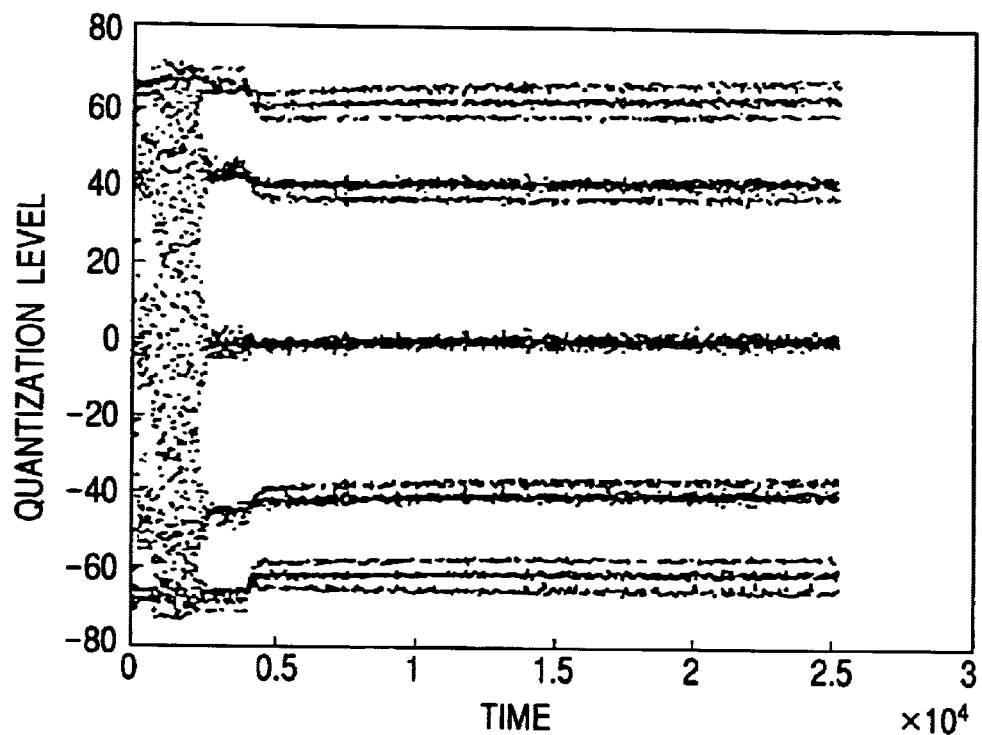
FIG. 37 is a time-domain diagram of samples of an equalization-resultant signal regarding RLL (2, X) and PR (3, 4, 4, 3).

Experiments were carried out. During the experiments, an integral-type test signal of RLL (2, X) was inputted into the reproducing apparatus of FIG. 22 for PR (3, 4, 4, 3). The integral-type test signal was processed by the reproducing apparatus of FIG. 22 into an equalization-resultant signal which appeared at the output terminal of the adaptive equalization circuit 20f. FIG. 37 shows time-domain conditions of the equalization-resultant signal. In FIG. 37, the abscissa denotes time elapsed, and the ordinate denotes the quantization levels of signal samples. As shown in FIG. 37, samples of the equalization-resultant signal quickly converged on five different levels corresponding to "2a+2b", "a+2b", "a+b", "a", and "0".

Figure 38:
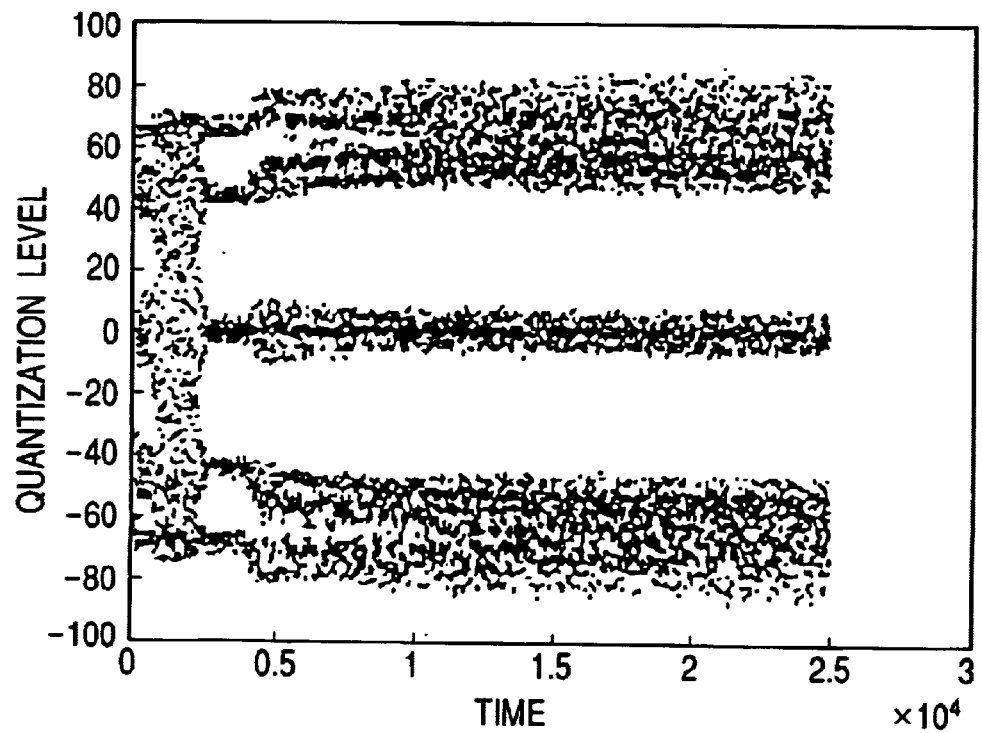
FIG. 38 is a time-domain diagram of samples of an equalization-resultant signal regarding RLL (2, X) and PR (1, 1).

Also, during the experiments, an integral-type test signal of RLL (2, X) was inputted into the reproducing apparatus of FIG. 22 for PR (1, 1). The integral-type test signal was processed by the reproducing apparatus of FIG. 22 into an equalization-resultant signal which appeared at the output terminal of the adaptive equalization circuit 20f. FIG. 38 shows time-domain conditions of the equalization-resultant signal. In FIG. 38, the abscissa denotes time elapsed, and the ordinate denotes the quantization levels of signal samples. As shown in FIG. 38, samples of the equalization-resultant signal quickly converged on three different levels corresponding to "a+2b", "a+b", and "a".

Eighth Embodiment

Figure 39:
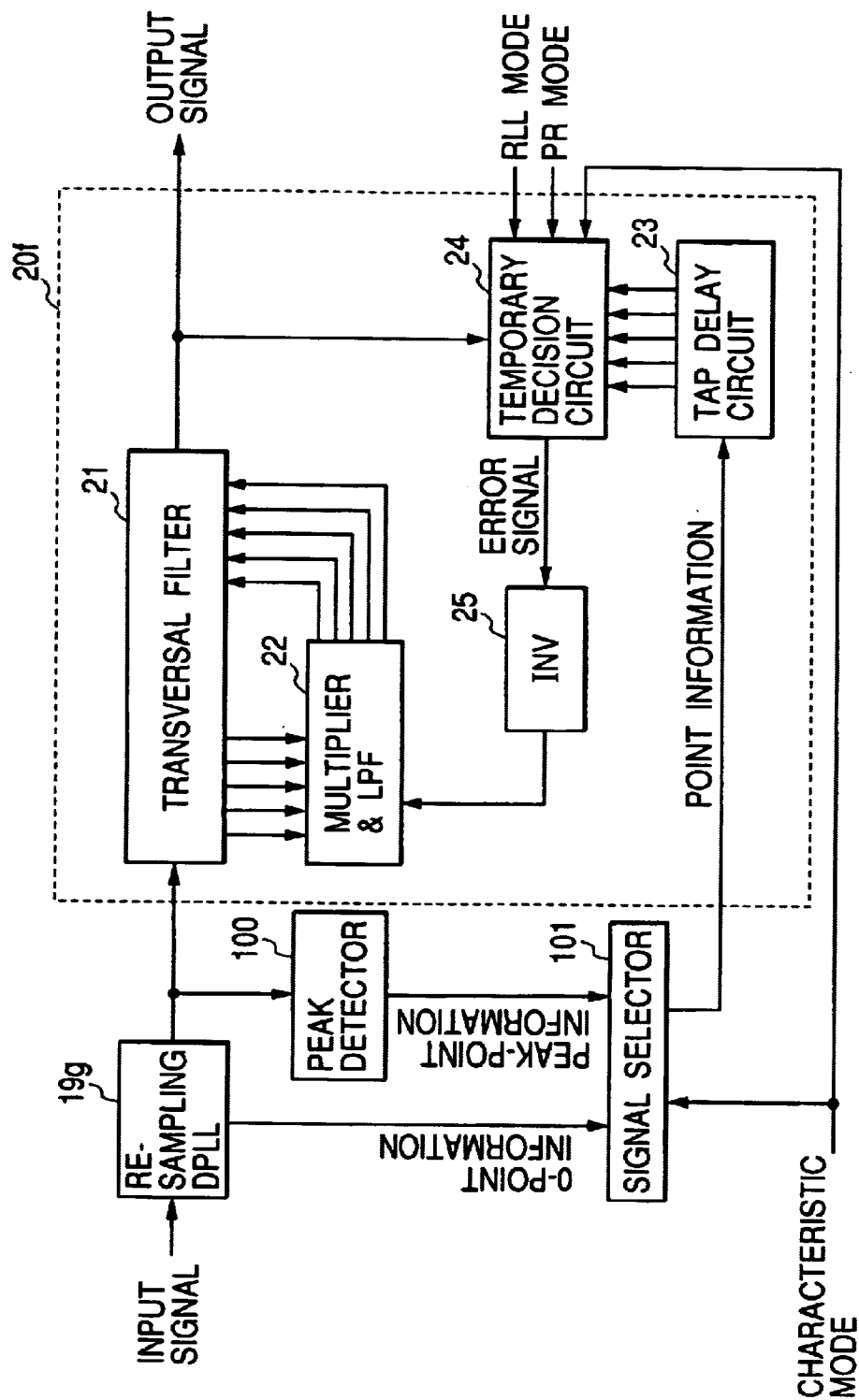
FIG. 39 is a block diagram of a portion of a reproducing apparatus according to an eighth embodiment of this invention.

FIG. 39 shows a portion of a reproducing apparatus according to an eighth embodiment of this invention. The reproducing apparatus in FIG. 39 is similar to the reproducing apparatus in FIG. 24 except that a re-sampling DPLL section 19g replaces the re-sampling DPLL section 19f (see FIG. 24), and a peak detector 100 and a signal selector 101 are additionally provided. The peak detector 100 is connected to the re-sampling DPLL section 19g and the signal selector 101. The signal selector 101 is connected to the re-sampling DPLL section 19g and an adaptive equalization circuit 20f.

With reference to FIG. 39, the re-sampling DPLL section 19g does not receive a characteristic mode signal. Thus, the re-sampling DPLL section 19g does not respond to the characteristic mode signal. The re-sampling DPLL section 19g has the second PLL circuit 19Q (see FIG. 23). The re-sampling DPLL section 19g does not have the first PLL circuit 19P, and the switches 19R and 19S (see FIG. 23). The second digital signal (the main digital signal) generated by the second PLL circuit 19Q is continuously outputted from the re-sampling DPLL section 19g to the adaptive equalization circuit 20f. The 0-point information generated by the second PLL circuit 19Q is outputted from the re-sampling DPLL section 19g to the signal selector 101.

The peak detector 100 receives the main digital signal (the second digital signal) from the re-sampling DPLL section 19g. The peak detector 100 calculates the slope (differential) of the level represented by the main digital signal from the re-sampling DPLL section 19g on the basis of two successive samples thereof. The peak detector 100 senses every inversion of the polarity of the calculated slope. The peak detector 100 examines the two slopes at sample points immediately preceding and immediately following the polarity-inversion moment respectively. The peak detector 100 selects one from the two slopes which is closer to "0". The peak detector 100 sets a peak-point information value PK to "1" for the selected slope. The peak detector 100 sets the peak-point information value PK to "0" for the other slope (the unselected slope). In the absence of a sensed polarity inversion, the peak detector 100 continuously sets the peak-point information value PK to "0". Thus, the peak detector 100 generates peak-point information representing the value PK. The peak detector 100 outputs the peak-point information to the signal selector 101.

The signal selector 101 receives the characteristic mode signal. The device 101 selects one of the peak-point information and the 0-point information in response to the characteristic mode signal. Specifically, the device 101 selects the peak-point information when the characteristic mode signal indicates that the waveform of a signal reproduced from an optical disc 15 is of the differential type. The device 101 selects the 0-point information when the characteristic mode signal indicates that the waveform of a signal reproduced from the optical disc 15 is of the integral type. The signal selector 101 outputs the selected point information to a tap delay circuit 23 within the adaptive equalization circuit 20f.

Ninth Embodiment

Figure 40:
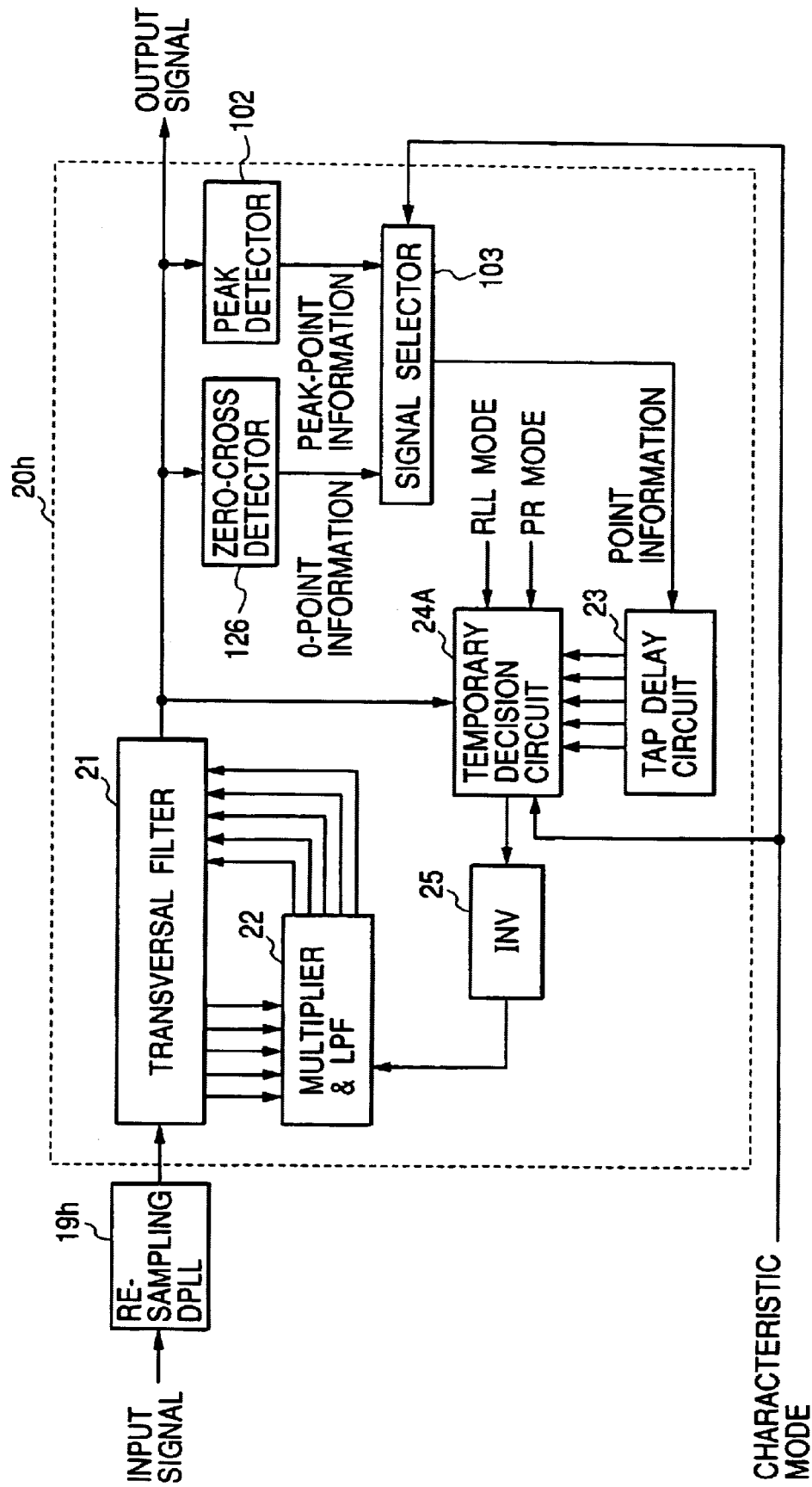
FIG. 40 is a block diagram of a portion of a reproducing apparatus according to a ninth embodiment of this invention.

FIG. 40 shows a portion of a reproducing apparatus according to a ninth embodiment of this invention. The reproducing apparatus in FIG. 40 is similar to the reproducing apparatus in FIG. 24 except that a re-sampling DPLL section 19h and an adaptive equalization circuit 20h replace the re-sampling DPLL section 19f and the adaptive equalization circuit 20f (see FIG. 24) respectively.

With reference to FIG. 40, the re-sampling DPLL section 19h does not receive a characteristic mode signal. Thus, the re-sampling DPLL section 19h does not respond to the characteristic mode signal. The re-sampling DPLL section 19h generates neither 0-point information nor peak-point information. The re-sampling DPLL section 19h generates a second digital signal (a main digital signal) from the output signal of an AGC circuit 18B (see FIG. 22) by a PLL-based re-sampling process. The re-sampling DPLL section 19h outputs the second digital signal (the main digital signal) to a transversal filter 21 within the adaptive equalization circuit 20h.

The adaptive equalization circuit 20h is similar to the adaptive equalization circuit 20f (see FIG. 24) except for the following points. The adaptive equalization circuit 20h includes a peak detector 102, a signal selector 103, and a zero-cross detector 126. The input terminal of the peak detector 102 is connected to the output terminal of the transversal filter 21. The output terminal of the peak detector 102 is connected to the signal selector 103. The input terminal of the zero-cross detector 126 is connected to the output terminal of the transversal filter 21. The output terminal of the zero-cross detector 126 is connected to the signal selector 103. The signal selector 103 is connected to the input terminal of a tap delay circuit 23.

The peak detector 102 calculates the slope (differential) of the level represented by the output signal of the transversal filter 21 on the basis of two successive samples thereof. The peak detector 102 senses every inversion of the polarity of the calculated slope. The peak detector 102 examines the two slopes at sample points immediately preceding and immediately following the polarity-inversion moment respectively. The peak detector 102 selects one from the two slopes which is closer to "0". The peak detector 102 sets a peak-point information value PK to "1" for the selected slope. The peak detector 102 sets the peak-point information value PK to "0" for the other slope (the unselected slope). In the absence of a sensed polarity inversion, the peak detector 102 continuously sets the peak-point information value PK to "0". Thus, the peak detector 102 generates peak-point information representing the value PK. The peak detector 102 outputs the peak-point information to the signal selector 103.

The zero-cross detector 126 senses every inversion of the polarity of the output signal of the transversal filter 21 by referring to two successive samples thereof. For every sensed polarity inversion, the zero-cross detector 126 selects one from among two related signal samples which is closer to "0". The zero-cross detector 126 sets a 0-point information value Z to "1" for the selected signal sample. The zero-cross detector 126 sets the 0-point information value Z to "0" for the other signal sample (the unselected signal sample). In the absence of a sensed polarity inversion, the zero-cross detector 126 continuously sets the 0-point information value Z to "0". Thus, the zero-cross detector 126 generates 0-point information representing the value Z. The zero-cross detector 126 outputs the 0-point information to the signal selector 103.

The signal selector 103 receives the characteristic mode signal. The device 103 selects one of the peak-point information and the 0-point information in response to the characteristic mode signal. Specifically, the device 103 selects the peak-point information when the characteristic mode signal indicates that the waveform of a signal reproduced from an optical disc 15 (see FIG. 22) is of the differential type. The device 103 selects the 0-point information when the characteristic mode signal indicates that the waveform of a signal reproduced from the optical disc 15 is of the integral type. The signal selector 103 outputs the selected point information to the tap delay circuit 23.

Tenth Embodiment

Figure 41:
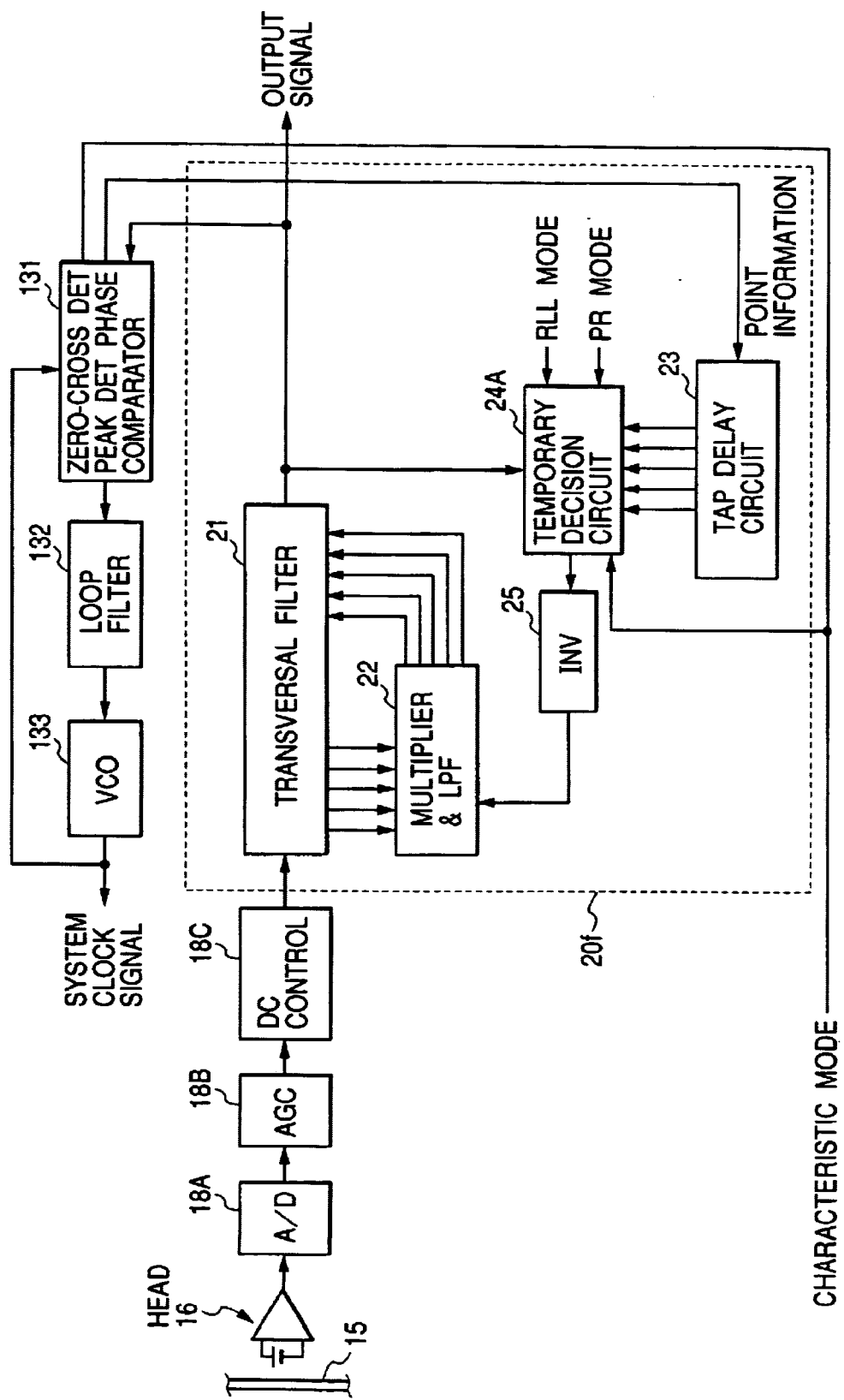
FIG. 41 is a block diagram of a portion of a reproducing apparatus according to a tenth embodiment of this invention.

FIG. 41 shows a portion of a reproducing apparatus according to a tenth embodiment of this invention. The reproducing apparatus in FIG. 41 is similar to the reproducing apparatus in FIG. 22 except for design changes mentioned hereinafter. The reproducing apparatus in FIG. 41 includes an A/D converter 18A, an AGC circuit 18B, and a DC controller 18C which successively follow an optical head 16 in that order. The output terminal of the DC controller 18C is connected to the input terminal of a transversal filter 21 within an adaptive equalization circuit 20f.

The A/D converter 18A receives the output signal of the optical head 16. The A/D converter 18A changes the output signal of the optical head 16 into a corresponding digital signal (a first digital signal). Specifically, the A/D converter 18A periodically samples the output signal of the optical head 16 in response to a system clock signal, and converts every resultant sample into a digital sample. The A/D converter 18A outputs the digital signal to the AGC circuit 18B. The AGC circuit 18B subjects the output signal of the A/D converter 18A to automatic gain control for providing a constant signal amplitude on a digital basis. The AGC circuit 18B outputs the resultant digital signal to the DC controller 18C. The DC controller 18C subjects the output signal of the AGC circuit 18B to ATC (automatic threshold control). The DC controller 18C outputs the control-resultant signal to the transversal filter 21 within the Ad adaptive equalization circuit 20f.

The reproducing apparatus in FIG. 41 includes a phase comparison circuit 131, a loop filter 132, and a voltage-controlled oscillator (VCO) 133 which are connected in a closed loop in that order. The phase comparison circuit 131 is connected to the output terminal of the transversal filter 21 within the adaptive equalization circuit 20f. The phase comparison circuit 131 receives the output signal of the transversal filter 21. The phase comparison circuit 131 compares the phase of the output signal of the transversal filter 21 and the phase of a system clock signal fed from the VCO 133, and generates a phase error signal in response to the result of the phase comparison. The phase comparison circuit 131 outputs the phase error signal to the loop filter 132. The loop filter 132 converts the phase error signal into a control voltage. The loop filter 132 outputs the control voltage to the VCO 133. The VCO 133 oscillates at a frequency determined by the control voltage, and thereby generates the system clock signal. The VCO 133 outputs the system clock signal to the A/D converter 18A and other devices and circuits within the reproducing apparatus. The system clock signal may include a bit clock signal.

The phase comparison circuit 131 includes a peak detector and a zero-cross detector. The peak detector in the phase comparison circuit 131 calculates the slope (differential) of the level represented by the output signal of the transversal filter 21 on the basis of two successive samples thereof. The peak detector senses every inversion of the polarity of the calculated slope. The peak detector examines the two slopes at sample points immediately preceding and immediately following the polarity-inversion moment respectively. The peak detector selects one from the two slopes which is closer to "0". The peak detector sets a peak-point information value PK to "1" for the selected slope. The peak detector sets the peak-point information value PK to "0" for the other slope (the unselected slope). In the absence of a sensed polarity inversion, the peak detector continuously sets the peak-point information value PK to "0". Thus, the peak detector generates peak-point information representing the value PK.

The zero-cross detector in the phase comparison circuit 131 senses every inversion of the polarity of the output signal of the transversal filter 21 by referring to two successive samples thereof. For every sensed polarity inversion, the zero-cross detector selects one from among two related signal samples which is closer to "0". The zero-cross detector sets a 0-point information value Z to "1" for the selected signal sample. The zero-cross detector sets the 0-point information value Z to "0" for the other signal sample (the unselected signal sample). In the absence of a sensed polarity inversion, the zero-cross detector continuously sets the 0-point information value Z to "0". Thus, the zero-cross detector generates 0-point information representing the value Z.

The phase comparison circuit 131 includes a switch which receives a characteristic mode signal. The switch selects one of the peak-point information and the 0-point information in response to the characteristic mode signal. Specifically, the switch selects the peak-point information when the characteristic mode signal indicates that the waveform of a signal reproduced from an optical disc 15 (see FIG. 22) is of the differential type. The switch selects the 0-point information when the characteristic mode signal indicates that the waveform of a signal reproduced from the optical disc 15 is of the integral type. The switch outputs the selected point information to a tap delay circuit 23 within the adaptive equalization circuit 20f.

Eleventh Embodiment

Figure 42:
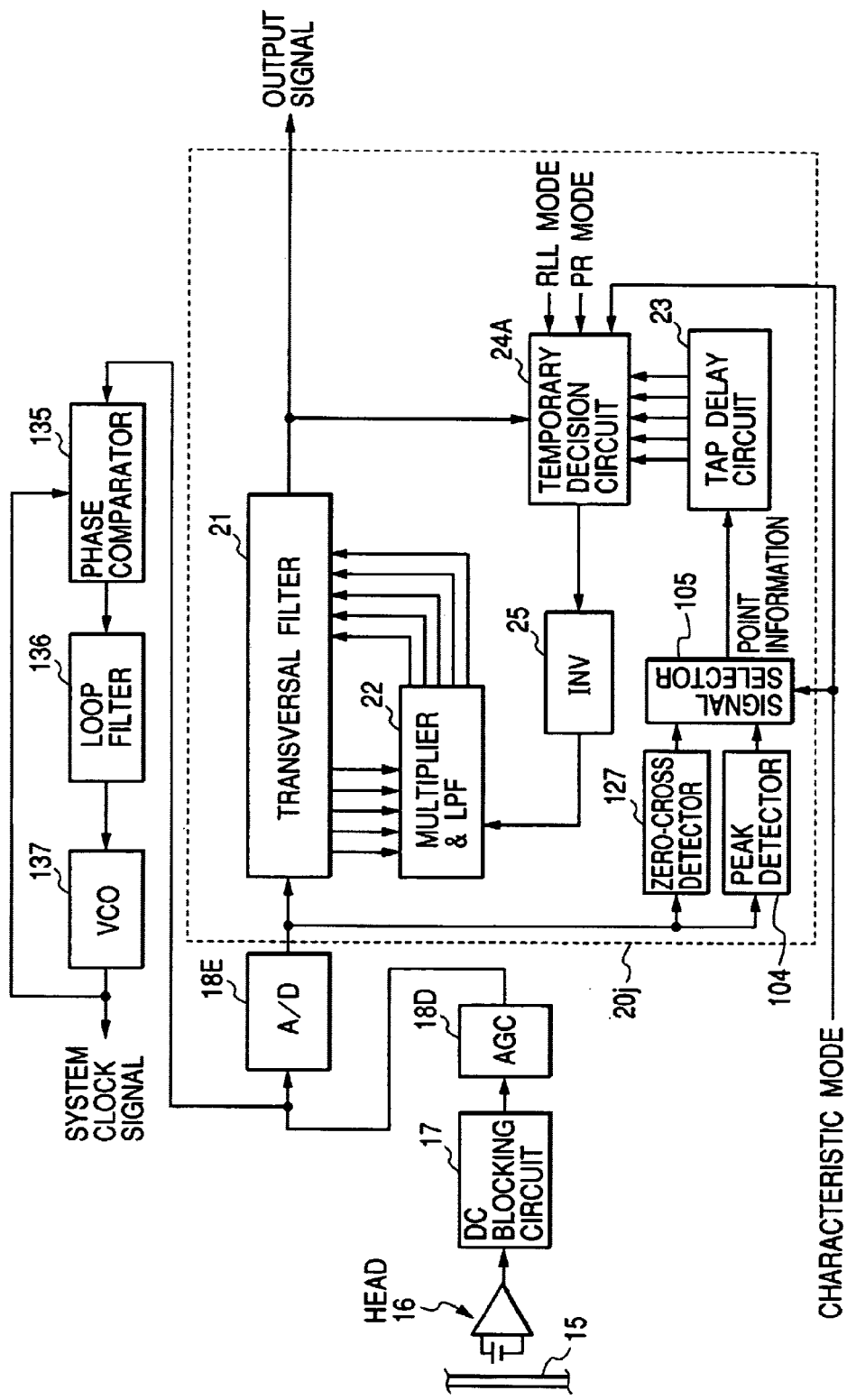
FIG. 42 is a block diagram of a portion of a reproducing apparatus according to an eleventh embodiment of this invention.

FIG. 42 shows a portion of a reproducing apparatus according to an eleventh embodiment of this invention. The reproducing apparatus in FIG. 42 is similar to the reproducing apparatus in FIG. 22 except for design changes mentioned hereinafter. The reproducing apparatus in FIG. 42 includes an AGC circuit 18D and an A/D converter 18E which successively follow a DC blocking circuit 17 in that order.

The reproducing apparatus in FIG. 42 includes an adaptive equalization circuit 20j instead of the adaptive equalization circuit 20f (see FIGS. 22 and 24). The adaptive equalization circuit 20j is similar to the adaptive equalization circuit 20f except that a peak detector 104, a signal selector 105, and a zero-cross detector 127 are provided therein. The input terminals of the peak detector 104 and the zero-cross detector 127 are connected to the output terminal of the A/D converter 18E. The output terminals of the peak detector 104 and the zero-cross detector 127 are connected to the signal selector 105. The signal selector 105 is connected to the input terminal of a tap delay circuit 23. The input terminal of a transversal filter 21 is connected to the output terminal of the A/D converter 18E.

The AGC circuit 18D receives the output signal of the DC blocking circuit 17. The AGC circuit 18D subjects the output signal of the DC blocking circuit 17 to automatic gain control for providing a constant signal amplitude on an analog basis. The AGC circuit 18D outputs the resultant signal to the A/D converter 18E. The A/D converter 18E changes the output signal of the AGC circuit 18D into a corresponding digital signal. Specifically, the A/D converter 18E periodically samples the output signal of the AGC circuit 18D in response to a system clock signal, and converts every resultant sample into a digital sample. The A/D converter 18E outputs the digital signal to the transversal filter 21, the peak detector 104, and the zero-cross detector 127 within the adaptive equalization circuit 20j.

The peak detector 104 calculates the slope (differential) of the level represented by the output signal of the A/D converter 18E on the basis of two successive samples thereof. The peak detector 104 senses every inversion of the polarity of the calculated slope.

The peak detector 104 senses a sample point immediately preceding the sample point corresponding to the sensed polarity inversion. The peak detector 104 sets a peak-point information value PK to "1" for the sensed sample point. The peak detector 104 sets the peak-point information value PK to "0" for the other sample points. Thus, the peak detector 104 generates peak-point information representing the value PK. The peak detector 104 outputs the peak-point information to the signal selector 105.

The zero-cross detector 127 senses every inversion of the polarity of the output signal of the A/D converter 18E by referring to two successive samples thereof. For every sensed polarity inversion, the zero-cross detector 127 selects one from among two related signal samples which is closer to "0". The zero-cross detector 127 sets a 0-point information value Z to "1" for the selected signal sample. The zero-cross detector 127 sets the 0-point information value Z to "0" for the other signal sample (the unselected signal sample). In the absence of a sensed polarity inversion, the zero-cross detector 127 continuously sets the 0-point information value Z to "0". Thus, the zero-cross detector 127 generates 0-point information representing the value Z. The zero-cross detector 127 outputs the 0-point information to the signal selector 105.

The signal selector 105 receives a characteristic mode signal. The device 105 selects one of the peak-point information and the 0-point information in response to the characteristic mode signal. Specifically, the device 105 selects the peak-point information when the characteristic mode signal indicates that the waveform of a signal reproduced from an optical disc 15 is of the differential type. The device 105 selects the 0-point information when the characteristic mode signal indicates that the waveform of a signal reproduced from the optical disc 15 is of the integral type. The signal selector 105 outputs the selected point information to the tap delay circuit 23.

The reproducing apparatus in FIG. 42 includes a phase comparator 135, a loop filter 136, and a voltage-controlled oscillator (VCO) 137 which are connected in a closed loop in that order. The phase comparator 135 receives the output signal of the AGC circuit 18D. The device 135 compares the phase of the output signal of the AGC circuit 18D and the phase of a system clock signal fed from the VCO 137, and generates a phase error signal in response to the result of the phase comparison. The phase comparator 135 outputs the phase error signal to the loop filter 136. The loop filter 136 converts the phase error signal into a control voltage. The loop filter 136 outputs the control voltage to the VCO 137. The VCO 137 oscillates at a frequency determined by the control voltage, and thereby generates the system clock signal. The VCO 137 outputs the system clock signal to the A/D converter 18E and other devices and circuits within the reproducing apparatus. The system clock signal may include a bit clock signal.

Twelfth Embodiment

A twelfth embodiment of this invention is similar to one of the seventh, eighth, ninth, tenth, and eleventh embodiments thereof except for design changes mentioned below. In the twelfth embodiment of this invention, a temporary decision device 51A (see FIG. 25) refers to only three successive 0-point information values Z during the execution of an integral-type-signal algorithm of a temporary decision. The central-place value (the second-place value) among the three successive 0-point information values Z corresponds to a sample point of interest.

Figure 43:
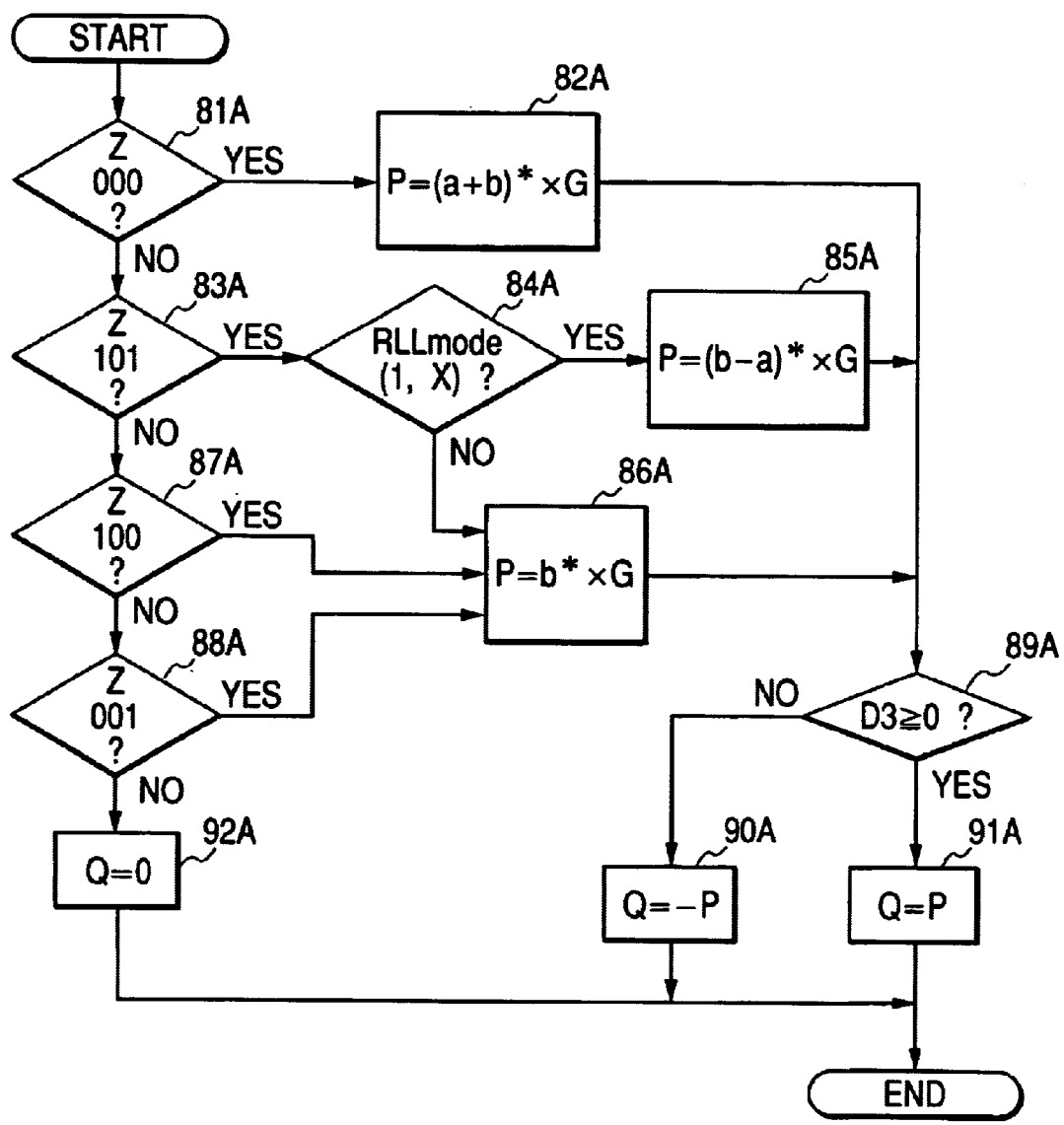
FIG. 43 is a flowchart of an algorithm of a temporary decision by a temporary decision device in a twelfth embodiment of this invention.

FIG. 43 is a flowchart of the integral-type-signal algorithm of the temporary decision by the temporary decision device 51A in the twelfth embodiment of this invention. The temporary decision is executed for every period of a bit clock signal.

As shown in FIG. 43, a first step 81A of the algorithm decides whether or not three successive 0-point information values Z represented by output signals of a tap delay circuit 23 (see FIG. 25) are "000". When the three successive 0-point information values Z are "000", the algorithm advances from the step 81A to a step 82A. Otherwise, the algorithm advances from the step 81A to a step 83A.

In the case where the three successive 0-point information values Z are "000", the before-equalization signal waveform is fixed in a positive side or a negative side for a long time interval centered at the sample point of interest. Thus, in this case, the step 82A calculates a relatively large value P according to the previously-indicated equation (11). After the step 82A, the algorithm advances to a step 89A.

The step 83A decides whether or not the three successive 0-point information values Z are "101". When the three successive 0-point information values Z are "101", the algorithm advances from the step 83A to a step 84A. Otherwise, the algorithm advances from the step 83A to a step 87A.

The step 84A decides whether or not the RLL mode signal represents RLL (1, X). When the RLL mode signal represents RLL (1, X), the algorithm advances from the step 84A to a step 85A. Otherwise, the program advances from the step 84A to a step 86A.

Three successive 0-point information values Z being "101" can occur only in the case of RLL (1, X). According to the before-equalization signal waveform which corresponds to three successive 0-point information values Z being "101", the signal polarity changes at an early stage. Thus, in this case, the step 85A calculates a relatively small value P according to the previously-indicated equation (12). After the step 85A, the algorithm advances to the step 89A.

The step 87A decides whether or not the three successive 0-point information values Z are "100". When the three successive 0-point information values Z are "100", the algorithm advances from the step 87A to the step 86A. Otherwise, the algorithm advances from the step 87A to a step 88A.

The step 88A decides whether or not the three successive 0-point information values Z are "001". When the three successive 0-point information values Z are "001", the algorithm advances from the step 88A to the step 86A. Otherwise, the algorithm advances from the step 88A to a step 92A.

In the case where the three successive 0-point information values Z are "101" and the RLL mode signal does not represent RLL (1, X), and in the case where the three successive 0-point information values Z are "100" or "001", the before-equalization signal level remains in the same for a short time interval centered at the sample point of interest. Thus, in this case, the step 86A calculates an intermediate value P according to the previously-indicated equation (13). After the step 86A, the algorithm advances to the step 89A.

The step 89A detects the polarity of the present-moment signal D3. Specifically, the step 89A decides whether or not the present-moment signal D3 is smaller than "0". When the present-moment signal D3 is equal to or greater than "0", the algorithm advances from the step 89A to a step 91A. When the present-moment signal D3 is smaller than "0", the algorithm advances from the step 89A to a step 90A.

The step 91A sets a temporary decision level (a temporary decision value or a temporary decision result value) Q equal to the value P. In other words, the step 91A executes the statement "Q=P". On the other hand, the step 90A sets the temporary decision level Q equal to the value –P (the value P multiplied by –1). In other words, the step 90A executes the statement "Q=–P". After the steps 90A and 91A, the current execution cycle of the temporary decision ends.

The step 92A sets the temporary decision level Q equal to "0" according to the statement "Q=0". The algorithm advances to the step 92A in cases including the case where the central-place one among the the three successive 0-point information values Z is "1". After the step 92A, the current execution cycle of the temporary decision ends.

The temporary decision device 51A (see FIG. 25) outputs a signal representative of the temporary decision level (the temporary decision value) Q to the subtracter 52 as a temporary decision result signal for an integral-type reproduced signal. The temporary decision value Q is determined on the basis of one of the previously-indicated equations (11), (12), and (13) and the previously-indicated equation "Q=0". Accordingly, the equalization by the transversal filter 21 (see FIG. 24) for an integral-type reproduced signal is based on one of the equations (11), (12), and (13) and the equation "Q=0". The equalization based on one of the equations (11), (12), and (13) and the equation "Q=0" is periodically executed in response to the polarity of the present-moment signal D3 at a timing of the central-place one (the second-place one) among three successive 0-point information values Z.

Thirteenth Embodiment

A thirteenth embodiment of this invention is similar to one of the seventh, eighth, ninth, tenth, eleventh, and twelfth embodiments thereof except for design changes mentioned below. In the thirteenth embodiment of this invention, a temporary decision device 51A (see FIG. 25) refers to only three successive peak-point information values PK during the execution of a differential-type-signal algorithm of a temporary decision. The differential-type-signal algorithm in the thirteenth embodiment of this invention is similar to the temporary decision algorithm in FIG. 20.

Fourteenth Embodiment

A fourteenth embodiment of this invention is similar to one of the first to thirteenth embodiments thereof except that at least one of the PR mode signal and the RLL mode signal fed to the temporary decision circuit 24 or 24A is fixed.

Fifteenth Embodiment

A fifteenth embodiment of this invention is similar to one of the first to fourteenth embodiments thereof except that the inverter is replaced by an inverter array receiving the tap output signals from the transversal filter 21. The inverter array inverts the tap output signals, and outputs the inversion-resultant signals to the multiplier and LPF section 22.

Sixteenth Embodiment

A sixteenth embodiment of this invention is similar to one of the first to fourteenth embodiments thereof except that the inverter is replaced by an inverter array receiving the output signals of the multiplier and LPF section 22 which represent tap coefficients. The inverter array inverts the tap-coefficient signals, and outputs the inversion-resultant signals to the transversal filter 21.

Seventeenth Embodiment

A seventeenth embodiment of this invention is similar to one of the first to fourteenth embodiments thereof except that the inverter 25 is replaced by an arrangement which changes the polarity of a main digital signal (a second digital signal) within the transversal filter 21.

Eighteenth Embodiment

An eighteenth embodiment of this invention is similar to one of the first to fourteenth embodiments thereof except that the inverter 25 is replaced by an arrangement which implements signal-polarity inversion at a place in the loop of a signal propagation path.

What is claimed is:

1. A reproducing apparatus comprising:

first means for reproducing a signal of a run-length-limited code from a recording medium;

a transversal filter subjecting the signal reproduced by the first means to a partial-response waveform equalization to generate an equalization-resultant signal, the partial-response waveform equalization depending on tap coefficients;

second means for detecting whether or not the signal reproduced by the first means corresponds to a peak point, and generating peak-point information in response to a result of said detecting;

a delay circuit responsive to the peak-point information generated by the second means for outputting at least three successive samples of the peak-point information;

a temporary decision device for calculating a temporary decision value of the equalization-resultant signal on the basis of a PR mode signal, an RLL mode signal, the successive samples of the peak-point information which are outputted from the delay circuit, and an actual value of the equalization-resultant signal, the PR mode signal representing a type of the partial-response waveform equalization, the RLL mode signal representing a type of the run-length-limited code;

third means for calculating a difference between the temporary decision value of the equalization-resultant signal and the actual value thereof, and generating an error signal in response to the calculated difference; and fourth means for controlling the tap coefficients of the transversal filter in response to the error signal generated by the third means so as to minimize the error signal.

2. A reproducing apparatus as recited in claim 1, wherein at least one of the PR mode signal and the RLL mode signal remains fixed.

3. A reproducing apparatus as recited in claim 1, wherein the second means comprises an A/D converter for converting the signal reproduced by the first means into a digital signal, means for subjecting the digital signal generated by the A/D converter to a re-sampling process to generate a re-sampling resultant signal, means for feeding the re-sampling resultant signal to the transversal filter, and means for detecting whether or not the digital signal generated by the A/D converter corresponds to a peak point, and generating peak-point information in response to a result of said detecting.

4. A reproducing apparatus comprising:

first means for reproducing a signal of a run-length-limited code from a recording medium;

a transversal filter subjecting the signal reproduced by the first means to a partial-response waveform equalization to generate an equalization-resultant signal, the partial-response waveform equalization depending on tap coefficients;

second means for detecting whether or not the equalization-resultant signal generated by the transversal filter corresponds to a peak point, and generating peak-point information in response to a result of said detecting;

a delay circuit responsive to the peak-point information generated by the second means for outputting at least three successive samples of the peak-point information;

a temporary decision device for calculating a temporary decision value of the equalization-resultant signal on the basis of a PR mode signal, an RLL mode signal, the successive samples of the peak-point information which are outputted from the delay circuit, and an actual value of the equalization-resultant signal, the PR mode signal representing a type of the partial-response waveform equalization, the RLL mode signal representing a type of the run-length-limited code;

third means for calculating a difference between the temporary decision value of the equalization-resultant signal and the actual value thereof, and generating an error signal in response to the calculated difference; and fourth means for controlling the tap coefficients of the transversal filter in response to the error signal generated by the third means so as to minimize the error signal.

5. A reproducing apparatus as recited in claim 4, wherein the second means comprises a peak detector for detecting a point at which a level represented by the equalization-resultant signal peaks, and generating the peak-point information in response to said detected point.

6. A reproducing apparatus as recited in claim 4, wherein the second means comprises means for comparing a phase of a bit clock signal and a phase of a point at which a level represented by the equalization-resultant signal peaks, and generating a phase error signal in response to said phase comparing.

7. A reproducing apparatus as recited in claim 1, wherein the type of the partial-response waveform equalization which is represented by the PR mode signal is expressed as PR (a, b, −b, −a), and the successive samples of the peak-point information are three successive samples, and wherein the temporary decision device comprises means for calculating a value P on the basis of the successive samples of the peak-point information, the value P being equal to a·G when at least one of the successive samples of the peak-point information except a central sample corresponds to a peak point, the value P being equal to (a+b)·G when the central sample among the successive samples of the peak-point information corresponds to a peak point, means for detecting a polarity of a level represented by the equalization-resultant signal which occurs when the central sample among the successive samples of the peak-point information corresponds to a peak point, means for calculating the temporary decision value on the basis of the calculated value P and the detected polarity, and means for setting the temporary decision value to "0" when none of the successive samples of the peak-point information corresponds to a peak point, where G denotes a gain factor.

8. A reproducing apparatus as recited in claim 1, wherein the type of the partial-response waveform equalization which is represented by the PR mode signal is expressed as PR (a, b, −b, −a), and the successive samples of the peak-point information are five successive samples, and wherein the temporary decision device comprises means for calculating a value P on the basis of the successive samples of the peak-point information, the value P being equal to a·G when at least one of second and fourth samples among the successive samples of the peak-point information corresponds to a peak point, the value P being equal to (a+b)·G when the central sample among the successive samples of the peak-point information corresponds to a peak point, means for detecting a polarity of a level represented by the equalization-resultant signal which occurs when the central sample among the successive samples of the peak-point information corresponds to a peak point, means for calculating the temporary decision value on the basis of the calculated value P and the detected polarity, and means for setting the temporary decision value to "0" when none of second, third, and fourth samples among the successive samples of the peak-point information corresponds to a peak point, where G denotes a gain factor.

9. A reproducing apparatus as recited in claim 1, wherein the first means comprises means for reproducing the signal of the run-length-limited code from the recording medium in a tangential push-pull method.

10. A reproducing apparatus comprising:

first means for reproducing a signal of a run-length-limited code from a recording medium;

a transversal filter subjecting the signal reproduced by the first means to a partial-response waveform equalization to generate an equalization-resultant signal, the partial-response waveform equalization depending on tap coefficients;

a temporary decision device for calculating a temporary decision value of the equalization-resultant signal according to a temporary decision algorithm;

second means for calculating a difference between the temporary decision value of the equalization-resultant signal and an actual value thereof, and generating an error signal in response to the calculated difference;

third means for controlling the tap coefficients of the transversal filter in response to the error signal generated by the second means so as to minimize the error signal; and fourth means for changing the temporary decision algorithm used by the temporary decision device between a first predetermined algorithm corresponding to PR (a, b, b, a) waveform equalization and a second predetermined algorithm corresponding to PR (a, b, −b, −a) waveform equalization.

11. A reproducing apparatus comprising:

first means for reproducing a signal of a run-length-limited code from a recording medium;

a transversal filter subjecting the signal reproduced by the first means to a partial-response waveform equalization to generate an equalization-resultant signal, the partial-response waveform equalization depending on tap coefficients;

second means for detecting whether or not the signal reproduced by the first means corresponds to a zero-cross point, and generating 0-point information in response to a result of said detecting;

third means for detecting whether or not the signal reproduced by the first means corresponds to a peak point, and generating peak-point information in response to a result of said detecting;

fourth means for selecting one of the 0-point information generated by the second means and the peak-point information generated by the third means;

a delay circuit responsive to the point information selected by the fourth means for outputting at least three successive samples of the selected point information;

a temporary decision device for calculating a temporary decision value of the equalization-resultant signal on the basis of a PR mode signal, an RLL mode signal, the successive samples of the selected point information which are outputted from the delay circuit, and an actual value of the equalization-resultant signal according to a temporary decision algorithm, the PR mode signal representing a type of the partial-response waveform equalization, the RLL mode signal representing a type of the run-length-limited code;

fifth means for calculating a difference between the temporary decision value of the equalization-resultant signal and the actual value thereof, and generating an error signal in response to the calculated difference;

sixth means for controlling the tap coefficients of the transversal filter in response to the error signal generated by the fifth means so as to minimize the error signal; and seventh means for setting the temporary decision algorithm used by the temporary decision device to a first predetermined algorithm corresponding to PR (a, b, b, a) when the fourth means selects the 0-point information, and setting the temporary decision algorithm used by the temporary decision device to a second predetermined algorithm corresponding to PR (a, b, −b, −a) when the fourth means selects the peak-point information.

12. A reproducing apparatus as recited in claim 11, wherein the second means and the third means comprise an A/D converter for converting the signal reproduced by the first means into a digital signal, means for subjecting the digital signal generated by the A/D converter to a re-sampling process to generate a re-sampling resultant signal, means for feeding the re-sampling resultant signal to the transversal filter, means for detecting whether or not the digital signal generated by the A/D converter corresponds to a zero-cross point, and generating 0-point information in response to a result of said detecting, and means for detecting whether or not the digital signal generated by the A/D converter corresponds to a peak point, and generating peak-point information in response to a result of said detecting.

13. A reproducing apparatus comprising:

first means for reproducing a signal of a run-length-limited code from a recording medium;

a transversal filter subjecting the signal reproduced by the first means to a partial-response waveform equalization to generate an equalization-resultant signal, the partial-response waveform equalization depending on tap coefficients;

second means for detecting whether or not the equalization-resultant signal generated by the transversal filter corresponds to a zero-cross point, and generating 0-point information in response to a result of said detecting;

third means for detecting whether or not the equalization-resultant signal generated by the transversal filter corresponds to a peak point, and generating peak-point information in response to a result of said detecting;

fourth means for selecting one of the 0-point information generated by the second means and the peak-point information generated by the third means;

a delay circuit responsive to the point information selected by the fourth means for outputting at least three successive samples of the selected point information;

a temporary decision device for calculating a temporary decision value of the equalization-resultant signal on the basis of a PR mode signal, an RLL mode signal, the successive samples of the selected point information which are outputted from the delay circuit, and an actual value of the equalization-resultant signal according to a temporary decision algorithm, the PR mode signal representing a type of the partial-response waveform equalization, the RLL mode signal representing a type of the run-length-limited code;

fifth means for calculating a difference between the temporary decision value of the equalization-resultant signal and the actual value thereof, and generating an error signal in response to the calculated difference;

sixth means for controlling the tap coefficients of the transversal filter in response to the error signal generated by the fifth means so as to minimize the error signal; and seventh means for setting the temporary decision algorithm used by the temporary decision device to a first predetermined algorithm corresponding to PR (a, b, b, a) when the fourth means selects the 0-point information, and setting the temporary decision algorithm used by the temporary decision device to a second predetermined algorithm corresponding to PR (a, b, −b, −a) when the fourth means selects the peak-point information.

14. A reproducing apparatus as recited in claim 10, further comprising a viterbi decoder for subjecting the equalization-resultant signal to a decoding process, and fifth means for changing the decoding process in response to whether the temporary decision algorithm is set to the first predetermined algorithm or the second predetermined algorithm.

15. A reproducing apparatus as recited in claim 10, wherein the signal reproduced from the recording medium by the first means comprises a first signal and a second signal, and the temporary decision algorithm is set to the first predetermined algorithm for the first signal and is set to the second predetermined algorithm for the second signal.

16. A reproducing apparatus as recited in claim 10, wherein the first means comprises means for reproducing the signal of the run-length-limited code from the recording medium in a tangential push-pull method.

* * * * *